United States Patent
Yerazunis et al.

(10) Patent No.: US 11,565,406 B2
(45) Date of Patent: Jan. 31, 2023

(54) MULTI-TENTACULAR SOFT ROBOTIC GRIPPERS

(71) Applicant: Mitsubishi Electric Research Laboratories, Inc., Cambridge, MA (US)

(72) Inventors: William Yerazunis, Acton, MA (US); Erin Solomon, Cambridge, MA (US)

(73) Assignee: Mitsubishi Electric Research Laboratories, Inc., Cambridge, MA (US)

( * ) Notice: Subject to any disclaimer, the term of this patent is extended or adjusted under 35 U.S.C. 154(b) by 227 days.

(21) Appl. No.: 17/101,477

(22) Filed: Nov. 23, 2020

(65) Prior Publication Data

US 2022/0161427 A1 May 26, 2022

(51) Int. Cl.
*B25J 9/16* (2006.01)
*B25J 9/10* (2006.01)
(Continued)

(52) U.S. Cl.
CPC ........... *B25J 9/1612* (2013.01); *B25J 9/1045* (2013.01); *B25J 9/12* (2013.01); *B25J 9/163* (2013.01);
(Continued)

(58) Field of Classification Search
CPC . B25J 9/1612; B25J 9/1045; B25J 9/12; B25J 9/163; B25J 9/1633; B25J 9/1674;
(Continued)

(56) References Cited

U.S. PATENT DOCUMENTS

| 4,673,325 A | * | 6/1987 | Jago | B65G 49/067 |
| | | | | 414/798.2 |
| 4,740,025 A | * | 4/1988 | Nelson | B25J 15/00 |
| | | | | 294/902 |

(Continued)

OTHER PUBLICATIONS

Zhou et al, Soft hands: An analysis of some gripping mechanisms in soft robot design, 2015, ELSEVIER, International Journal of Solids and Structures, vols. 64-65, pp. 155-165, ISSN 0020-7683, https://doi.org/10.1016/j.ijsolstr.2015.03.021. (Year: 2015).*

*Primary Examiner* — Jaime Figueroa
(74) *Attorney, Agent, or Firm* — Gene Vinokur; Hironori Tsukamoto

(57) ABSTRACT

A gripper system having tentacles including a control system configured to receive operator data and sensor data. Compare stored object configurations associated with grips to identify a corresponding set of object configurations using a target object shape and a pose via sensor data and select an object configuration. Compare stored commands to identify sets of commands corresponding to the object configuration and select sets of commands. If a set of pickup actions are received, compare to the corresponding object configuration to identify a set of pickup actions using the received set of pickup actions, and select a set of pickup actions. Compare the sets of commands to identify a corresponding first set of commands corresponding to a set of pickup actions using the set of pickup actions and select the first set of commands. If the received set of pickup actions are absent, then select a second set of commands.

24 Claims, 24 Drawing Sheets

(51) Int. Cl.
*B25J 13/08* (2006.01)
*B25J 15/12* (2006.01)
*B25J 9/12* (2006.01)

(52) U.S. Cl.
CPC ........... *B25J 9/1633* (2013.01); *B25J 9/1674* (2013.01); *B25J 9/1694* (2013.01); *B25J 13/082* (2013.01); *B25J 13/087* (2013.01); *B25J 13/088* (2013.01); *B25J 15/12* (2013.01)

(58) Field of Classification Search
CPC ...... B25J 9/1694; B25J 13/082; B25J 13/087; B25J 13/088; B25J 15/12; B25J 9/104; G05B 2219/39489; G05B 2219/39496
USPC ................. 700/245–264; 318/568.11–568.25
See application file for complete search history.

(56) References Cited

U.S. PATENT DOCUMENTS

| | | | | |
|---|---|---|---|---|
| 5,225,648 | A * | 7/1993 | Torii | B23K 26/0884 901/42 |
| 5,317,952 | A * | 6/1994 | Immega | F15B 15/10 901/22 |
| 5,409,280 | A * | 4/1995 | Hill | B65G 7/12 294/16 |
| 6,491,330 | B1 * | 12/2002 | Mankame | H01L 21/68707 294/196 |
| 8,474,893 | B2 * | 7/2013 | Kawanami | B25J 15/0213 294/198 |
| 8,823,383 | B2 * | 9/2014 | Min | G01R 31/2834 324/73.1 |
| 8,827,337 | B2 | 9/2014 | Murata et al. | |
| 8,965,580 | B2 | 2/2015 | Brooks et al. | |
| 9,464,642 | B2 * | 10/2016 | Ilievski | F15B 15/10 |
| 9,962,832 | B2 * | 5/2018 | Kwok | B25J 15/0023 |
| 9,981,377 | B2 | 5/2018 | Morin et al. | |
| 10,131,051 | B1 * | 11/2018 | Goyal | B25J 9/1697 |
| 10,569,422 | B2 * | 2/2020 | Curhan | B25J 15/0023 |
| 10,661,447 | B2 * | 5/2020 | Curhan | B25J 15/10 |
| 10,800,033 | B2 * | 10/2020 | Yamada | B25J 9/1612 |
| 10,828,788 | B2 * | 11/2020 | Lessing | B25J 9/142 |
| 10,843,336 | B2 * | 11/2020 | Kwok | B25J 9/142 |
| 10,974,382 | B2 * | 4/2021 | Lessing | B25J 15/083 |
| 11,027,423 | B2 * | 6/2021 | Lessing | B25J 15/12 |
| 11,027,436 | B2 * | 6/2021 | Beri | B25J 13/084 |
| 11,045,959 | B2 * | 6/2021 | Curhan | B25J 15/0616 |
| 11,148,295 | B2 * | 10/2021 | Correll | B25J 9/1697 |
| 2011/0156416 | A1 * | 6/2011 | Kawanami | B25J 15/0213 294/106 |
| 2011/0188974 | A1 * | 8/2011 | Diamond | H01L 21/67754 414/217 |
| 2013/0002273 | A1 * | 1/2013 | Min | G01R 31/001 324/750.01 |
| 2014/0208731 | A1 * | 7/2014 | Shepherd | B25J 9/142 60/407 |
| 2016/0001444 | A1 * | 1/2016 | Kwok | B25J 9/142 29/428 |
| 2016/0114482 | A1 * | 4/2016 | Lessing | B25J 15/083 294/196 |
| 2017/0282363 | A1 * | 10/2017 | Yamada | B25J 15/0071 |
| 2018/0207814 | A1 * | 7/2018 | Lessing | B25J 9/142 |
| 2018/0281201 | A1 * | 10/2018 | Rosenstein | F15B 15/10 |
| 2018/0326578 | A1 * | 11/2018 | Kwok | B25J 9/08 |
| 2018/0326579 | A1 * | 11/2018 | Lessing | B25J 15/12 |
| 2018/0361596 | A1 * | 12/2018 | Beri | A61H 1/02 |
| 2019/0047156 | A1 * | 2/2019 | Curhan | B25J 15/12 |
| 2019/0061170 | A1 * | 2/2019 | Curhan | B25J 15/0616 |
| 2019/0160692 | A1 | 5/2019 | Miyazaki et al. | |
| 2019/0381670 | A1 * | 12/2019 | Correll | B25J 9/1697 |
| 2020/0189121 | A1 * | 6/2020 | Curhan | B25J 13/085 |
| 2020/0346792 | A1 * | 11/2020 | Curhan | B65B 5/08 |
| 2021/0394367 | A1 * | 12/2021 | Correll | B25J 9/106 |

* cited by examiner

288

Types of Operator Data (*data sent by an operator*): *Pickup actions data*: pickup actions describe centralized tentacles actions moving objects from start position to a next position, i.e. object randomly located in a bin of other objects.

Types of Real-time Sensor Data (*sensor data from gripper system*): *Tentacle property data*: from tactile data from sensors embedded in outer surface of tentacles. End tip sensor 420C of FIG. 4C type of inertial sensor, micro electro-mechanical system device, accelerometer, magnetometer, tactile sensor, electromagnetic positional tracker.

Types of Real-time sensors (*used for some environmental and component sensing*): Wireless or hardwired cameras, i.e. video cameras, web cams, depth cameras, i.e. structured infare illumination, line scan, time-of-flight, speed sensors, light sensors, distance sensors, depth sensors, force sensing, tactile sensing, pressure sensing, voltage sensing, conductance sensing, ultrasonic sensing, x-ray sensing. Other sensors (a) a level of cable tension force; (b) a level of movability of the cables; (c) an operational wear sensor for the cables, frayed or broken cable strands, etc.; (d) an angular rotation measurement; (e) a pressure sensor; (f) force sensor; (g) temperature; (h) moisture; (i) coefficient of friction sensor; (j) electrical surface conductivity sensor. Still other sensors: distal joint sensors types distributed shape sensors or linear displacement sensors, i.e. determine a distance that a cable transmission moves indicative of movement of distal joint and a linear voltage differential transformer, a Hall effect sensor and a magnet, a slide potentiometer, a reference element coupled to the cable transmission at a reference point which is indicative of cable transmission.

FIG. 2B

(Multi-tentacle gripper with an ability to grasp objects of different sizes (ranging 6mm to 150mm), weights (ranging 0-4.5+kg), and shapes including irregular shapes, inorganic shapes (rocks, manmade objects, i.e. auto parts), organic objects (unprocessed raw fruit, processed foods, bake foods, non-baked foods, animal products (meat, eggs, cheese)).

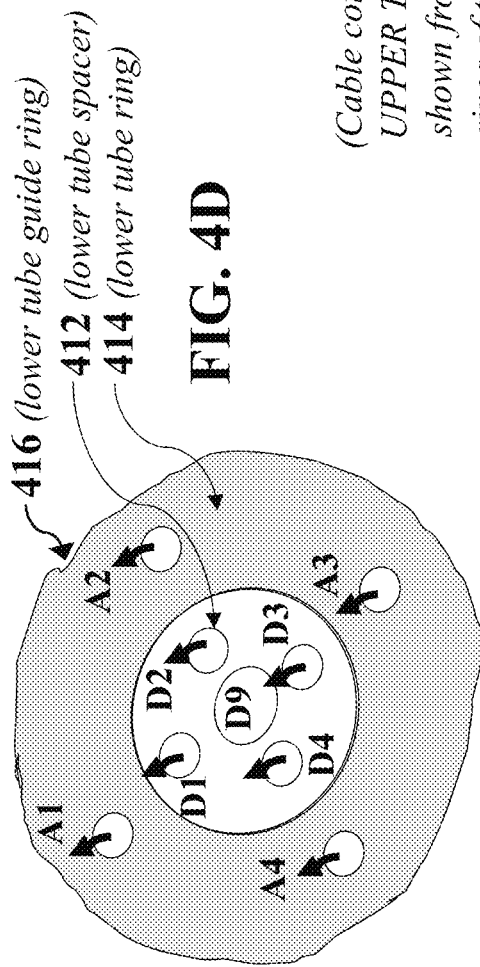
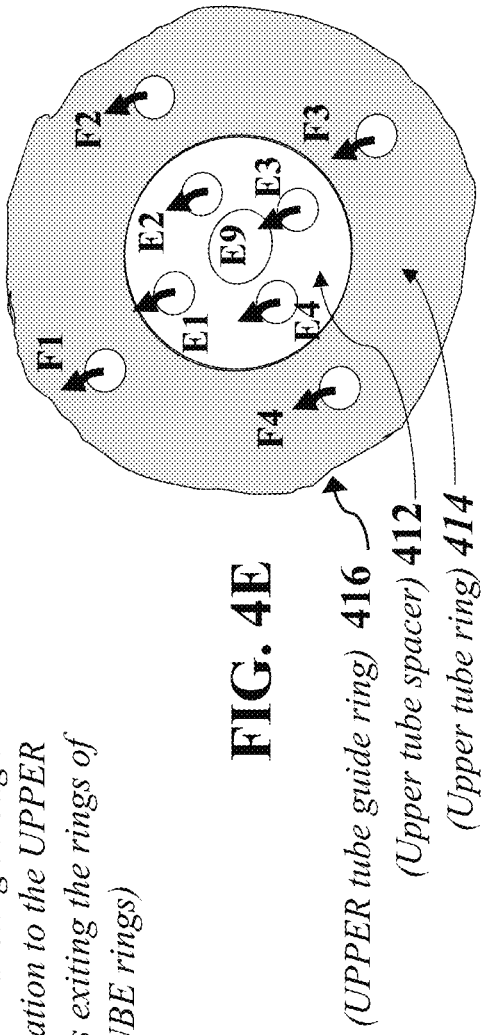
FIG. 4D
FIG. 4E

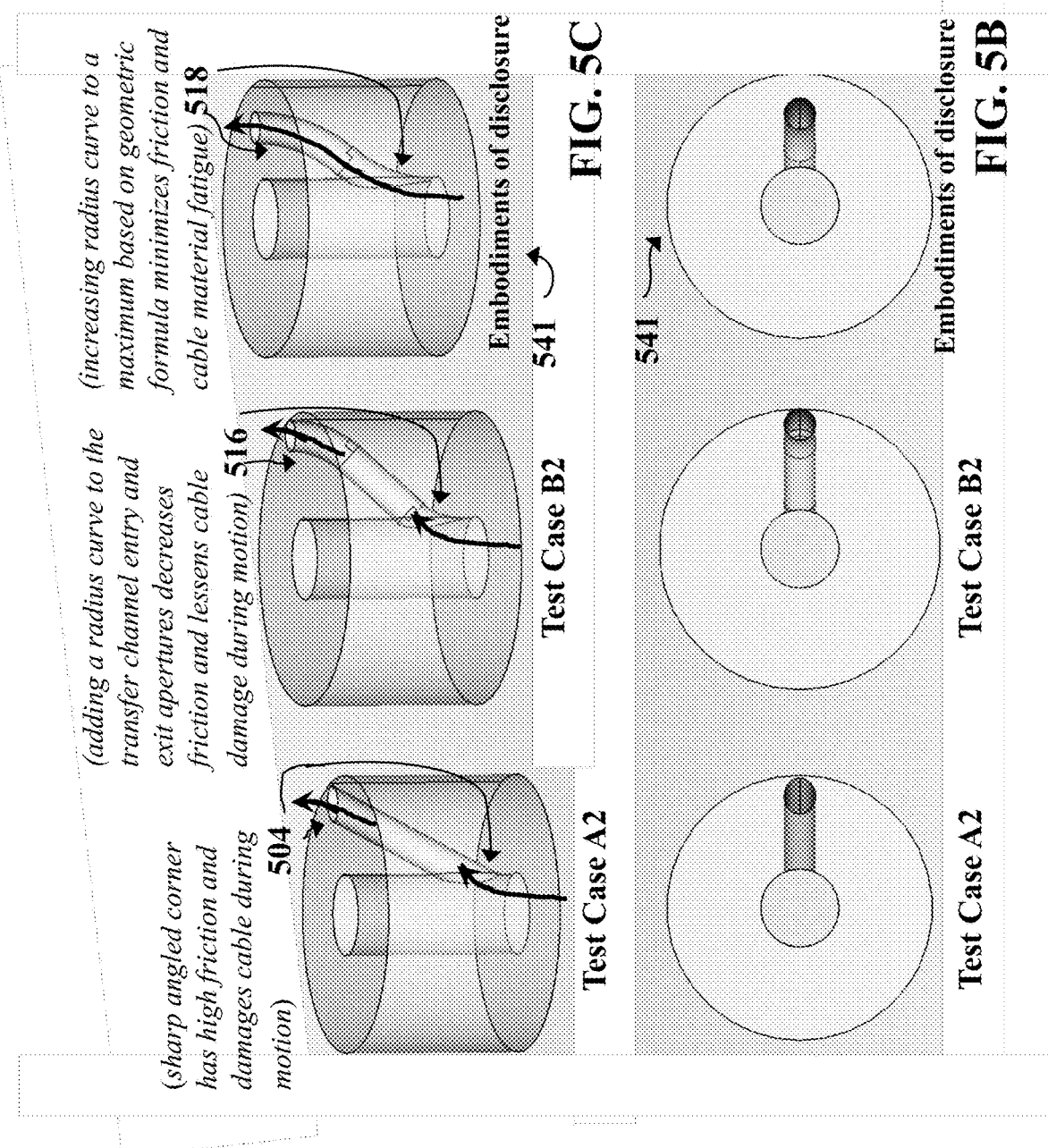

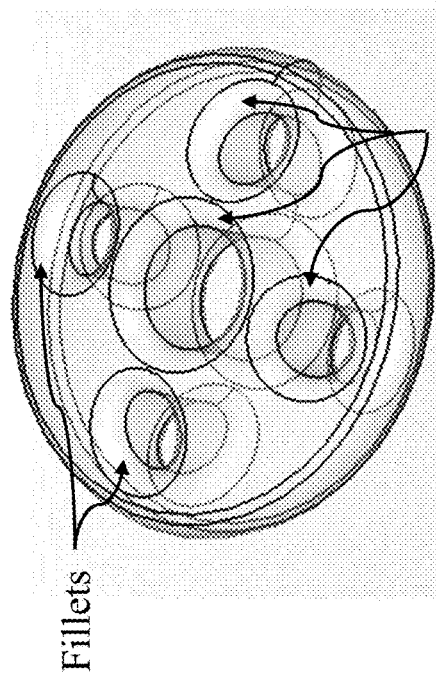
FIG. 5E
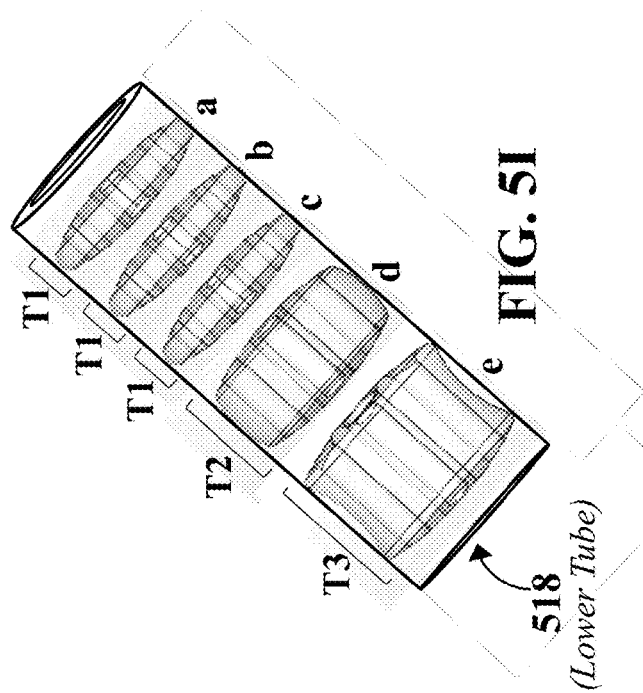
FIG. 5I
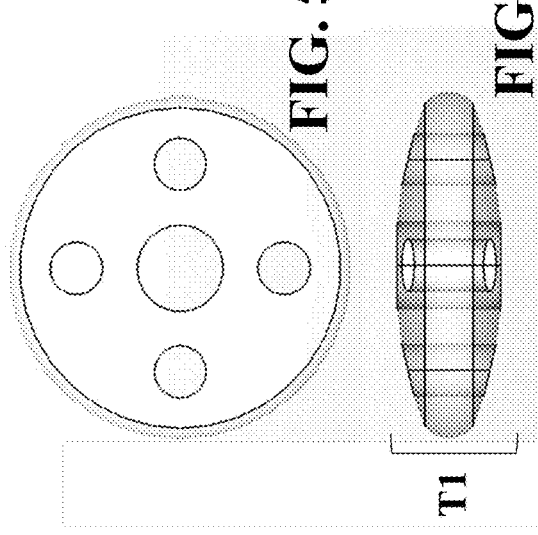
FIG. 5D
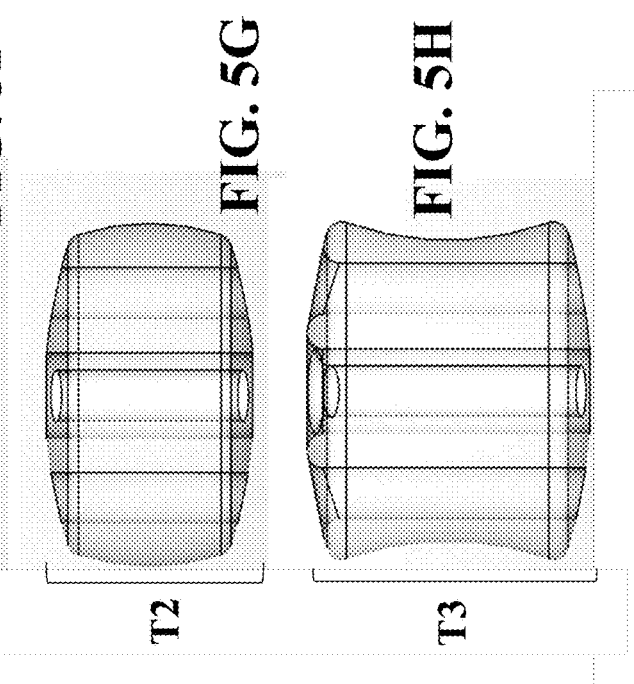
FIG. 5F
FIG. 5G
FIG. 5H

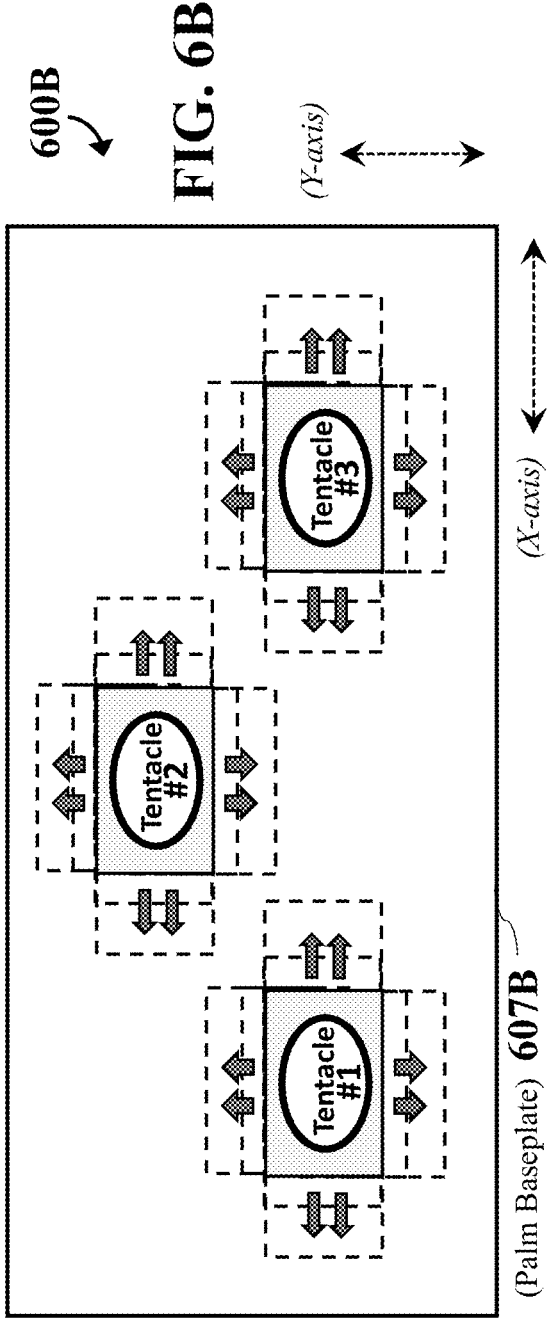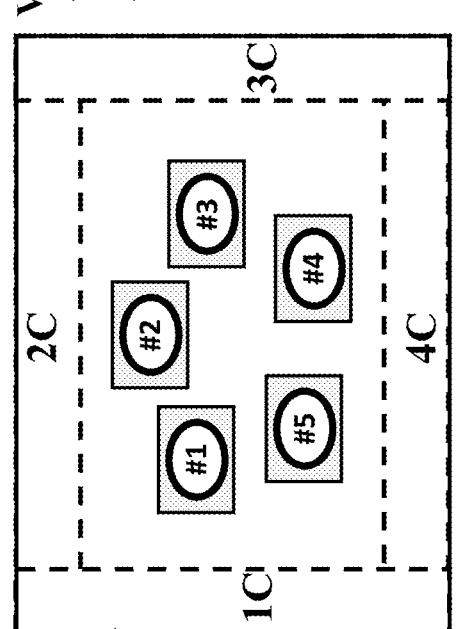

MFG Packaging Applications for Small Parts of Different Shapes
AND
Supply Chain Applications for Bin Picking, Sorting of Goods (Tentacles Transport Pencil) 810

(Tentacles Transport Bolts) 1514

(Tentacles Transport Air Filter, Grip #1) 818

(Tentacles Transport Air Filter, Grip #2) 819

| Grasp Mode | Example Grasp | Max Pull at Grip Failure | Object | Pull Vector | No-load Current Draw (A) | Max Current Draw (A) | Failure Mode |
|---|---|---|---|---|---|---|---|
| Distal Wrap | 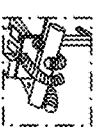 | 36 nt (8 lb) | 10.3 mm tube | Out | 3.8 | 4.8 | Fingertips pulled off |
| Proximal Hug Wrap | 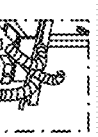 | 67 nt (15 lb) | 10.3 mm tube | Out | 4.5 | 7.9 | Cable ripped from servo |
| Proximal Hug Wrap | 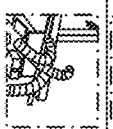 | 36 nt (8 lb) | 10.3 mm tube | Down | 4.8 | 6.6 | Tube Slipped out of grasp |
| Reverse Distal Wrap |  | 49 nt (11 lb) | 10.3 mm tube | Out | 2.3 | 2.7 | Fingertips pulled off |
| Internal Counter Expanding Wrap |  | 160 nt (36 lb) | 104 mm inside dia. tube | Out | 4.4 | 5.6 | Fingertips pulled off |
| Internal Expanding Distal Pinch |  | 31 nt (7 lb) | 104 mm inside dia. tube | Out | 2.1 | 3 | Fingertips pulled off |
| Large External Pinch |  | 18 nt (4 lb) | 147 mm outside dia. tube | Out | 3.1 | 3.7 | Fingertips pulled off |
| Extreme Distal Pinch |  | 0.1 nt (0.02 lb) | 66 mm tube | Down | 2.3 | 2.3 | Object slipped from grasp |

FIG. 9B

MULTI-TENTACULAR SOFT ROBOTIC GRIPPERS

FIELD

The present invention relates to robot manipulators, and more particularly to a centralized controller for a soft robotic gripper having coordinated multiple tentacles with near-full or full actuation to move objects.

BACKGROUND

There are many challenges facing centralized control methods for conventional soft grippers which include speed, integration of sensing, and control. Improved control processing methods and sensing play an important role in developing new centralized control approaches in order to overcome many of today's conventional centralized control method problems.

Conventional soft robotic grippers and/or endpoint effectors can be categorized as pneumatic grippers, hydraulic grippers, electromagnetic motor grippers and suction and vacuum grippers. For example, some of the problems conventional soft robotic grippers include being too heavy in overall weight and design, weak in terms of durability and longtime operational wear and tear, slow gripping performance in terms of time the grippers clasp an object and are limited in controllability or in some cases uncontrollable for truly dexterous manipulation. Some other problems include slow grasping times and high maintenance requirements, which limit the field of applications. For example, for conventional pneumatic grippers, these devices include a pneumatic cylinder (usually double acting, sometimes spring-loaded) slides or pivots a pair of fingers together (for pinch and encircle grips) or apart (for interior or "spread") grips. However, there is no proportional control, the gripper is either CLOSED or OPEN, and require compressed air. Moreover, the conventional pneumatic grippers are noisy, very heavy in overall weight, have no feedback to the operate regarding any sort of true dexterous manipulation. Conventional hydraulic grippers include a hydraulic cylinder that slides or pivots the fingers together and apart. However, these grippers require a hydraulic power source, have slow take-in time to operate the retraction of the grippers, also they are very heavy in overall weight. Conventional electromagnetic motor grippers include an electromagnetic motor (servo, stepper, or similar motor) that actuates the fingers, arranged typically through a gear train. However, these grippers have very slow take-in times for geared units, weak grips when compared to the same weight of conventional air driven units.

There is a pressing need to develop a controllable soft robot gripper that is for truly dexterous manipulation that is lighter in weight than conventional grippers. There is also a need for controlling soft robot gripper technology to be capable of movement within the gripper (analogous to motions of a human finger when writing cursively), along with high quality position (biologically analogous to proprioception) and force (biologically analogous to muscle effort) feedback that conventional grippers fail to achieve.

SUMMARY

The present invention relates to robot manipulators, and more particularly to a centralized controller for a soft robotic gripper having coordinated multiple tentacles with near-full or full actuation to move objects.

Embodiments of the present disclosure include an innovative centralized controller for a multi-tentacle gripper that optimizes coordinated tentacles grasping actions. Each tentacle includes independent and versatile controlled actions coordinated by the centralized controller with a reduced amount of process time and computational costs. At least one realization realized from experimentation is that the processing times for test centralized controllers for gripper systems were slow and provided poor response times in test manufacture applications. To overcome these challenges, embodiments of the present disclosure needed to be developed to quickly process within a shortest amount of process time and computational cost, the grippers actions. Wherein the control processing time had to include identifying an object shape, pose (i.e. the pose being defined as the rotational state of an object in the pitch, yaw, and roll axes), etc., and be able to determine an associated set of coordinated sequential control command instructions/actions to move the object from a starting position to a final position, within an allotted amount of process time and computational cost, in order to meet todays gripper industry manufacturing and other applications demands.

At least some reasons the object pose is important, is for example, that if an object falls from a conveyer belt into a bin in a discrete manufacturing process, the object is likely to tumble and eventually rest at a final object pose somewhere in the bin. Typically, the object's final pose will be one of the stable poses of the object. A stable pose can be considered as when a coin is lying flat on a table where vibrations or small jolts do not dislodge the coin from the coin position lying on flat on the table. Conversely, an unstable pose may be when a coin is positioned on its edge, and that because vibrations and small jolts cause the coin to fall out of balance from the coin edge position, i.e. then the coin pose is in an unstable coin pose. Because each object shape includes multiple stable poses, each object pose has to correspond to particular sets of coordinated sequential control command instructions or object movement programs, in order for the multiple tentacles to pick up the object. In other words, the specific pose of the object needs to be correlated with a particular sets of coordinated sequential control command instructions, in order for the multiple tentacles to grasp the object and move within the workplace, safely and within a minimum amount of processing time and computational costs.

While testing some conventional gripper centralized controllers during experimentation, some test results discovered many problems that needed to be addressed and overcome. For example, discovered was resulting poor computational costs due to a failure of the test centralized controller to "locate" the test object's pose which often resulted in uncontrolled grasping by the grippers and wasting value production time. Other test results were the failure of the test centralized controller to identify a correct grasping motion or type of grip prior to determining the sequence of gripper actions to pick up the test object, which often led to the test grippers not picking up the test object quickly or within a reasonable grasping allotted time period or with a grasp force sufficient to move the object. Some important reasons why a correct grasping motion needs to be determined quickly is believed because without knowing the correct grasping motion prior to picking up the test object, the grippers will either (1) continually attempt and fail to pick up the test object, (2) attempt to pick up the test object, and fail many times, then after a long processing time eventually pick up the test object, or (3) upon multiple failed attempts the test grippers picks up the test object, where the test object evidentially falls from the grasp of test grippers while attempting to complete the task, resulting in the task failing, i.e. moving the test object. The effects of failed attempts by the grippers to pick up the test object are slow grasping times, high gripper maintenance costs, a high risk of damaging one of the grippers, the test objects, or causing injury to a human. What was later learned from these test experiments is that the test centralized controllers were limited in terms of their field of gripper applications due to having high processing times and low reliability in determining a correct set of types of grips corresponding to one or more test objects. These test centralized controllers did not have a definitive approach of identifying types of grips correlating to different object locations, orientations, poses, sizes, weights, shapes, etc. Other realizations included that the test grippers also needed to be further developed in combination with an innovative centralized control system, to address the shortcomings of the conventional gripper designs and conventional control system problems.

Thus, several realizations were realized included needing to reduce the centralized control processing times, computation costs, as well as overcome processing problems. Some of the identified conventional processing problems that were overcome by the innovative centralized controller control include: (a) identifying a target object type, location, and pose; (b) identifying types of grips associated with each target object type, location, pose along with each object characteristic; (c) determining a list of sequential command instruction/actions for each tentacle resulting in coordinated tentacles grasping to move the target object.

Embodiments of the present disclosure use an innovative centralized control system that incorporate databases that provide quick access to identifying information about target object to move from a starting position to a final position, while within a least amount of processing time, computational costs and with high reliability of success. Steps incorporated into the innovative centralized control system are designed to overcome the many problems experienced with the conventional control systems noted above. For example, some steps the innovative centralized control system includes are:

Step (1) obtain operator data from an operator observing the work area prior to the gripper operation and obtain target object (TO) data from real-time sensors from the gripper system. The received operator data can include command actions associated with moving the target object from a starting position within the workplace that meet a predetermined tentacle coordinated grip threshold. For example, if the target object is lodged in a bin of random objects at a starting location with a specific object pose, the operator can observe which types of command actions can be used by the tentacles to dislodge and pickup the target object from the starting location/pose/position. The real-time TO data obtained from sensors is compared to an object database and used to identify from the stored object configurations a corresponding stored object configuration based on the TO data. Upon identifying the corresponding stored object configuration, that specific stored object configuration also corresponds to associated data corresponding specific sets of command actions for picking up and moving from a starting position to a final position.

Step (2) includes accessing the object database which includes classified lists for stored object configurations, (i.e. shapes, poses, sizes, weights, orientations, etc.). Using the received target object data obtained from real-time sensors to compare to the stored object configurations, identify a corresponding stored set of object configurations, and using a target object (TO) shape and a pose from the real-time sensor data, select a corresponding stored object configuration.

The stored data in the databases include tentacle gripper/object manipulations that are previously tested during a testing period to identify optimized tentacle gripper/object manipulation according to predetermined tentacle gripper/object manipulation thresholds, to move test objects from starting positions to final positions under different environmental conditions within different types of object workplaces, which are stored in databases. Wherein identifying the correct set of tentacle gripper/object manipulations depends upon identifying and selecting the correct stored object configuration. To identify the correct stored object configuration, the innovative centralized control system uses the real-time sensor data that includes the target object shape and pose, prior to moving the target object. The real-time sensor data can include other real-time sensor data including one or more object characteristics such as a level of surface smoothness, texture, rigidity, deformability, etc., which can be later compared with stored data corresponding to the selected stored object configuration, to identify the correct set of command actions to move the target object from the starting position to the final position. Wherein for each specific object configuration combination of object characteristics, there are an associated different set of command actions to move the target object.

Still referring to step (2), for example, a first test object configuration may have a specific size, weight, with a single object characteristic such as a specific level of surface smoothness, that is obtained from real-time sensor data. The real-time sensor data can be compared to the stored object configurations to identify and select a stored object configuration. Wherein a specific sets of command actions or optimized tentacle gripper/object manipulations can be obtained using the real-time sensor data that includes the single object characteristic that is compared with stored object characteristics of the selected stored object configuration, to identify and select the correct sets, set or subset of command actions.

To determine each correct set of commands or optimized tentacle gripper/object manipulations, each test object configuration and all combinations of the text object characteristics were previously tested with all different types of grip styles, grip modes, an amount of grip strengths, an amount of carrying capacities, for grasping the test object, under different types of environmental conditions, to move the test object from a starting position to a final position, for each type of object workplace, i.e. test objects randomly in bin, or located on a worksurface, etc., in order to identify optimized tentacle gripper/object manipulations according to predetermined tentacle gripper/object manipulation thresholds for that test object configuration, which is later stored. Noted, is that if there is a change in the tentacle such as a degree of flexibility, gripping strength, tentacle material type, etc., then each changed tentacle is also used in testing the first test object configuration, which is also later stored. Thus, if the operator provided any change in the tentacle via the operator data, and/or the sensors detected a change, then that received operator data and/or sensor data can be used for further classification. Thus, stored in the database(s) can include object configurations, object characteristics, grasp classifiers, environmental conditions, object workplaces, command actions corresponding to all combinations of the above information, and tentacles configurations. Each classification in each database can correspond to data in other databases.

Step (3) compare stored commands to identify corresponding stored sets of commands corresponding to the object configuration, and from the stored sets of commands use the selected stored object configuration, to select a corresponding set of commands.

Step (4) can include if the operator data, i.e. tentacle data, includes a received set of pickup actions from an operator, comparing stored sets of pickup actions associated with the selected object configuration to identify a corresponding stored set of pickup actions using the received set of pickup actions, and select a corresponding set of pickup actions. Note, the set of pickup actions pertain to moving objects from a starting position within a workplace to a next position, and include one or a combination of: an axial pull, an axial push, an axial twist, a lateral pull, a lateral push, a lateral twist, traverse twist, traverse push or a traverse pull, to the next position, by the tentacles grasping objects of different sizes, weights, positions, orientations, types of object characteristics, that meet a predetermined multi-tentacle coordinated grip threshold. As an example, if the target object is lodged in a bin of objects, then to dislodge the target object a certain set of pickup actions may be required, which are provided by an operator observing the lodged target object, via received operator data.

Step (5) comparing the sets of commands to identify a corresponding first subset of commands using the selected set of pickup actions and select a corresponding first subset of commands. Step (6) if the received set of pickup actions are absent from the operator data, then the centralized controller system can select a second subset of commands corresponding to sets of types of grips associated with the object configuration. Step (7) upon determining the set of command instructions, implement the set of command instructions that include a sequence of predetermined torques to be applied to one or more joints or flexural joints along with corresponding tensions to apply to a plurality of transmission systems of each tentacle of the tentacles. Wherein each transmission system has a first end connected to a motor and a second end connected to a joint or a flexural joint.

Step (8) generate a sequence of control signals that cause the motors for each tentacle of the tentacles to apply the sequence of tensions to the transmission systems to each tentacle, to move the TO. Contemplated are other steps that may be associated with correcting error, such that one or more errors may occur during the process of moving the target object. For example, sensors continuously gather sensor data while the object moving process in real-time, so that while monitoring the sensor data at each sequential step or for each period of time throughout the process, the sensor data can be used to identify errors or any other potential issues.

Some experimental testing led to realizing that the innovative tentacle designs can have 12 degrees of freedom (DoF), which in turn, provides for a wide variety of gripping styles resulting in an increased ability to grasp objects of different sizes, weights, and shapes. After tests experimentations of the innovative tentacle some results showed technical specifications that included: (a) grasping objects with ODs from about 40 to 95 mm or 35 to 75 mm, with an opposing finger gap of about 63.5 mm; (b) a cycle time of 88 msec to close and 166 msec to open; (c) a grip force of about 2.5 lb per finger; and (d) wherein most embodiments meet requirements of FDA-CFR Title 21 for food-contact materials and is rated IP67 protection class.

Observed after some experimentation is that innovative tentacles could grasp irregular shaped objects including inorganic irregular shaped objects (rocks, manmade objects) and organic irregular shaped objects (unprocessed raw fruit, processed foods, bake foods, non-baked foods, animal products (meat, eggs, cheese). The different types of shaped objects the multiple tentacles transports can include, by-non-limiting example, 3-dimensional (3D) shapes that are exactly or even approximately as: (a) polyhedral shapes, which are shapes with flat faces; (a) ellipsoids, which are egg-shaped; (c) sphere-shaped objects; (d) cylinders; and (e) cones. Wherein a shape is understood as a form of an object or the objects external boundary, outline, or external surface, as opposed to other properties such as color, texture or material type. Wherein some embodiments of the present disclosure grasp and move organic shapes that are free-flowing and less symmetrical, such as leave shapes, rock shapes and cloud shapes. As well as, grasping abstract shapes such as cubes, cylinders, triangles, other organic shapes such as rocks, fruit, sponges, represented by generalized shape methods such as point clouds. Also shown from experimentation is a level of grasping a variety of non-rigid (bendable or deformable) objects by that innovative tentacles that include: (a) bags of small objects, i.e. bolts, gromets, etc.; (b) wrapped perishable items; (c) fragile items, such as sushi, baked goods, or other fragile items, when compared to a level of versatile gripping action associated with deformable objects to existing conventional soft robotic technologies. The higher level of precise dexterous manipulation provides an increased performance level that corresponds to an injury free challenge, when operating with unprotected and untrained humans in completing an inter-active human/robot task in an industrial manufacturing environment.

What was later realized in view of having a higher level of tentacle dexterous manipulation is that motors such as radio control (RC) servos can be used with tension cables which provided +/−120° of flex range per tentacle section, via a centralized control. The RC servos and tension cable design of the present disclosure resulted in providing, an axial lift strength in excess of 100 N (i.e. lifting strength greater than >10 kg). Which resulted in a high level of gripping strength to a tentacle weight ratio, i.e. the tentacle construction has an overall weight that is substantially lighter when compared to conventional grippers. Another aspect noted was there were no problems observed with heat dissipation to the RC motors after extended operation. Whereas experimentation showed that after extended operation with conventional gripper systems there was observed heat dissipation to the RC motors which resulted in limiting an overall strength of the tentacle operational performance.

At least one surprising attribute observed from the tentacle construction of the present disclosure was a decrease in an amount of grasping time for the tentacles to grasp, and to move a target object from a start position to a final position, when compared to an amount of grasping time for conventional grippers to grasp and to move that same object from the same start to the same final position. Also observed during operation of the tentacles is that the RC servomotors and the tension cables required fractional seconds of time to actuate forces, when compared to the conventional electro-magnetic motor grippers which were very slow as to an amount of take-in time for geared units. The conventional electromagnetic motor grippers also recorded a weak grip strength when compared to the same weight of other conventional air driven units. Also observed is that the multiple tentacles can operate with unprotected and untrained humans while completing an inter-active human/robot task in an industrial manufacturing environment without concerns of injuring human. Whereas, in contrast, conventional grippers do not have near-full or full actuation, and had poor and uncontrollable dexterous manipulation for most grippers. These types of poor conventional gripper attributes proved to be injury prone resulting in challenges in terms of human safety.

Another advantage of the embodiments of the present disclosure can be that the robot arm mass loading can be reduced by interposing extensions to the cables via flexible sheathed cables such as bicycle brake cables between the base plate of the multi-tentacle gripper and a servo-motor package located and supported external to the robot. Because the flexible sheath cable is not required to flex to allow the tentacles to flex, the lack of flexibility in the flexible sheath does not impact a dexterity of the multi-tentacle gripper. By locating a mass of the servo-motor package off of the robot arm, the mass impact of the gripper is very low for its force and speed, as the prime mover for each degree of freedom is not carried by the robot, but is remote with the force and force feedback carried by flexible sheathed cables.

Another advantage of the embodiments of the present disclosure is that the tentacles do not need to contain electronics, nor in fact, any requirement for metals or conductors whatsoever; a gripper according to the present disclosure could be made purely of polyurethane, synthetic rubber, or other elastomer plastics, with nylon, aramid (Kevlar) or ultra-high-molecular-weight polyethylene (UHMWPE, UHMW), (Dyneema™ or Spectra™) cables and Delrin™, Nylon, PEEK, Ultein™ (polyetherimide) or fiberglass-reinforced epoxy spacers and rings, and anti-friction bushings (of Nylon, Delrin™, Teflon™) for the spacers and rings. Thus, the embodiments of the present disclosure could be used in environments of extremely high magnetic or electric field intensity, as well as in high RF environments. Further, with no electronics required in the tentacles whatsoever, the gripper could be used in areas of intense ionizing radiation that would destroy semiconductors. It is possible with any of these materials (and to a lesser extent with some structures and steel cabling) some wear, and stretch will occur. However, this is not desirable for continued, long term precision use of the gripper. Therefore, an additional element of the present disclosure can be a simple calibration station, composed of a precision, preferably hardened, block of size similar to a distal phalange, equipped with axis force gauges, rigidly positioned at a known location in the frame of reference of the system, and with an optional video camera.

According to an embodiment of the present disclosure, a soft gripper system having tentacles including a centralized control system is connected to a transceiver. The centralized control system is configured to execute instructions stored in a memory having databases, to perform operations, including receive operator data and sensor data from the transceiver. Compare stored object configurations associated with grips to identify a corresponding stored set of object configurations associated with sets of grips using a target object shape and a pose via the sensor data and select a corresponding object configuration associated with a set of grips. Compare stored commands to identify corresponding stored sets of commands corresponding to the object configuration with the associated set of grips and select corresponding sets of commands. If a set of pickup actions are received in the operator data, compare the stored sets of pickup actions corresponding to the object configuration to identify a set of pickup actions using the received set of pickup actions, and select a corresponding set of pickup actions. Compare the sets of commands to identify a corresponding first set of commands that correspond to a set of pickup actions using the set of pickup actions and select the first set of commands. If the received set of pickup actions are absent from the operator data, then select a second set of commands without the set of pickup actions. Generate a sequence of control signals that cause motors for each tentacle of the tentacles to apply a sequence of tensions to transmission systems to each tentacle, to move the target object, according to the selected set of commands.

According to another embodiment of the present disclosure, a gripper system having tentacles including a centralized control system connected to a transceiver. The centralized control system is configured to execute instructions stored in a memory having databases, to perform operations, including receive operator data and sensor data from the transceiver. Compare stored object configurations associated with grips to identify a corresponding stored set of object configurations associated with sets of grips using a target object (TO) shape and a pose via the sensor data and select a corresponding object configuration associated with a set of grips. Compare stored commands to identify corresponding stored sets of commands corresponding to the object configuration with the associated set of grips and select corresponding sets of commands. If a set of pickup actions are received in the operator data, compare the stored sets of pickup actions corresponding to the object configuration to identify a set of pickup actions using the received set of pickup actions, and select a corresponding set of pickup actions. Compare the sets of commands to identify a corresponding first set of commands that correspond to a set of pickup actions using the set of pickup actions and select the first set of commands. If the received set of pickup actions are absent from the operator data, then if at least one object characteristic is received in the operator data. Compare the stored object characteristics corresponding to the object configuration to identify at least one object characteristic using the received at least one object characteristic and select a corresponding at least one object characteristic. Compare the sets of commands to identify a corresponding second set of commands that correspond to at least one object characteristic using the at least one object characteristic and select the second set of commands. If the received at least one object characteristic is absent from the operator data, then select a third set of commands without the set of pickup actions and the at least one object characteristic. Generate a sequence of control signals that cause motors for each tentacle of the tentacles to apply a sequence of tensions to transmission systems to each tentacle, to move the target object, according to the selected set of commands.

According to another embodiment of the present disclosure, a method for a gripper system having tentacles including receiving operator data and real-time sensor data. Comparing stored object configurations associated with grips in an object database to identify a corresponding stored set of object configurations associated with sets of grips using a target object (TO) shape and a pose via the sensor data, and select a corresponding object configuration associated with a set of grips. Comparing stored commands in a command database to identify corresponding stored sets of commands corresponding to the object configuration with the associated set of grips and select corresponding sets of commands. Comparing the stored sets of pickup actions in the object database corresponding to the object configuration to identify a set of pickup actions using the received set of pickup actions, and select a corresponding set of pickup actions, only if, a set of pickup actions are received in the operator data. Comparing the sets of commands to identify a corresponding first set of commands that correspond to the set of pickup actions in the command database and select the first set of commands. Selecting a second set of commands without the set of pickup actions from the command database, only if, the received set of pickup actions are absent from the operator data. Generating a sequence of control signals that cause motors for each tentacle of the tentacles to apply a sequence of tensions to transmission systems to each tentacle, to move the target object, according to the selected set of commands.

According to another embodiment of the present disclosure, a robot system including an input circuit operable to receive input signals from sensors. A transceiver to receive operator data including a set of pickup actions. A storage system having databases and is operable to provide a robot system operational profile and an object configuration profile that includes an object shape and a pose of the object. A centralized control system connected to the transceiver and sensors is configured to execute instructions stored in the storage system. The centralized control system is to perform operations, including detect an object configuration profile from an object configuration profile database using a target object configuration profile obtained from the received input signals. Wherein each object configuration profile is associated with a set of grips and select an object configuration profile. Access a command database having commands and compare stored commands to identify corresponding stored sets of commands corresponding to the object configuration profile with the associated set of grips and select corresponding sets of commands. If a set of pickup actions are received in the operator data, compare the stored sets of pickup actions corresponding to the object configuration profile to identify a stored set of pickup actions using the received set of pickup actions, and select a corresponding set of pickup actions. Compare the sets of commands to identify a corresponding first set of commands using the set of pickup actions and select a corresponding first set of commands. If the received set of pickup actions are absent from the operator data, then select a second set of commands without the set of pickup actions. Wherein the selected set of command includes a sequence of predetermined torques to be applied to one or more joints or flexural joints along with corresponding tensions to apply to a plurality of transmission systems of each tentacle of the tentacles. Such that each transmission system has a first end connected to a motor and a second end connected to a joint or a flexural joint. Generate a sequence of control signals that cause the motors for each tentacle of the tentacles to apply the sequence of tensions to the transmission systems to each tentacle, to move the target object.

BRIEF DESCRIPTION OF THE DRAWINGS

The presently disclosed embodiments will be further explained with reference to the attached drawings. The drawings shown are not necessarily to scale, with emphasis instead generally being placed upon illustrating the principles of the presently disclosed embodiments.

FIG. 2B is a block diagram illustrating some sensor data that can generated along with some types of sensors that can be used for embodiments, according to some embodiments of the present disclosure;

FIG. 4D is a schematic illustrating the cable configuration for the lower tube spacer & rings of the soft robot gripper of FIG. 4A and FIG. 4B, according to some embodiments of the present disclosure;

FIG. 4E is a schematic illustrating the cable configuration for the upper tube spacer & rings of the soft robot gripper of FIG. 4A and FIG. 4B, according to some embodiments of the present disclosure;

FIG. 5A, FIG. 5B and FIG. 5C are schematics illustrating an optimization of elastic connector that minimizes cable friction and cable material fatigue, according to embodiments of the present disclosure;

FIG. 5D is a schematic illustrating a tope view of a guide disc having pathways and a thru-center hole with a rounded peripheral edge or convex edge, in order to minimize friction and wear to the elastic tube, according to some embodiments of the present disclosure;

FIG. 5E is a schematic illustrating an oblique view of a guide disc having pathways and a thru-center hole with fillets to minimize cable friction and material fatigue when the cable is in motion, along with a rounded peripheral edge or convex edge, in order to minimize friction and wear to the elastic tube, according to some embodiments of the present disclosure;

FIG. 5F, FIG. 5G and FIG. 5H are schematics illustrating side views of a guide disc having pathways and a thru-center hole along with a rounded peripheral edges or convex edges, in order to minimize friction and wear to the elastic tube, according to some embodiments of the present disclosure;

FIG. 5I is a schematic illustrating side views of varying sized guide discs with pathways and thru-center holes and rounded peripheral edges or convex edges positioned within a lower elastic tube, according to some embodiments of the present disclosure;

FIG. 6B is a schematic diagram illustrating a configuration of a controllable palm base plate, such that each tentacle of the multiple tentacles can move independently from the other remaining tentacles in a X direction along an X-axis, as well as in a Y direction along a Y-axis, according to some embodiments of the present disclosure;

FIG. 6C is a schematic diagram illustrating another configuration of the palm base plate, such that the palm base plate outer edges may be adjustable either in/out along a horizontal plane B (HP-B) or along degrees of a vertical plane A (VP-A) of the palm base plate, according to some embodiments of the present disclosure;

FIG. 9B is a schematic illustrating a table of gripping strength test results for a test gripper having three tentacles, two sections per tentacle, having fully actuated (12 DoF), +/−120° flex per tentacle section, and 30 mm minimum interior flex radius, the tested gripping strengths include grasp load capacity, initial and maximum current draws, and failure modes determined for several grasps, according to some embodiments of the present disclosure;

While the above-identified drawings set forth presently disclosed embodiments, other embodiments are also contemplated, as noted in the discussion. This disclosure presents illustrative embodiments by way of representation and not limitation. Numerous other modifications and embodiments can be devised by those skilled in the art which fall within the scope and spirit of the principles of the presently disclosed embodiments.

DETAILED DESCRIPTION

The present invention relates generally to robot manipulators, and more particularly to robot manipulators having multi-tentacular soft robotic grippers.

Figure 1A:
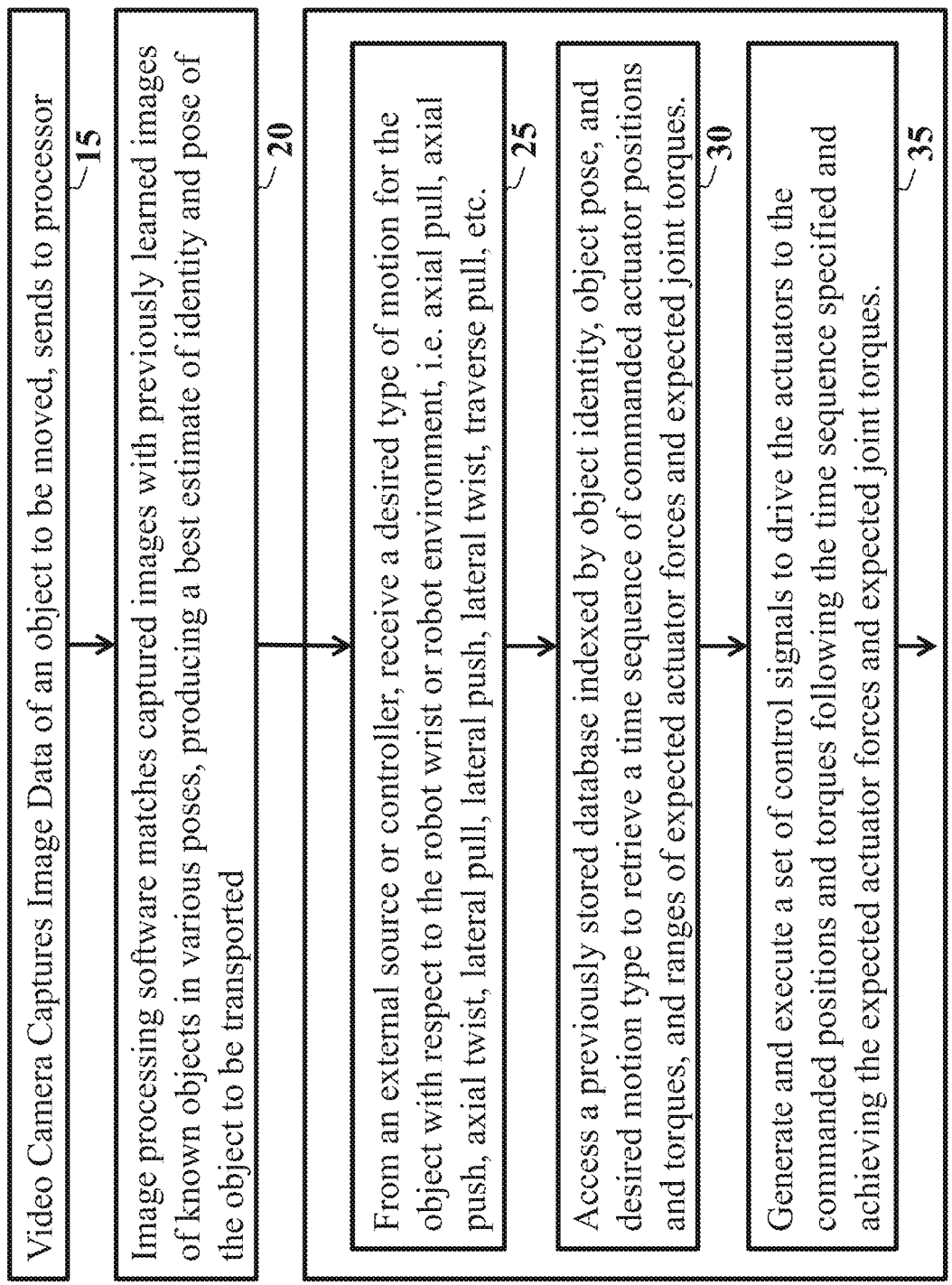
FIG. 1A is a block diagram illustrating flow diagrams of some method steps for implementing a method of the soft robot gripper system, according some embodiments of the present disclosure.

FIG. 1A is a block diagram illustrating flow diagrams of some method steps for implementing a method of the soft robot gripper system, according some embodiments of the present disclosure. Step 15 of FIG. 1A can include a camera such as a video camera, and the like, can capture image of an object to be moved, along with environment image data that can be sent to a processor or like device. The target object shape and specific pose, can be determined using the capturing images, wherein image processing software in communication with the centralized controller can match the captured images of the target object and the target object pose with previously learned images of known objects configurations stored in an object database. An object database is created to include many objects having different shapes, sizes, etc., each stored object can include previously identified object images and object poses. The image processing software can produce a best estimate of an identity of the target object shape along with the target object pose based on comparing the target object shape to stored objects shapes, and then to the object shape's poses in the object database. Some sensor(s) types can be cameras such as video cameras, web cams, depth cameras, (i.e. structured infare illumination, line scan, time-of-flight), etc. The sensors can also gather other data such as environmental data and other aspects including the target object location in relation to the robot system location and to other articles within the environment. Contemplated is that more than one type of sensor can be associated with the robot system, either wirelessly or hardwired. For example, some types of sensors can include environmental sensors (temperature, barometric pressure, humidity, light, moisture, etc.). For example, the capturing of the images of an object by the multiple tentacles can including using web cam(s). The cameras can be fixed camera(s) located approximate the multiple tentacle base, i.e. palm base structure, or located at some other location within sensing/camera range to capture the images. The images are sent to a computer or processor to be processed.

Step 20 of FIG. 1A includes image processing software, as noted above, that matches captured images with previously learned images of known objects in various poses, producing a best estimate of identity and pose of the object to be moved/transported. Contemplated is that the image processing software may include identifying measured image coordinates of locations in images of the captured images, for example, the target object location, the target object location in relation to the robot system, humans working within the environment, and other aspects within the environment including components associated with operations of the robot system. Optionally, the software may also include a method step used to denoise the captured images, a first approach may include assistance from an operator, i.e. OpenCV "erosion" operator, that can replace each pixel value with a lowest pixel value found in a 3×3 region centered around each pixel. This erosion approach can be performed two or three times, which removed noise pixels and limit contamination from the image. Also, optionally, a method step can be used to re-expand parts of the image by an inverse of erosion, called OpenCV "dilation". Which replaced each pixel value with a highest pixel value found in a 3×3 region centered around the pixel. Which may result in enlarging the remaining part of the image into relatively stable, relatively masks, centered on regions where the part of the image is located. This mask image can be used with a grayscale image to eliminate essentially all of the noise and contamination from the grayscale image, because areas/regions/places where the erode/dilate processed, did not recover a stable area are black (zero) and when logic-ANDed with the original image, yields a black background that makes marker detection fast and with very low noise.

Step 25 of FIG. 1A includes that from an external source or controller, receive a desired type of motion for the object with respect to the robot wrist or robot environment, i.e. axial pull, axial push, axial twist, lateral pull, lateral push, lateral twist, traverse pull, etc. For example, a transceiver can receive the specific type of movement action to move a target object, by an operator, user of the robot system, etc. For example, if the command is to lift an object without rotation some of the best grips will be grips that contain the center of gravity of the object between the gripper pads of the gripper. If the command is to twist the object the best grips can be those that span a minimum cross-section of the object such that any slippage in the grip would involve forcing the gripper open.

Step 30 of FIG. 1A includes accessing a previously stored database indexed by object identity, object pose, and desired motion type to retrieve a time sequence of commanded actuator positions and torques, and ranges of expected actuator forces and expected joint torques. For example, some alternative aspects of some embodiments of the present disclosure can be configured for identifying an object location, some aspects of the present disclosure developed methods that stored in memory a pre-stored library of XY object location sets that were earlier produced through a course of experiments. For this particular set of experiments fewer than 50 pre-stored XY object location sets were stored in a memory in a pre-stored library database, that resulted in giving excellent resolution and usability. More than 50 pre-stored XY object location sets can be stored in the pre-stored library database, however, for these sets of experiments, 50 pre-stored XY object location sets appeared to be sufficient to reach some of the goals according to some aspects of the present disclosure. For example, machine vision cameras (i.e. having hardware and software) can be designed to automatically obtain images of the object in the workspace, compare the gathered image to a prestored set of XY stored object location sets in a memory, and the camera(s) can then supply a robot control system or some other control system with the XY stored object location sets, so the grippers locate, grasp and move the object within the workplace. Contemplated is the machine vision cameras can be attached to a secondary controllable positioning device or robot. Further, the machine cameras can be mounted on a pan-tilt zoom controllable base that may be mounted on a controllable track system that the machine cameras can be positioned anywhere along the track. An operator can remotely control the pan-tilt zoom positioning as well as the track positioning via the network 1177 of FIG. 11, in combination with other components.

Some benefits of using the above method feature can be confirmation that the set of operational parameters for the robotic system (obtained from robot system operational profile), are within a predetermined threshold of the operational parameters. For example, a mapped association between the target object and the robot system can include a distance between the target object and the robot system, such that the distance between the target object and the robot system can be compared with the predetermined operating range, and if within the predetermined operating range, the robot system continues to operate, if outside of the predetermined operating range, an alarm command or some other action command/message can be generated and sent to an operator (i.e. a person associated with the robot system), or a component of the robot system to initiate some other action.

Step 35 of FIG. 1A includes generating and execute a set of control signals to drive the actuators to the commanded positions and torques following the time sequence specified and achieving the expected actuator forces and expected joint torques.

Figure 1B:
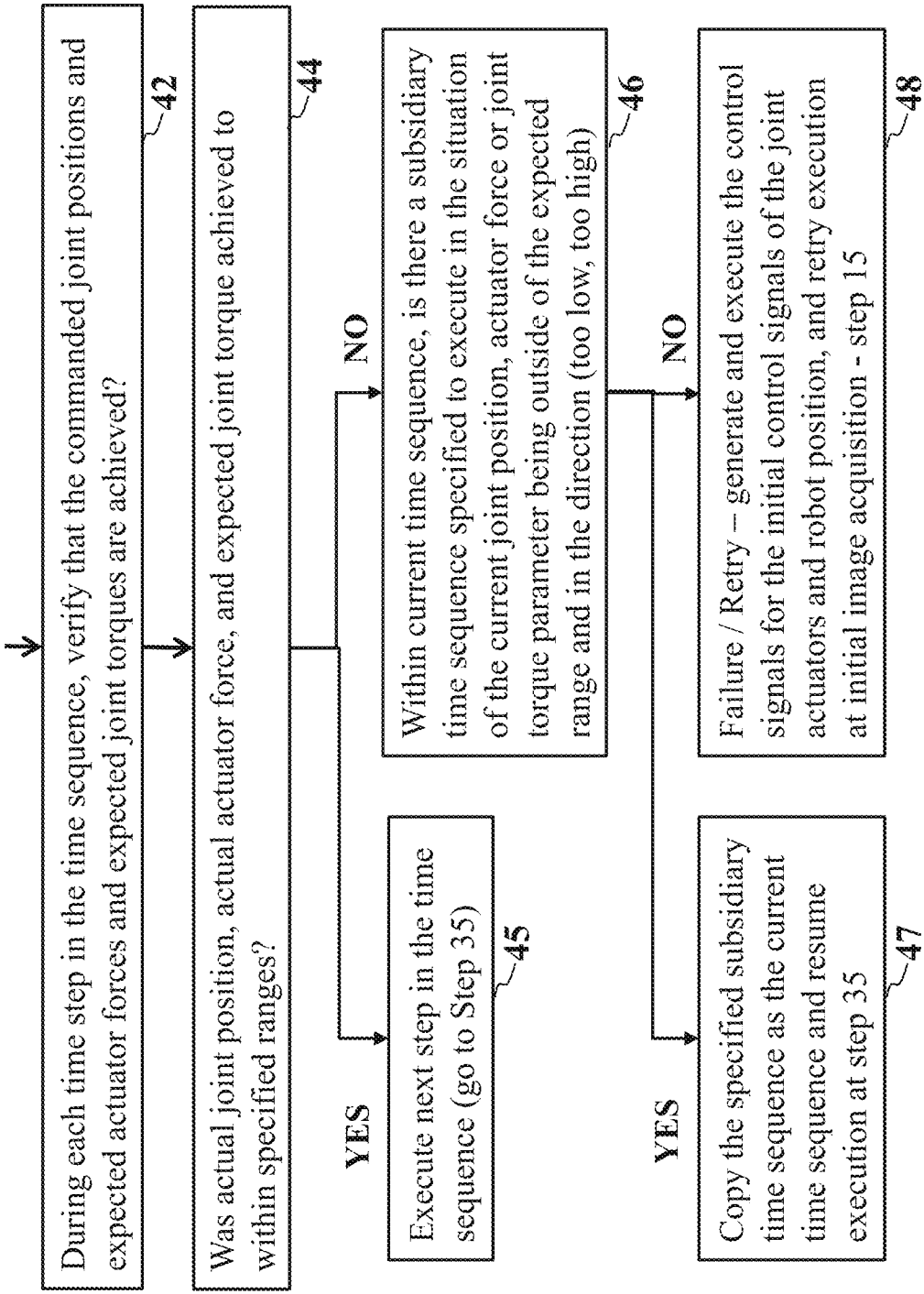
FIG. 1B is a block diagram illustrating flow diagrams of some further defining some steps of FIG. 1A of the soft robot gripper system, according some embodiments of the present disclosure.

FIG. 1B is a block diagram illustrating flow diagrams of some further defines some steps of FIG. 1A of the soft robot gripper system, according some embodiments of the present disclosure. Step 42 of FIG. 1B explains that during each time step in the time sequence, the robot system can be configured to verify that the commanded joint positions and expected actuator forces and expected joint torques are achieved? Step 44 of FIG. 1B asks the question was actual joint position, actual actuator force, and expected joint torque achieved to within specified ranges? Step 45 of FIG. 1B, explains that if, YES, then execute next step in the time sequence (go to Step 35 of FIG. 1A). Step 46 of FIG. 1B, explains that if, NO, then within current time sequence, ask another question which, is there a subsidiary time sequence specified to execute in the situation of the current joint position, actuator force or joint torque parameter being outside of the expected range and in the direction (too low, too high)? Step 47 of FIG. 1B, explains that if, YES, then copy the specified subsidiary time sequence as the current time sequence and resume execution at step 35 of FIG. 1A. Step 46 of FIG. 1B, explains that if, NO, then this can be understood as a failure & retry, so generate and execute the control signals for the initial control signals of the joint actuators and robot position, and retry execution at initial image acquisition—step 15 of FIG. 1A.

Practical Applications, Advantages & Technical Features

The innovative multi-tentacle gripper system includes highly dexterous manipulation of the tentacles, due to the high degrees of freedom (12 DoF) along with optimum positioning for optical and tactile sensors to use the same tentacles to grasp a multitude of different shaped objects. Whereas conventional gripper assemblies are designed with different types of grippers, such that an operator is required to change the gripper type according to a specific grasping capability of that type of gripper which is associated with grasping a unique shaped of the object. However, the innovative multi-tentacle gripper system is capable of grasping different shapes ranging from spherical shapes (eggs, fruit, i.e. oranges, pears, apples), rectangular prism shapes (boxes, ingots), cylinder shapes (shafts, bolts, screws, rods, bar stock, rebar), irregular shapes (sledge hammers, bananas, crankshafts, licorice, baked rolls of bread, raw dough, potatoes), or shaped objects used in outer space (satellite parts, disabled satellites, asteroid & comet fragments). Some industries that can achieve an increased product time and reduced per product unit production costs by incorporating some of the embodiments of the present disclosure including manufacturing environments such as assembly line bin-picking, product assembly and other related organic and inorganic industries robot operations. For example, some of the types of grips for the same multi-tentacles of the innovative multi-tentacle gripper assembly can include: (a) distal wrap; (b) proximal hugging wrap; (c) reverse distal wrap; (d) internal expanding wrap; (e) internal expanding pinch; (f) distal pinch (external distal pinch); (g) proximal pinch. Wherein, the innovative multi-tentacle gripper can grasp objects ranging from very small objects such as six millimeter (M6) size bolt (or a bolt that is less than ¼ of an inch in size), as well as up to a very large object such as an industrial shop vacuum cleaner filter (or objects sized at 150 mm or about 6 inches) with a encircling grip.

The multi-tentacle grippers can grasp a multitude of different sized objects, a ranged of weighted objects and a range of different shaped objects, which eliminates a need for changing gripper types. This is an important manufacturing/operator time saving feature within industries for robot automation and overcomes the longstanding conventional problems of conventional gripper assemblies being required to change the type of gripper for different shaped, sized and weighted objects. Further, a lack of high dexterity in a conventional gripper assemblies lead to lost operation time in completing projects/tasks, damage or failure in completing the operation/task, damage robot components or an increased robot component(s) maintenance expenses, which is experienced with many conventional non-dexterous grippers. In contrast, the innovative high dexterity innovative multi-tentacle gripper system of the present disclosure overcomes these limitations resulting in an increase in an amount of production/operator time in the manufacturing processes and other industries using robot automation.

Some gripping actions instructions can be specific to grasping with a level of fine motor control necessary to hold a pen, a small screw, while controlling an amount of gross motor strength capable of holding a sledgehammer due to the unique structure designs of the soft robot gripper. Other aspects of the gripping actions instructions include an amount of controllable gripping span range capable of holding objects having a width and length range, to move a shop-vac air filter, where existing conventional soft robotic technologies fail to provide such controllable gripping span ranges of the same size. Other unique aspects of the soft robot gripper included mechanical structural designs that allowed for the tentacles to have coordinated gripping actions to grip/grasp target objects in a precise dexterous manipulation that is safe and controllable. At least one realization realized during experimentation is that the tentacles needed to be light weight in design, strong in terms of durability and withstand longtime operational wear and tear, to meet today's gripper performance level.

Figure 1C:
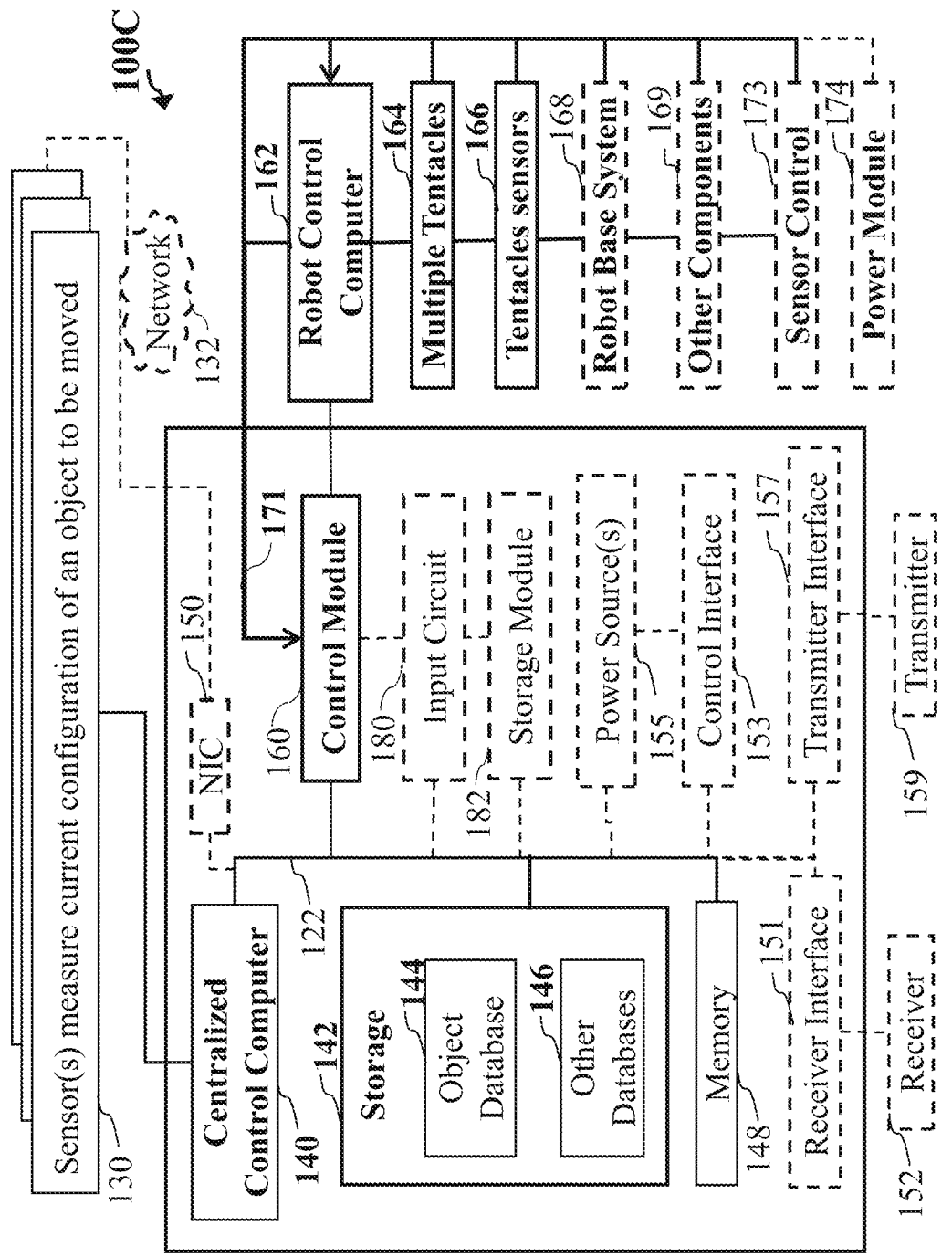
FIG. 1C is a schematic diagram illustrating some components for a centralized controller system of the soft robot gripper system of FIG. 1A, according to some embodiments of the present disclosure.

FIG. 1C is a schematic diagram illustrating some components for a centralized controller system 100C of the soft robot gripper system of FIG. 1A, according to some embodiments of the present disclosure. Contemplated is that components of FIG. 11 and FIG. 12 can be combined into FIG. 1C, or some combination of components of FIG. 1C, FIG. 11 and FIG. 12, depending upon a user set of requirements. A centralized control computer 140 of FIG. 1C can be connected to sensors 130 located within an environment (not shown) and positioned within a sensing distance of at least one object (not shown) to be moved by the centralized control computer 140. Other sensors can be sensors embedded in one or more tentacles or sensors mounted on the robot system or sensors located in an area of the workspace. Some of the other sensors can include cameras, video cameras, speed sensors, light sensors, environmental related sensors (i.e. temperature, humidity, fire, air, water, barometer sensors, etc.). The other sensors can obtain target object data including data from imaging or optical sensors that can determine physical characteristics, such as size, shape, position, orientation. Other sensor data can include outer surface textures, porosities and a degree of grip-ability of the object, i.e. smooth, wet, slick, etc., based on observing the outer surface of the object. Some of the other sensors can include distance sensors, depth sensors, force sensing, tactile sensing, pressure sensing, voltage sensing, conductance sensing, ultrasonic sensing, x-ray sensing, or other sensing), such as to determine physical aspects of an object to be grasped. Other sensing data can be obtained associated with the object to be grasp deformability and weight. The sensors 130 and other sensors can be hardwired and/or wireless, connected to a network 132 that is within an operating distance range of the sensors 130 and the other sensors.

The centralized control computer 140 is connected to a bus system 122 that connects to storage 142. The storage 142 can include an object database 144, and other databases 146. A memory 148 is connected to the bus system 122, along with a receiver interface(s) 151, a receiver(s) 152 and a power source(s) 155. The power source(s) 155 can be connected to the bus system 122, connected to a control interface 153, or be configure to have a multitude of other configurations, all of which, is contemplated depending on the specific user/operator intended specific needs for operations. It is possible the power source(s) can be electric, renewable energy sources, chemical, as well as directly connected to the soft robot gripper system 100D, have a multiple external power sources of different types, or both. A transmitter interface(s) 157 and transmitter(s) 159 are connected to the bus system 122. Also, a network interface controller 150 (NIC, also known as a network interface card, network adapter, LAN adapter or physical network interface, and by similar terms, is a computer hardware component connecting a computer to a computer network) is connected to the bus system 122 and can be in communication with a network 132 or other different types of wireless networks (not shown). Again, depending upon the special needs for operation & sensitives needed by a user/operator for their intended use.

Still referring to FIG. 1C, a control module(s) 160 can be connected to the bus system 122. The control module(s) 160 can be connected to a robot control computer(s) 162, that assist in directing components of the robot control computer 162. Some components can include, by non-limiting example, multiple tentacles 164, tentacle sensors 166, robot base system 168, and other robot related components 169, which all can be connected to the robot control computer(s) 162, and/or the control module 160, via 171. The control Module 160 can be configured from robot control computer 162 to check a multi-tentacle force status once, and report back, thereby confirming or refuting a grip of an object (not shown), or to continuously monitor the multi-tentacle operational status at frame rates and interrupt the robot control when the multi-tentacle indicates either a good or an invalid grip. Contemplated is that the robot control computer can have a power module 174, that can include any power source that provides power to the robotic system such as a power adaptor or a rechargeable battery pack depending on the user specific requirements.

Still referring to FIG. 1C, the centralized control computer 140 can implement or execute stored instructions that are stored in memory 148, storage 142 or access from a cloud storage via the network 132, in particular, the centralized control computer 140 can access the prestored data including data from the object database 144, the instruction database 146, or other stored data from other databases (not shown), as noted above. Contemplated is that some embodiments of the present disclosure can have a centralized controller designed with control architectures to obtain and receive data that can be stored in databases and later accessed by the centralized controller. Wherein, data for the databases can be associated with received data from third parties, past operational soft robot gripper data, sensed data sensed from sensors within an environment of the object, and any other data associated with the soft robot gripper operation, maintenance, management, performance, data associated with adaptability methods to new concepts, etc. or data not associated with the soft robot gripper.

The robot control computer 162 can command each tentacle of the multiple tentacles 164 to move long an X axis, Y axis or Z axis 625 (see FIG. 6), to open, close the multiple tentacles or some other action command. Contemplated is that the centralized controller system 100C can include a sensor control computer 173 connected to the tentacles 164, tentacle sensors 166, robot base system 168, and other components 169. The sensor control computer 173 can include a hardware processor (not shown) connected a memory (not shown) that includes stored software (not shown) and pre-learned XY sets database that includes labels and surface force values. The hardware processor (not shown) implement or execute stored instructions that are stored in memory (not shown), and when any sensor data is received, the received data can be compared to stored data, and send sensor data/signals, such warning messages, a level of grasp/grip by one or all tentacles, etc., to the robot control computer 162 or other components of the system 100C.

Figure 7:
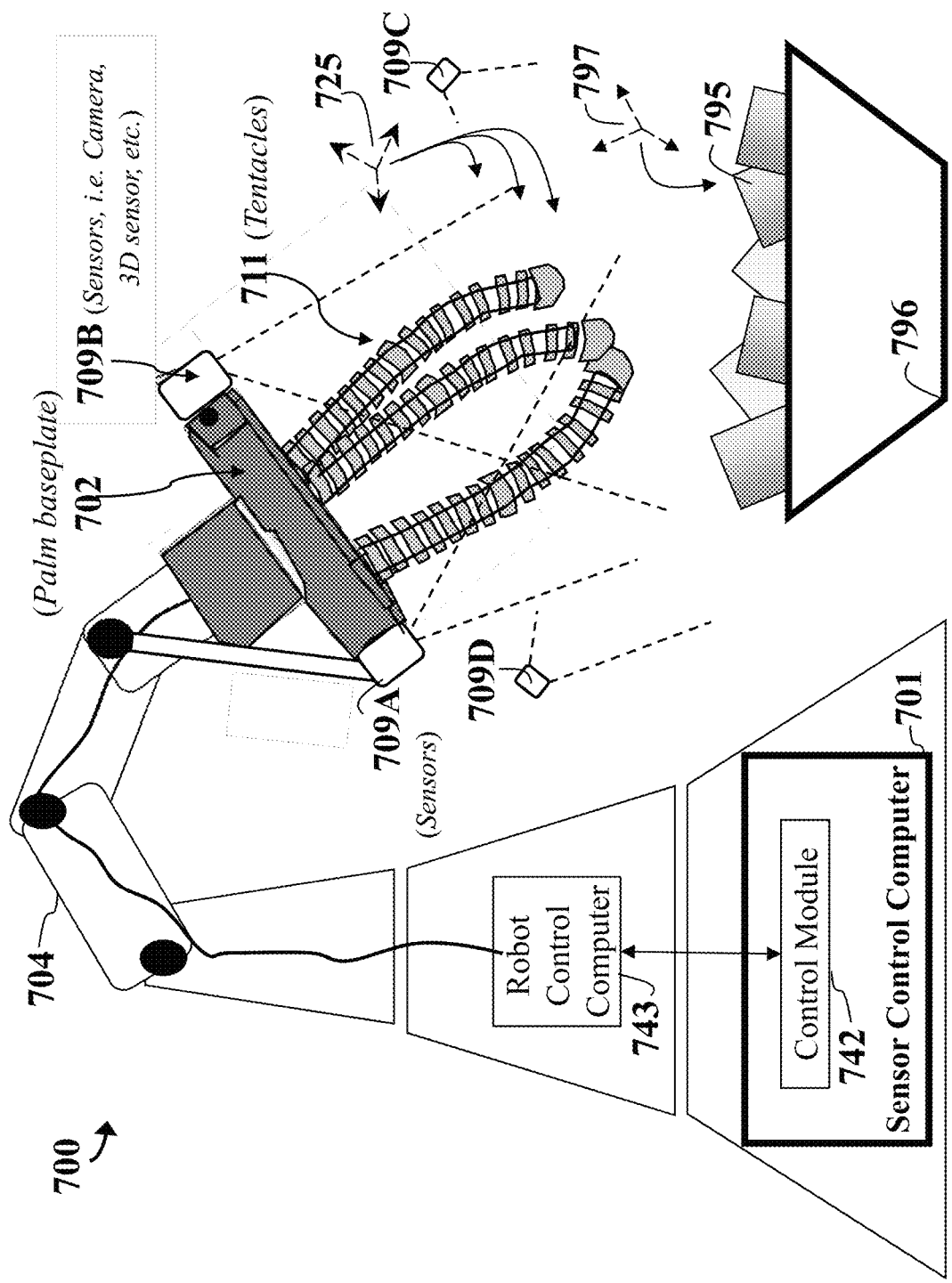
FIG. 7 is a schematic diagram illustrating an embodiment of a robot assembly including incorporating the soft robot gripper system along with elastomeric sensors on the palm base plate, according to some embodiments of the present disclosure.

Contemplated is that the sensor control 173 of FIG. 1C can be used to determine the target object 796 of FIG. 7 location and orientation in the bin 796 of FIG. 7. The sensors 709A-D can be configured as cameras that generate images for after tentacles grasping analysis such as determining if the tentacles has a certain type of tentacles grip, grasp one or more target objects 795 from the bin 796 of FIG. 7, or both, along with a position and an orientation of the grasped target object. Contemplated is that other malfunctions and errors could happen during the processing of the target objects by the multiple tentacle gripping system associated with bin grasping or some other associated actions. At least one reason the sensor control 173 of FIG. 1C has been utilized is because objects can become stuck together or entangled, and if not recognized early and removed, such object entanglement, will cause several errors to occur. For example, if the tentacles had grasp multiple objects, the multiple objects could fall from the grip, or the multiple objects could crash into other components, in either scenario, there is a potential of lost per unit cost, lost manufacturing time, cause safety problems to human workers, etc. Software can be associated with the sensor control system that can use images from cameras to detect the position and the orientation of the target object in the tentacles after the tentacles have grasped the target object from bin 796 of FIG. 7. This software can be configured multiple different ways including being the same software that detects the locations of the target object in the bin 796 of FIG. 7 or separate from that software. This software may be in a controller that has or is a computing device, or possible in a separate computing device. Contemplated is the that cameras could be smart cameras that built in them a computing device.

Still referring to FIG. 1C, the control or controller module 160 can include different applications and programs for implementing methods of the present disclosure. For example, the control module 160 can include applications for processing information received from the robot control computer 162, such as generating graphs, operation related models including 3D models of the environment where the robot system is located as well as an object specific type of model. The control module 160 can include applications for interpreting control inputs, or input signals, received via the input circuit/interface module 180, storage module 182, and generating commands/actions at the robotic control computer 162. A user can display can be configured for views and models of the target object. Also, the displays can also be configured to operate to receive control inputs from various input devices, (i.e. voice and/or audio recognition software, touch screen and joystick controller. Other example input devices for example related to co-operation or working side-by-side with humans, can include neural and brain implant controls, and motion and/or gesture-tracking systems. At least some advantages of having an efficient centralized controller architectural design for industrial manufacturing applications, all of which required extensive engineering, in order to integrate the knowledge of operational theories and practices essential to industrial/manufacturing issues that impact stability, safety, and serviceability.

Figure 2A:
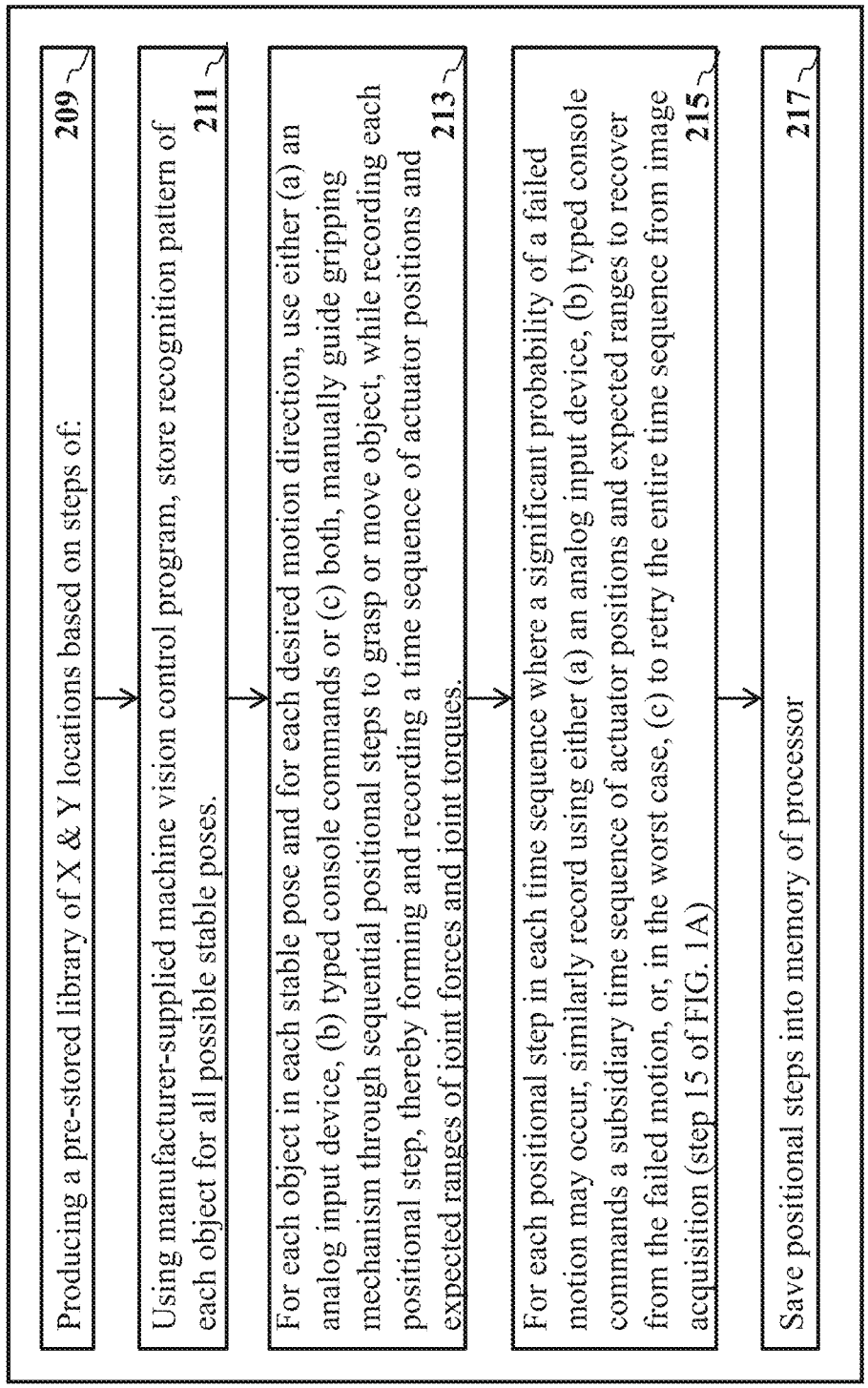
FIG. 2A is a block diagram illustrating some steps for producing a prestored library of objects, such that when comparing a measured current configuration of an object from sensors, to the prestored library of stored objects in an object database, a stored object is configured to be identified, according to some embodiments of the present disclosure.

FIG. 2A is a block diagram illustrating some steps for producing a prestored library of objects, such that when comparing a measured current configuration of an object from sensors, to the prestored library of stored objects configurations in an object database, that a stored object configuration can be identified, according to some embodiments of the present disclosure. For example, step 209 of FIG. 2A includes some steps for producing the prestored library. Step 211 of FIG. 2A includes using manufacturer-supplied machine vision control program, and a store recognition pattern of each object for all possible stable poses.

Step 213 of FIG. 2A explains that for each object in each stable pose and for each desired motion direction, use either (a) an analog input device, (b) typed console commands or (c) both, manually guide gripping mechanism through sequential positional steps to grasp or move object, while recording each positional step, thereby forming and recording a time sequence of actuator positions and expected ranges of joint forces and joint torques. Wherein a stable pose is understood as a pose of the gripped object such that any relative motion between the object and the grippers would require one or more gripper to open, or the forces on the object external from the gripper, (i.e. such as gravitation forces, rapid acceleration, or impact with another object or thing within the workspace), to exceed a force level that would cause an amount of frictional slippage between the object and the gripper.

Step 215 of FIG. 2A includes for each positional step in each time sequence where a significant probability of a failed motion may occur, similarly record using either (a) an analog input device, (b) typed console commands a subsidiary time sequence of actuator positions and expected ranges to recover from the failed motion, or, in the worst case, (c) to retry the entire time sequence from image acquisition (step 15 of FIG. 1A). Step 217 of FIG. 2A includes storing the set of X & Y object locations with the defined labels as one of the pre-stored library of X & Y location sets stored in the memory.

FIG. 2B is a block diagram illustrating some sensor data that can generated along with some types of sensors 288 that can be used for embodiments, according to some embodiments of the present disclosure. Throughout the disclosure the sensor data and some types of sensors are disclosed as well as in the figures.

Figure 3A:
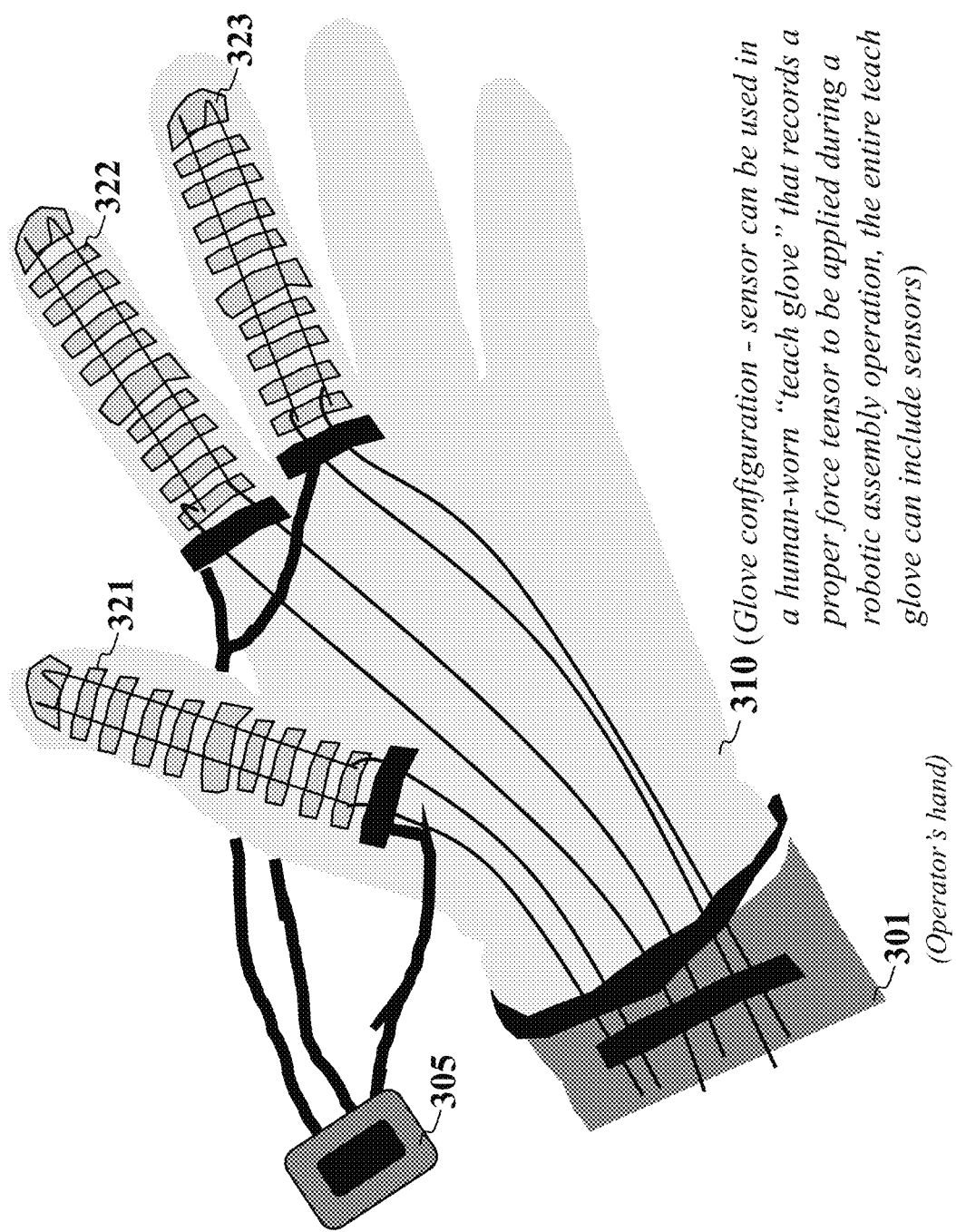
FIG. 3A is an illustrating an embodiment of tentacles attached to a human-worn "teach glove", used to create a set of movement instructions specific to each pose of an object, in order to move the object, such that the set of movement instructions can be stored in a movement instruction database, and that each object can include multiple poses, according to some embodiments of the present disclosure.

FIG. 3A is an illustrating an embodiment of tentacles attached to a human-worn "teach glove", used to create a set of movement instructions specific to each pose of an object, in order to move the object, such that the set of movement instructions can be stored in a movement instruction database, and that each object can include multiple poses, according to some embodiments of the present disclosure. For example, tentacles 321, 322, 323 attached to a human-worn "teach glove" 310, can be used to create a set of movement instructions specific to each predetermined movement action for each object of many objects, to move the object, such that the set of movement instructions can be stored in the movement instruction database, according to some embodiments of the present disclosure. Some benefits/advantages of the multiple tentacles 321, 322, 323 being used in a human-worn "teach glove" 310, is that the movements of the multiple tentacles 321, 322, 323 of the human wearing the "teach glove" 310 can be recorded along with a proper force tensor to be applied during a later robotic assembly operation.

Still referring to FIG. 3A, optionally, the robot system of the present disclosure can be used with other robot devices via a network, so as to be able to accomplish different coordinated human-like, tasks, that can be stored in a movement instructions database and later accessed and utilized. For example, the other robot device may include devices of which the robot system of the present disclosure can be implemented into, so as to operate cohesively to accomplish a task (see FIG. 6 the robot assembly device having a robot control computer 603, robot control module 602 and robot arm 604 that is coordinated with the multiple tentacles 608 of the present disclosure). As noted above, a teaching glove 310 can be fitted to a human operator 301 to provide control by manipulating a set of sensors 321, 322, 323 attached to the teaching glove 301. The human operator 301 movements via the teaching glove 310 is sensed to provide sets of signals to be converted to a sequence of movements or movement instructions to complete a task. The robot system of the present disclosure in the network of robotic devices can accomplish a portion of a human-like task in a specific environment while the remaining robotic devices in the network of robotic devices may accomplish the remaining portions of the human-like task(s) in the specific environment. In such an arrangement, the sequence of movements or movement instructions can be converted to sets of sequential movement instructions that is stored in a library or movement instructions database. The robot system of the present disclosure could then carry out the motions as though they were consistent with the operator motions, via accesses the stored set of movement instructions or program, and if working with other robotic device, the robot system can act in a coordinated fashion with the other robotic devices to complete human-like tasks.

For example, the centralized robot control system 100C of FIG. 1C can include a plurality of control sensors 321, 322, 323 of FIG. 3A, to sense motion from the operator's hand 301 wearing the teaching glove 310. When the operator's hand 301 moves, the control sensors 321, 322, 323, sense the motion and generate an output signal representative of the motion. Control sensors 321, 322, 323, for example, may be accelerometers or digital positioning devices that provide three-dimensional coordinates for the sensors. As another example, the sensors 321, 322, 323 may measure angular rotation or pressure or force of the operator's 301 joints. The plurality of control sensors 321, 322, 323 are attached to the teach glove 310 that the operator 301 is wearing. For example, a radar or LIDAR, or other 3D depth-sensing device may be placed a few feet from the operator and pointed towards the operator to sense a portion of the motion. Various combinations of types of sensors can be used to sense the motion of the operator 301. The centralized robot control system 100C of FIG. 1C can be communicatively connected to the plurality of control sensors 321, 322, 323 and convert the motion sensed by the plurality of control sensors 321, 322, 323 into a collective set of commands. The collective set of commands actuate the multiple tentacles of the robot system of the present disclosure.

Figure 3B:
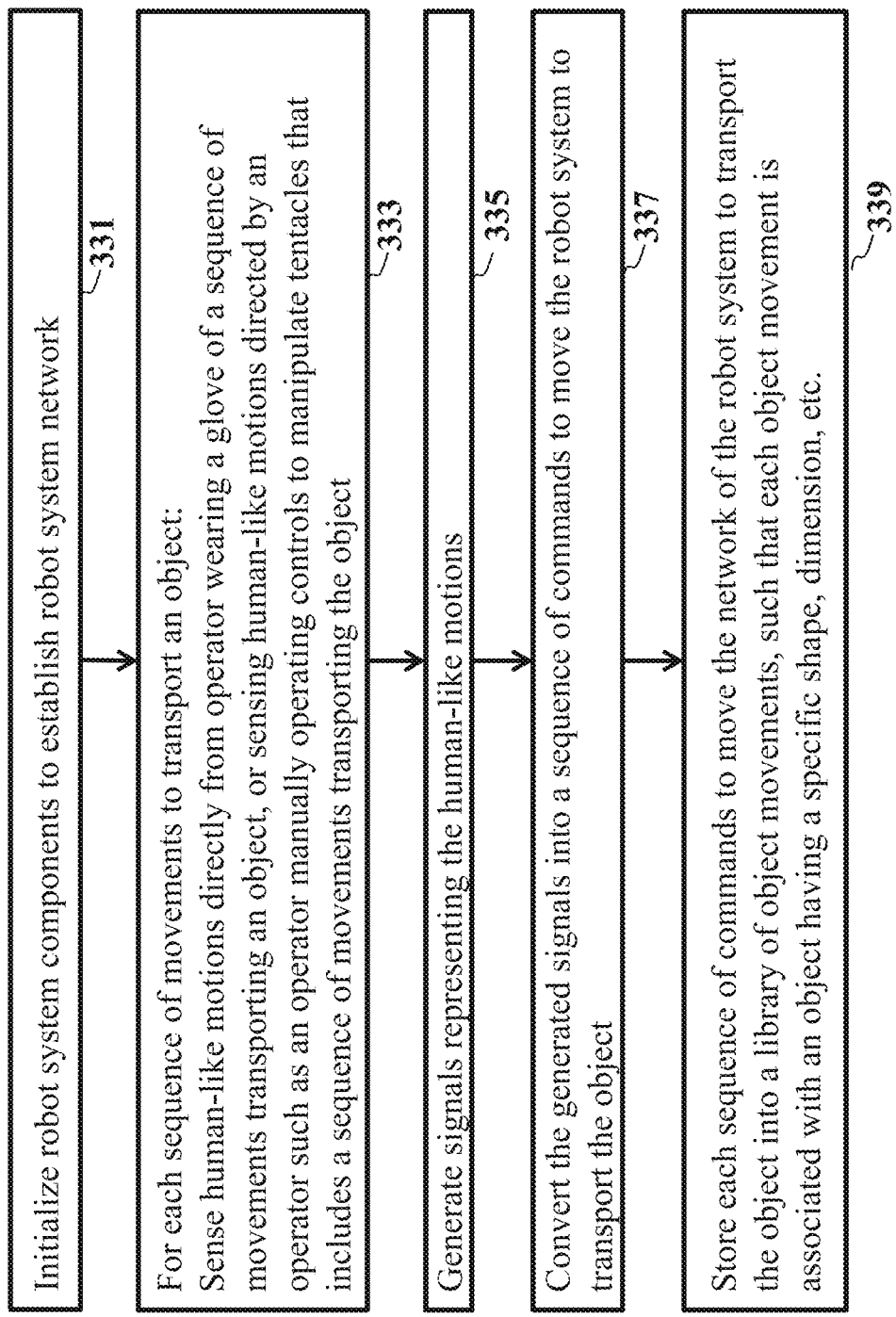
FIG. 3B is a block diagram illustrating some method steps using the human-worn "teach glove" of FIG. 3A, to create the set of movement instructions for each pose of the object, such that each pose has an associated set of movement instructions, according to some embodiments of the present disclosure.

FIG. 3B is a block diagram illustrating some method steps using the human-worn "teach glove" of FIG. 3A, to create the set of movement instructions for each pose of the object, such that each pose has an associated set of movement instructions, according to some embodiments of the present disclosure. Step 331 of FIG. 3B includes Initialize robot system components to establish robot system network. Step 333 of FIG. 3B includes that for each sequence of movements to transport an object, can include the step of sensing human-like motions directly from operator wearing a glove of a sequence of movements transporting an object, or sensing human-like motions directed by an operator such as an operator manually operating controls to manipulate tentacles that includes a sequence of movements transporting the object. Step 335 of FIG. 3B includes generating signals representing the human-like motions. Step 337 of FIG. 3B includes converting the generated signals into a sequence of commands to move the network of the robot system to transport the object. Step 339 of FIG. 3B includes storing each sequence of commands to move the network of the robot system to transport the object into a library of object movements, such that each object movement is associated with an object having a specific shape, dimension, etc. Optionally some other steps of using the teaching glove method that senses motion from an operator wearing a teaching glove, can include generating one or more signals representative of at least a portion of the motion. Converting the one or more signals into a collective set of commands or movement instructions to actuate the multiple tentacles, or actuate the multiple tentacles and other devices within a network of robotic devices, wherein the collective set of commands or the movement instructions is functionally equivalent to the motion. Communicating the collective set of instructions or the program to the centralized control system and the network of robotic devices such as a robot assembly device configurable to operate with the robot system.

Figure 4B:
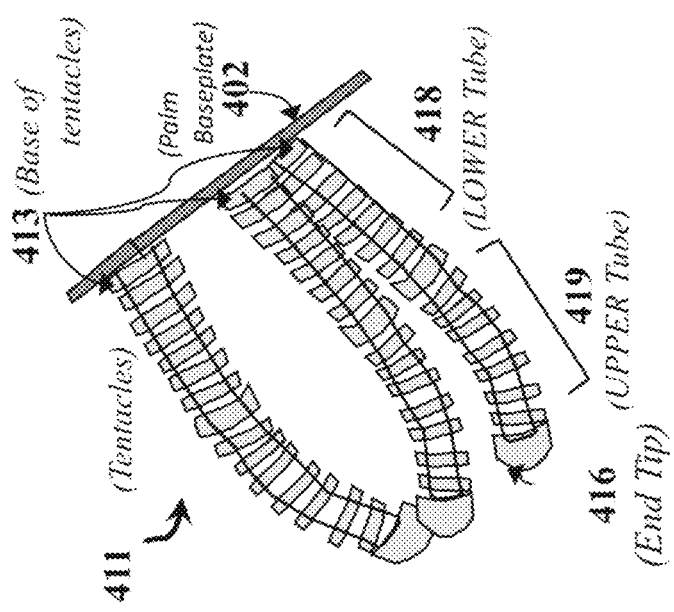
FIG. 4B is a schematic illustrating the tentacles of the soft robot gripper of FIG. 4A, according to some embodiments of the present disclosure.
Figure 4A:
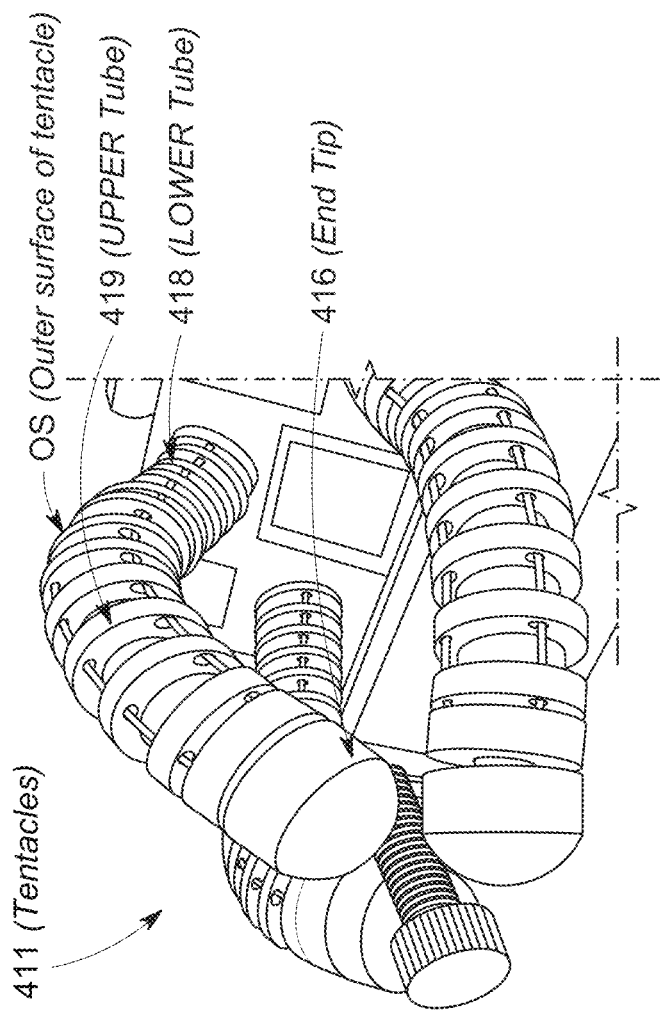
FIG. 4A is a picture illustrating the tentacles of the soft robot gripper, according to an embodiment of the present disclosure.

FIG. 4A is a picture illustrating multiple tentacles 411 of the soft robot gripper, according to an embodiment of the present disclosure. Each tentacle 411 includes a lower tube 418, an upper tube 419 and an end tip 416. Contemplated is that each tentacle 411 can have individual lengths, widths (radius), or both, to provide a unique grasping type, if a user requires such tentacle configuration for an application. Contemplated is that one or more portions or the entire outer surface OS of the tentacles 411 can be configured to include at least one low friction material such as a polymer to reduce a level of coefficient of friction between the outside surface OS of the tentacles 411 and the gripped object, and thereby reduce a gripper's maximum frictional grip strength. Experimentation later taught that by coating one or more portions of the outer surfaces OS of the tentacles 411 with compatible material, especially a high friction elastomer material(s), i.e. Tool Dip', resulted in restoring the desirable high coefficient of friction on the gripping surface. Also gained from experimentation is that portions of, or the entire outer surface OS of the tentacles 411 could be configured with dimples, ridges, or patterns of textures, to enhance or increase a frictional grip strength of the tentacles. Wherein, sensors can be embedded in one of the dimples, ridges or patterns of textures, one or more portions of the outer surface OS of the tentacle 411.

FIG. 4B is a schematic illustrating the tentacles 411 of the soft robot gripper of FIG. 4A, according to some embodiments of the present disclosure. Wherein a palm baseplate 402 is located at the tentacle base 413 of the tentacle 411, such that the palm baseplate 402 contacts the tentacle base 413 of the lower tube 418, wherein the upper tube 419 includes the end tip 416.

Referring to FIG. 4A and FIG. 4B, contemplated is that outer surfaces OS of FIG. 4A of the multiple tentacles 411B and palm baseplate 402 can uniquely be designed per user application. For instances objects may include one or a combination of: non-uniform or uniform shapes, different levels of deformability, different levels of flexibility, different levels of strength, size, sensor loadout, chemical resistance, frictional characteristics, texture, etc. These different types of objects present challenges for conventional gripper systems to grasp or move the object, which creates a need to discover new tentacle structures to overcome these challenges. Some embodiments of the present disclosure have been designed to have outer surfaces OS of the tentacles 411 and palm baseplate 402 to overcome these challenges where the conventional gripper systems have failed Each of the innovative tentacle 411 and palm baseplate 402 designs are configured to provide unique gripping surfaces specifically directed to enhance a level of grasping and a level of moving an object for the different types of above noted challenges, when compared to a level of conventional gripper grasping the same object. Some unique gripping surfaces can include outer surfaces with one or a combination of dimples, protrusions, a surface portion having a degree of rough surface and smooth surface, shaped extensions (such as rods, levels, etc.), designed 2D or 3D configuration, different design patterns of dimples or protrusions or both. Further, some outer surface designs can have one or patterns of ridges, rough surfaces, different shaped ridges/bumps/divots, etc., that can be structure to enhance one or a combination of a level of grasping force/power, grasping grip, etc.

Figure 4C:
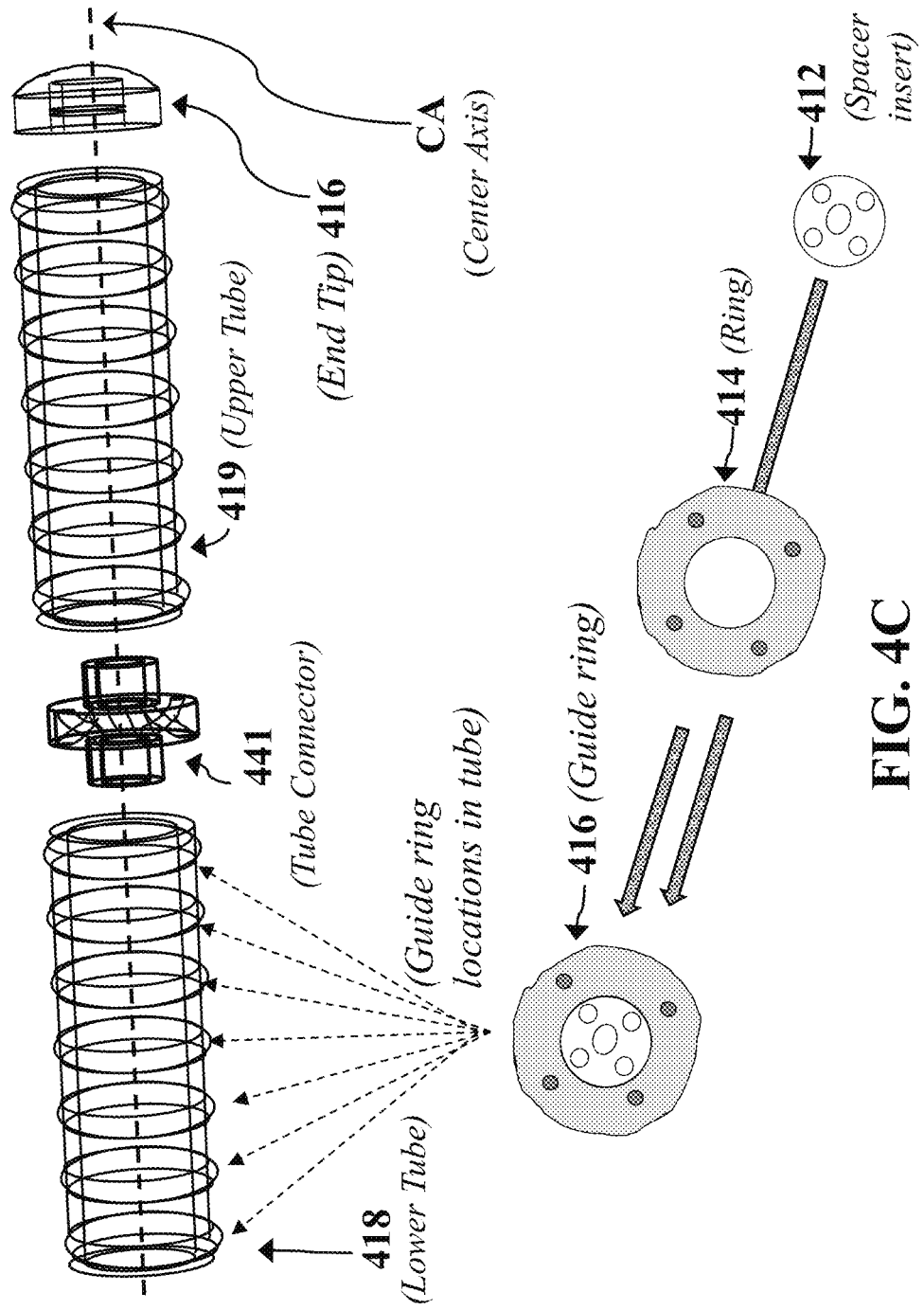
FIG. 4C is a schematic illustrating some components of the soft robot gripper of FIG. 4A, according to some embodiments of the present disclosure.

FIG. 4C is a schematic illustrating some components of the soft robot gripper of FIG. 4A, according to some embodiments of the present disclosure. For example, a spacer 412 is positioned in a center of a ring 414 resulting in a guide ring 416. The lower tube 418 and the upper tube 419 both include guide rings 416 along a center axis CA. The lower tube 418 and the upper tube 419 are joined by a tube connector 441, wherein the upper tube 419 has an end tip 416 fastened to a distal end of the upper tube 419.

An aspect of each tentacle is that sensors can be implemented along the lower tube 418, tube connector 441, upper tube 419 and end tip 416. For example, contemplated is that the spacer 412, ring 414 and end tip 416 can have imbedded sensors (not shown). Some types of sensors, by non-limiting example, can include also include real time sensor, such that the sensor can include: (a) a level of cable tension force; (b) a level of movability of the cables; (c) an operational wear sensor for the cables, frayed or broken cable strands, etc.; (d) an angular rotation measurement; (e) a pressure sensor; (f) force sensor; (g) temperature; (h) moisture; (i) coefficient of friction sensor; (j) electrical surface conductivity sensor, i.e. so as to determine if object is leaking a fluid, such as juices from meat, melting fluids from nominally frozen objects, or other fluids from the workspace environment (i.e. water, oil, grease, solvent, deposits from smoke and dust, etc.). These sensors can provide data to provide a level of a measured sensitivity back to the soft robot gripper system (i.e., robot control computer 162, control module 160, sensor control 173, tentacle sensors, 166, etc. of FIG. 1C), for aspects associated with operational, management, maintenance or some other concern associated with the system 100A or any component or other system that the gripper system may be integrated into. Further, the sensors can be configured to generate sensor data that can be applied to a tentacle state function to determine a state of the tentacle. Also, the end tip 416 can include sensor(s) of one of an inertial sensor, a micro electro-mechanical system device, an accelerometer, a magnetometer, a tactile sensor, and an electromagnetic positional tracker.

Some embodiments can be configured with distal joint sensors implemented into a joint for each tentacle or a distal joint of each tentacle. The term "joint" can include hinge-type joints, ball-and-socket joints, sliding rail joints, rotational wheel-like joints, and elastomeric flexible joints such as the flexible lower tube 418 and upper tube 419. The joint sensors can be configured to generate data, the data can be applied to a joint state function, so as determine a state of the distal joint, wherein the distal joint sensors may be of a type that are distributed shape sensors or linear displacement sensors. Wherein the linear displacement sensors provide data for cables associated with the distal joint, such that each linear displacement sensor provides data so as to determine a distance that a cable transmission moves, and upon determining the distances for all the cables via the linear displacement sensor, the distances for all the cables is indicative of movement of the distal joint. Further, each linear displacement sensor can include one of a linear voltage differential transformer, a Hall effect sensor and a magnet, a slide potentiometer, a reference element coupled to the cable transmission at a reference point, so as to measure movement of the reference element as an indication of movement of the cable transmission. Contemplated is a actuator cable wear sensing sensor using measurement of the electrical resistance of the actuator cable when the gripper is not gripping an object to detect actuator cable wear, and the same actuator cable resistance measuring sensor to use the cable as a strain gauge resistance element to measure gripping force when gripping an object. Further, sensor data can be environmental sensors located approximate the tentacles, or sensors such as cameras, video cameras, speed sensors, light sensors, distance sensors or depth sensors.

FIG. 4D is a schematic illustrating the cable configuration for the lower tube spacer & rings 416 of FIG. 4C of the soft robot gripper of FIG. 4A and FIG. 4B, according to some embodiments of the present disclosure.

Referring to FIG. 4C and FIG. 4D, the lower tube rings 414 of FIG. 4C include cable pathways and cables A1, A2, A3, A4 of FIG. 4D that control flexure of the lower tube 418 of FIG. 4C, and the lower tube spacers 412 of FIG. 4C include cable pathways and cables D1, D2, D3, D4 of FIG. 12D that do not alter flexure of the lower tube 418 of FIG. 4C but will offer flexure of the distal upper tube 419 of FIG. 4C. Wherein the pathway D9 of FIG. 12D and E9 of FIG. 4E can be used for central wiring associated with sensors in the upper tube 419 of FIG. 4C, lower tube 418 and end cap 416 of FIG. 4C.

FIG. 4E is a schematic illustrating the cable configuration for the upper tube guide ring of the soft robot gripper of FIG. 4A and FIG. 4B, according to some embodiments of the present disclosure. Referring to FIG. 4C and FIG. 4E, the upper tube 419 of FIG. 4C have guide rings 416 with cable pathways F1, F2, F3, F4 for cables which control flexure of the upper tube 419 of FIG. 4C (i.e. the cables actuate the upper tentacle section and terminate at a distal guide ring of the upper tube approximate cable pathways F1, F2, F3, F4). Wherein the upper tube spacers 412 can include cable pathways E1, E2, E3, E4 that can provide pathways for to a second connector attached to a third tube section. Further, the center hole E9 can be utilized for wiring for sensors or for some other action device that can provide data associated with the end cap 416 of FIG. 4C.

Figure 4F:
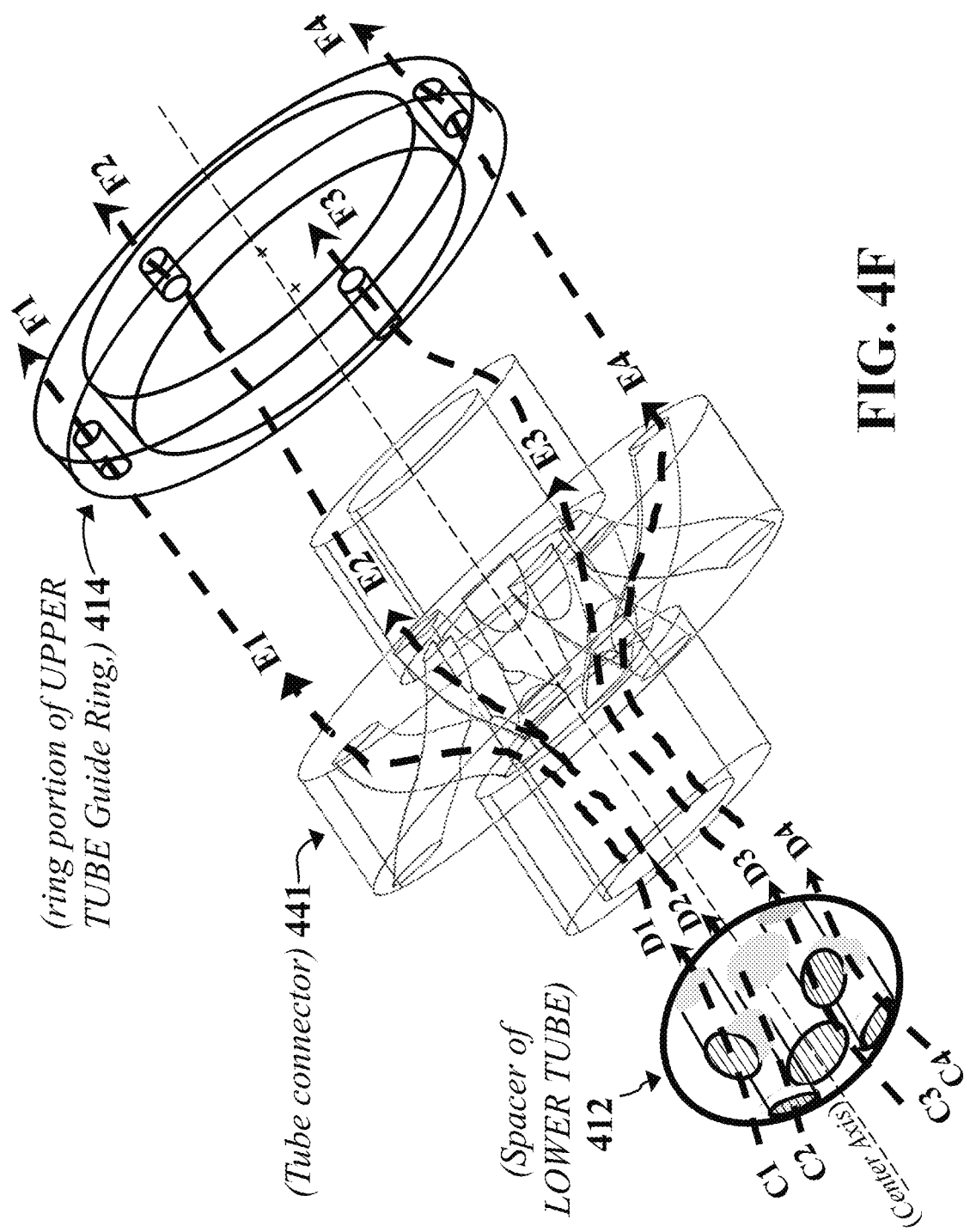
FIG. 4F is a schematic illustrating the cable configuration starting from entering a distal guide disc lower tube spacer (C1-C4) coining from the palm baseplate of FIG. 4B toward the end tip of FIG. 4B, exiting the lower tube spacer pathways and entering the tube connector via a center thru-hole (D1-D4), through the transfer channels and exiting the transfer channels of the tube connector and entering the upper tube ring pathways (E1-E4), and exiting the upper tube ring pathways (F1-F4), according to some embodiments of the present disclosure.
Figure 6A:
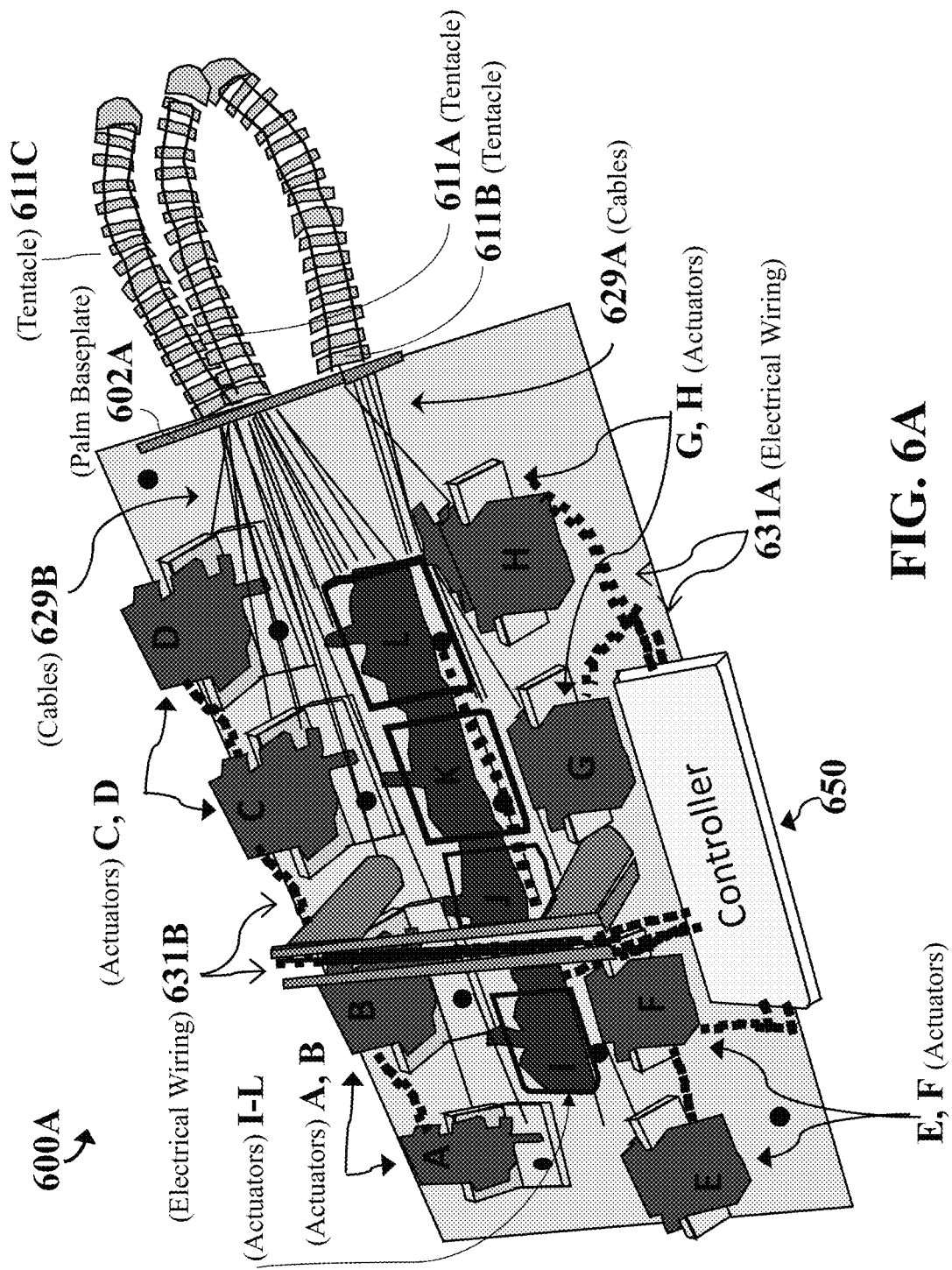
FIG. 6A is a schematic illustrating a soft robot tentacle gripper system, according to some embodiments of the present disclosure.

FIG. 4F is a schematic illustrating the cable configuration exiting from a distal guide ring of the lower tube spacer 412 (C1-C4), wherein the cables are fixed to actuators A-L of FIG. 6A, extend through apertures of the palm baseplate of FIG. 6A, into pathways of the lower tube spacers 1212 and enter the tube connector 441 (D1-D4), exit the tube connector 441 (E1-E4), enter the upper tube guide ring portion 414 (E1-E4), and exit the upper tube guide ring-ring section 414 (F1-F4), according to some embodiments of the present disclosure. At least one realization included separating the lower tube cable-controlled transmission system from the upper tube cable-controlled transmission system. Observed from experimentation was that the lower and upper cable-controlled transmission systems had an almost frictionless motion of the tentacles' cable transmission mechanism. Wherein the lower 418 and upper tube 419 sections and tube connector 441 had a minimum bend radius and no kinking or otherwise constrained motion that was observed. However, in order to come to the above realization there were many prior failed test experiments, which many aspects were learned. For example, some failed test designs positioned the lower and upper cables together in single channel or hole, which resulted in very high friction levels and very poor bending performances. Another failed test design placed the lower cables in one hole in the lower tube and the upper cables positioned in another single hole in lower tube, where the upper cable transitioned through the center thru-hole of the connector, and into upper guide rings that included individual pass thru-holes for each upper cable for the upper tube. However, these failed test designs also demonstrated very high friction levels and very poor bending performances. Thus, gained from these failed test designs was that at least one challenge to overcome in developing the embodiments of the present disclosure required figuring out how to separate the lower cable transmission system from the upper cable transmission system?

Still referring to FIG. 4F, eventfully what was later discovered is that even if there is sufficient physical space in the hole for the cables to run together, as soon as tension was applied to the cables and the tentacle flexed, an negative effect was produced where the cable tension pulled all the cables to one side of the hole, resulting in the cables rubbing on each other. Even though the cables were coated in nylon or uncoated or using smooth steel cables, observed was a very high coefficient of friction that the cables effectively stuck together, causing an unacceptable friction induced load on the servomotors, that resulted in poor performance and other negative effects to the test system. Also observed is that some cables would become slack, then looped underneath a second cable, and when that second cable was subsequentially tensioned, resulted in the first cable being locked in position, causing a negative effect to the tentacle, and some cases failed gripper operation.

Other realizations later gained included designing pathway holes for each cable in both the spacer 412 and ring 414 of the guide ring 416 that allowed for improved tentacle performances with faster actuation, minimum friction, and a minimum an amount of load on the servomotors. Another innovative feature incorporated into the innovative guide rings for some embodiments include using low coefficient of friction materials for the spacers and the rings, i.e. materials including a very low coefficient of friction when placed approximate cables either uncoated or coated. Observed from test experiments was an increase level of performance and an increased tentacle grip strength in very tight tentacle curvature positions/applications. At least one reason for the improved tenable grip strength is believed due to the spacer and ring cable pathways, which provided for the reduced coefficient of friction, when compared to conventional cabling designs and configurations for conventional gripper systems of the same size. Contemplated is that a material type for the spacer and rings can be chosen per application requiring one or more of a higher coefficient of friction type material(s), a higher level of friction durability type material(s), a higher strength type material(s), low weight type of material(s). Also contemplated is that a small or minimum size bushing or bearing could be used as insert between the spacer or ring and the cable, wherein the bushing/bearing could be designed to have a certain level of coefficient of friction material(s), which could be determined by operator's intended required operational goals. Learned from experimentation is that test cables encased in sheaths such as bicycle brake cables and the like, were observed insufficient levels of flexibility, poor performance levels and failed to meet the flexible performance goals of the present disclosure.

Figure 5A:
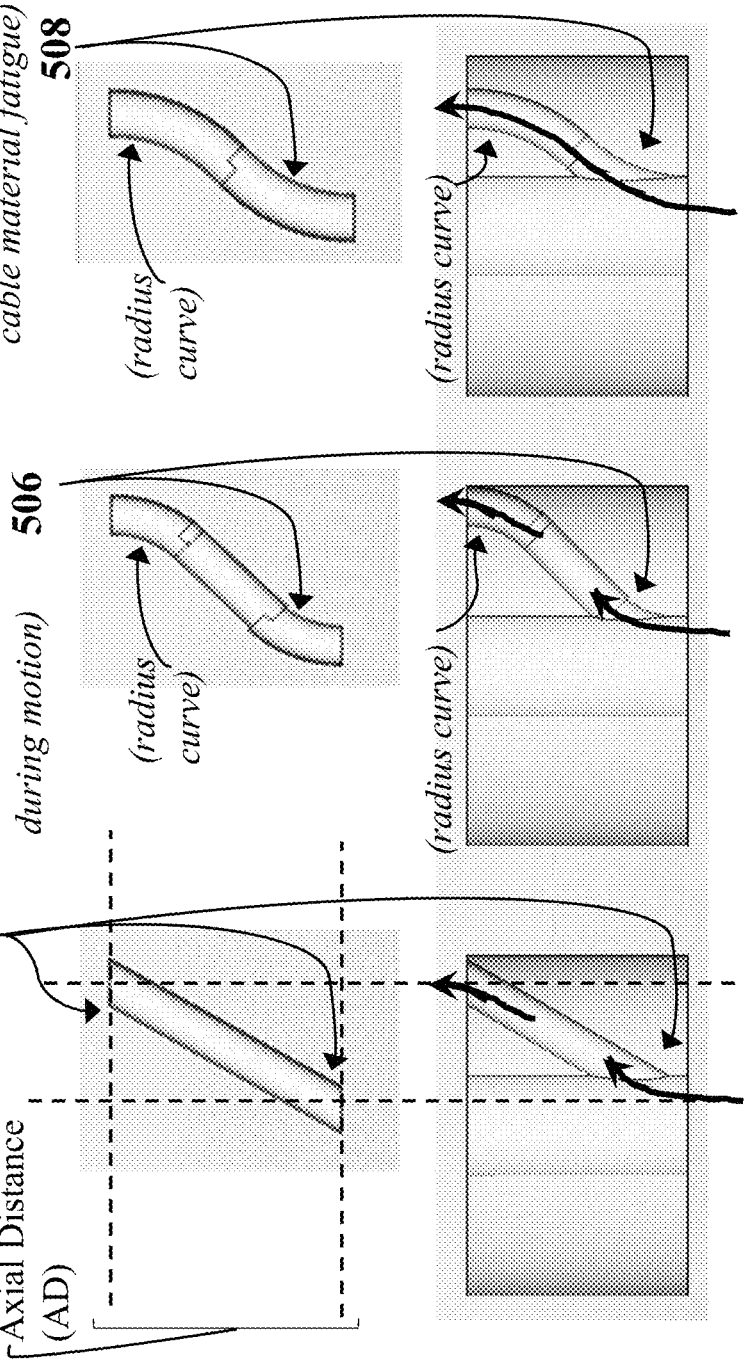

FIG. 5A, FIG. 5B and FIG. 5C are schematics illustrating test experiments of transfer channel configuration, resulting in an optimization transfer channel for the elastic connector 541 which minimizes cable friction and cable material fatigue, according to embodiments of the present disclosure. FIG. 5A illustrates side views of the test cable pathways 504 and 506 of failed test pathways, and a side of the innovative cable pathways used for the embodiments of the present disclosure 508 for the elastic connector 541, and FIG. 5B illustrates an oblique view of FIG. 5A of the failed cable pathways and innovative pathways, and FIG. 5C shows a top view of FIG. 5A. Regarding manufacturing of the elastic connector 541, test case A1 & A2 can be manufactured with a simple drill bit, however, such channel configurations resulted in sharp angled corners 504, 514 of FIG. 5A and FIG. 5B, with a high amount of cable friction that caused damage to the cable material during cable motion. Due to the high amount of cable friction and damage to the cable materials, the test cases A1 & A2 were not desirable for tentacle gripper designs, and thus were not further tested.

Still referring to FIG. 5A to FIG. 5C, test case B1 & B2 incorporated radius curves 506, 516 of FIG. 5A and FIG. 5B at the transfer channel entry and exit apertures. What was learned from testing is that the addition of having the radius curve decreased an amount of cable friction and lessened an amount of cable material fatigue during cable motion. However, in order to incorporate the radius curve required advanced manufacturing techniques such as three-dimensional (3D) printing, or injection molding using cutouts to generate the 3D curve of the preferred transfer channel designed shape. What was later learned upon further testing is that even though the addition of the radius curve lessened the amount of cable friction and cable material damage, the observed amount of cable friction and cable material damage, and cable material fatigue were at levels that failed to provide a sustainable amount of cable friction and cable material performance levels to meet the desired goals, performance aspects and requirements expected for the embodiments of the present disclosure. What was realized from test cases B1 & B2 is that the radius curve needed to be optimized to substantially reduce an amount of flexure of the cable and an amount of cable wear during tentacle motion. Thereby, minimizing an amount of cable material fatigue during operation of the tentacle gripper.

Optimized Transfer Channel Entry/Exit Aperture Cable Pathways

Still referring to FIG. 5A to FIG. 5C, embodiments of the present disclosure include optimized transfer channels based upon a mathematically constructed formula that further increased the radius 508, 518 of FIG. 5A and FIG. 5B of the structural cable pathway design for each transfer channel entry/exit apertures. This formula includes obtaining a measured distance between a passthrough hole of a guide disc, i.e. that a cable exits/enters, to an entry/exiting transfer channel aperture of the elastic connector 541. The reason the distance is measured is to use the measured distance along with a pair of arcs of constant and equal radius, to construct an optimal cable pathway for the entry/exit transfer channel apertures. Such that a maximization of the radius of the pair of arcs within the measured distance, results in a minimization of an amount of side load of the cable generated from a motion of the cables, and concurrently minimizes an amount of transmission friction and an amount of cable flex fatigue during an operation of the tentacle gripper Optimum Cable Pathway Formula The formula for constructing the optimal cable pathway depends upon the axial distance (AD) of FIG. 5A between the entry/exit apertures measured lengthwise along the tentacle and the radial distance (RD) of FIG. 5A between the entry/exit apertures measured parallel to the long axis of the tentacle. The optimal cable pathway begins at the entry aperture location and proceeds along a circular arc to a location AD/2 towards the distal end of the tentacle from the initial entry aperture and transversely offset by RD/2 from the initial entry aperture, arriving at that location at an angle equal to arc tangent of ((AD/2) divided by (RD/2)), the optimal cable pathway continues from this location to of the exit aperture along a circular arc arriving at the exit aperture at an angle zero. The diameter of the cable pathway can be slightly larger than a cable diameter plus a minimal diameter allowing for a lubricant.

Still referring to 508 and 518 of FIG. 5A to FIG. 5C, this formula is mathematically constructed to create an optimized radius curve at the entry/exit transfer channel apertures that maximizes a radius of the two arcs into the transfer channel design, that results in a cable pathway having in a least amount of flexure of the cable and cable wear while the cable is in motion or during tentacle motion. Thereby, minimizing an amount of cable material fatigue during the tentacle gripper operation, as well as simultaneously minimizes an amount of side load of the cable generated by cable motion through entry/exit transfer channel apertures of the transfer channel. While, also concurrently minimizing an amount of transmission friction during the tentacle gripper operation, which will prolong the operational life of the cables and hence operational life of the tentacle gripper.

Passthrough Hole-Transfer Aperture (PH-TA) Cable Pathway

While developing the optimized transfer channel entry/exit aperture cable pathways, what was learned from experimentations is that an additional problem/challenge was discovered that needed to be overcome, in terms of designing a cable path between a passthrough hole of a guide disc, i.e. a ring passthrough hole or a spacer passthrough hole, to an entry/exit transfer channel aperture, that had a minimal amount of cable friction and a minimal amount of a flexure path. Additionally, what was realized is less cable friction resulted if the lower and upper cables did not cross within the center passthrough hole of the elastic connector 541. This can be achieved by ensuring that the four apertures proximal to the tentacle base, i.e. palm baseplate, accessing the center passthrough hole of the elastic connector 541 are connected to exit apertures of a distal end of the elastic connector 541, and ensuring that the four apertures distal to the tentacle base, i.e. palm baseplate, accessing the center passthrough hole of the elastic connector are connected to exit apertures of a proximal end of the elastic connector. Therefore, the optimized design places the entry apertures for cables transmitting through the spacer passthrough holes should access the center passthrough holes closer to the tentacle base than the exit passthrough apertures.

Still referring to 508 and 518 of FIG. 5A to FIG. 5C, a realization gained from substantial test experimentations, is that the elastic connector 541 needed to include lower and upper portions having a same length. The reason is that the lower and upper portions of the elastic connector can extend within the lower and upper elastic members and contact each guide disc, i.e. a distal guide disc of the lower elastic member and a proximal guide disc of the upper elastic member. Whereby, minimizing a cable path distance between each respective guide disc and the lower and upper portions of the elastic connector. Thus, this cable pathway is termed a passthrough hole-transfer aperture (PH-TA) cable pathway which is constructed to align a center of a passthrough hole of a guide disc, i.e. a ring passthrough hole or a spacer passthrough hole, to the lower and upper portions of the elastic connector, that has the least cable path distance along with demonstrating a low amount of cable friction and a minimal amount of a flexure path when tested in combination with embodiments of the cable pathway apertures of the transfer channel.

FIG. 5D is a schematic illustrating a tope view of a guide disc having pathways and a thru-center hole with a rounded peripheral edge or convex edge, in order to minimize friction and wear to the elastic tube, according to some embodiments of the present disclosure.

FIG. 5E is a schematic illustrating an oblique view of a guide disc having pathways and a thru-center hole with fillets to minimize cable friction and material fatigue when the cable is in motion, along with a rounded peripheral edge or convex edge, in order to minimize friction and wear to the elastic tube, according to some embodiments of the present disclosure.

Guide Ring Geometry Affects Degrees of Tentacle Flexibility and Performance

Test experimentation showed that changing a guide ring geometry also changes degrees of tentacle flexibility and affects tentacles overall performance. For example, changing an amount of thickness of one or more guide rings along a length of a tube section affects an amount of flexibility in preference to an amount of load maximization of a load carrying tentacle for each tentacle. Further, varying an amount of a guide disc thickness in combination with varying an amount of a guide disc diameter of one or a combination of guide discs along a length of the tube, such as a degree of concave sides of the guide disc can assist and retain a greater amount of flexibility over a guide disc that does not have concave sides or a purely cylindrical peripheral surface extending from a bottom surface to a top surface.

FIG. 5F, FIG. 5G and FIG. 5H are schematics illustrating side views of a guide disc having pathways and a thru-center hole along with a rounded peripheral edges or convex edges, in order to minimize friction and wear to the elastic tube, according to some embodiments of the present disclosure. The top and bottom surfaces of the guide disc are convex rounded to improve an amount of tentacle flexibility. Wherein FIG. 5F shows a thinner guide disc which optimizes flexibility of the tentacle in preference to load maximization of the load carrying tentacle. FIG. 5G shows a medium thickness guide disc which places flexibility and load capabilities at equal levels of the tentacle. FIG. 5H shows a thick guide disc which places maximum load capability over flexibility of the tentacle. Contemplated is that the guide discs can be designed to vary an amount of flexibility of each tentacle according to an intended grasping action(s) or a centralized grasping action by all the tentacles, by varying an amount of a guide disc thickness and varying an amount of a guide disc diameter of one or a combination of guide discs along a length of the tube. For example, the guide discs are positioned within the axial passage of the tentacle, such that each guide disc occupies an amount of volume of the total volume of the axial passage of the tentacle. The total volume of axial passage of each elastic tube can be calculated, i.e. volume of elastic tube is $V=hA$, where V is the volume, h is its height and A is the area of a cross-section, $V=Ah=(pi)(r^2)h$, which is used to assist in designing and constructing an amount of flexibility lengthwise along the tentacle, i.e. number of thin, medium and thick sized thicknesses of the guide discs, according to a specific optimized grasping motion for the tentacles grasping a particular object having one or a combination of characteristics. Note, that concave sides of the guide disc of FIG. 5H can assist and retaining a greater amount of flexibility over a guide disc that does not have concave sides or a purely cylindrical peripheral surface extending from a bottom surface to a top surface.

FIG. 5I is a schematic illustrating side views of varying sized guide discs with pathways and thru-center holes and rounded peripheral edges or convex edges positioned within a lower elastic tube, according to some embodiments of the present disclosure. For example, the lower elastic tube 518 shows three guide rings (a), (b), (c), with a small thickness T1, a single guide disc (d) with a medium thickness T2 and another single guide disc (e) with a larger thickness T3. Wherein the lower elastic member can be configured with guide rings having varying thicknesses, such that there are a larger number of smaller thickness sized guide rings than a total number of both medium and large sized thickness guide rings. Wherein the smaller thickness sized guide discs can optimize flexibility of the tentacle when compared to the larger sized thickness sized guide ring which places a maximum load capability of the tentacle. Such that the medium thickness sized guide disc can result in placing flexibility and load capabilities at equal levels of the tentacle.

FIG. 6A is a schematic illustrating a soft robot tentacle gripper system 1440A, according to some embodiments of the present disclosure. For example, the gripper system 600A includes three tentacles 611A, 611B, 611C actuated using 12 servo motors A-L which have a 180° range of motion. Each of the 12 servo motors A-L have control lines connected to a separate digital I/O pin on an Arduino Mega, so the position of each servo motor can be independently set to any value between 0° and 180°. Each servo motor A-L carries two flexible nylon-covered stainless-steel cables 0.92 mm diameter or cables 629A, 629B attached to opposite ends of a bell crank. Each servo motor cable pair flexes the same tentacle section in opposite directions; an angle of 90° on the servo motor A-L is nominally "zero curvature" for that degree of freedom on that tentacle 611A, 611B, 611C; rotating the servo motor shaft toward 0° flexes that tentacle section in one direction and rotating the shaft toward 180° flexes that same tentacle section in the opposite direction. Other components of the gripper system 600A can include wiring 631 connecting the servo motors (actuators) A-L, a controllable palm baseplate 602A and a controller 650. The controller 650 can be connected to a centralized control system (see 600E of FIG. 6E), or depending upon a user requirements in terms of configurations and applications, the centralized control system may be incorporated at a same location of the controller 650, or located at some other location, or could be integral with the centralized controller 650.

The gripper system 600A is fully actuated via servo motors A-L, with independent motion in every degree of freedom and realizing over +/−120° of bend per tentacle section for the +/−90° of servo motor shaft motion (the 120° motion limit versus the 162° tentacle section limit is due to limited bell crank arm length lessening the available cable motion, not lack of servo torque). The minimum interior radius at maximum (120°) curvature is about 30 mm.

Eight predetermined grasps are programmed as an example into the Arduino Electrically Erasable Programmable Read Only Memory (EEPROM), of which, there are many more grasps that are programed. These grasps can include several types of pinch and wrap grips (see FIG. 8A to FIG. 9B). Using a potentiometer, an operator can select among these saved grasps, and a serial-over-USB command line interface allows for the fully independent control of individual servo motors by human or control software. The position of each servo motor, actuator A-L is saved in an array; should the operator/user want to create another preprogrammed grasp, which can be done by simply saving the current array under a unique name. Using the Arduino EEPROM, all saved arrays can be recalled, edited, and resaved at any time. Total current draw and voltage delivered to the gripper system 600A is under 8 amps (nominally at a constant 6.2 volts) is monitored at the power supply (see 1208, 1229 of FIG. 12).

Cable-Controlled Transmission System: During experimentation, several realizations were discovered such as the cable-controlled transmission system for some embodiments of the present disclosure. All the experiments included active control using sets of opposing cables 629A, 629B (e.g., one set controlling "pitch" and an orthogonal set controlling "yaw".

Motors/Actuators: the soft robotic actuators or motors can be connected to the cable transmission systems for the tentacles, where the component material of the tentacle can have an impact on a level of performance of motor/actuator. For example, the tentacle components may be formed of elastomeric materials, such as rubber, or thin walls of plastic arranged to cover the internal components such as spacers and tube connector structure, where when a force is applied to the cables by the actuator, the tentacle components may stretch, and/or bend under a pressure force applied by the actuator. At least one operational benefit or advantage of the motors/actuators over other types of force generating devices, is that the motor that moves the cables for the cable transmission system can be soft-locked in position by a servo-control to hold the cables in position to prevent either the lower or upper tube movement. Such that the locking aspect holds, for example, the lower tube spacers in place, resulting in providing an extra degree of operable performance for the tentacle.

Centralized Controller: Some centralized controller experiments tested with the embodiments of the present disclosure, were discovered and later incorporated into some embodiments. Some included a centralized controller programmed with logic stored, the logic included instructions for: (a) in order to obtain each set of command instructions corresponding to the stored configured object complete the following steps of; (b) sensing a motion having human like characteristics from an operator wearing a teaching glove having sensors; (c) generate one or more signals representative of at least a portion of the motion by the sensors; (d) converting the one or more signals into a collective set of command instructions to actuate the multiple tentacles, or actuate the multiple tentacles and other devices within a network of robotic devices, wherein the collective set of command instructions is functionally equivalent to the motion; and (e) communicating the collective set of instructions to the centralized control system and the network of robotic devices, the robotic devices are robot assembly devices configurable to operate with the robot system.

Some embodiments can include another centralized controller programmed with logic stored, the logic included instructions for: (a) obtaining mapping data of the environment from a set of input signals from the received data; and (b) update a mapping module with the mapping data to determine a mapped association between the target object location and the robot system location; (c) accessing the stored robot system operational profile that includes a set of operational parameters for the robotic system, such that a mapped association between the target object and the robot system includes a distance between the target object and the robot system within an environment; (d) compared a distance between the target object and the robot system obtained from the mapping module with the stored predetermined operating range obtained from the stored robot system operational profile; (e) if within the predetermined operating range, the robot system continues to operate; (f) if outside of the predetermined operating range, generate an alarm command; and (g) send the generated alarm command to an operator or a component of the robot system.

It is possible still another centralized controller can be programmed with logic stored, the logic included instructions for: (a) an end tip sensor is imbedded in each tentacle and is configured to generate data, the data is applied to a tentacle state function to determine a state of the tentacle, such that the end tip sensor is one of an inertial sensor, a micro electro-mechanical system device, an accelerometer or an electromagnetic tracker, pressure sensor, torque sensor, shear sensor, force sensor, temperature sensor, conductivity sensor and vibration sensor; (b) alternatively, distal joint sensors are imbedded in each tentacle and configured to generate data, the data is applied to a joint state function to determine a state of the distal joint, the distal joint sensors include distributed shape sensors or linear displacement sensors; (c) the linear displacement sensors provide data for cables associated with the distal joint, each linear displacement sensor provides data to determine a distance that a cable transmission moves, and upon determining distances for all cables via the linear displacement sensor, the distances for all the cables is indicative of movement of the distal joint; and (d) alternatively, each linear displacement sensor includes one of a linear voltage differential transformer, a Hall effect sensor and a magnet, a slide potentiometer, a reference element coupled to the cable transmission at a reference point so as to measure movement of the reference element as an indication of movement of the cable transmission.

Some other embodiments can include a centralized controller programmed with logic stored, the logic included instructions for: (a) approaching a container of objects with the multiple tentacles oriented at a first angle with respect to a bottom of the container, based on analyzed processing of received sensor data; (b) upon the multiple tentacles reaching a position approximate to the container and disposed within walls of the container, reorienting the multiple tentacles to a second angle as compared to the first angle, based on analyzed processing of received updated sensor data; (c) grasping a target object within the container with the multiple tentacles oriented at the second angle. Some other logic can include instructions that: (d) the first angle can be substantially 90 degrees; (e) instructions for adjusting the palm base plate before reorienting the multiple tentacles to the second angle; and (f) instructions for extending one or more outer edge portions of the palm base plate while reorienting the multiple tentacles to the second angle.

Still referring to FIG. 6A, other aspects incorporated into the data used for determining the command database includes types of grasping actions by the multiple tentacles. For example, some types of grasping actions can include: an ulnar or palmer grasp (i.e. a grasp that is a raking motion with finger-like devices trapping an object against a palm-like surface); a raking grasp (i.e. where finger-like devices grasp an object, but the finger-like devices do not include a thumb, and the finger-like device do all the holding. Based on this experimentation, several gripping sequence of actions instructions were developed in order to move different shaped objects.

Another realization realized is that centralized controllers for the soft robot grippers need to overcome the failures of conventional control grippers control architectures, by recognizing the soft gripper control variabilities which vary and can be very different depending upon the differences in the underlying types of gripper material properties. For example, conventional control grippers control architectures have gripping force problems, due to being un-able to produce a large grasping force due to a type of material(s) used in construction of soft robot gripper structure. Some reasons for the gripping force problems by the conventional control grippers control architectures can be due to a lack of quantitative analysis in identifying different levels of amounts of grip strengths associated with each type of grip by the grippers grasping an object. Other reasons for gripping force problems can be a failure of a quantitative analysis in identifying individual advantages of each type of grip mode from a multitude of different types of grip modes, as well as a failure of a quantitative analysis in identifying individual advantages of each type of pull directions from many different types of pull directions.

Still referring to FIG. 6A, for example, the command database includes multiple sets of coordinated sequential control command instructions or tentacle movement programs, that were developed based on quantitatively evaluated tentacles performances, full independent actuation of the tentacles, which was used to develop a full range of grip styles, grip modes, grip strengths, and carrying capacities, used to construct a command database of coordinated sequential control command instructions or multiple tentacle movement programs that the centralized controller or components thereof, can later access. The full range of grip styles can be internal and external grasps each of which may be based on friction (i.e. pinching or clamping), or based on kinematic constraints (i.e. wrapping or power grasps like a human hand wrapping around a baseball bat handle where friction is unnecessary to maintain a grasp). Wherein an external grasp has the tentacle positioned outside of the object, squeezing in an inward direction, and an internal grasp has one of the tentacles inserted into an inner portion of the object, i.e. orifice, hole, etc., and subsequently the tentacle(s) are flexed or expanded (inflated) to grasp the object. Further the grip modes can include modes where one tentacle braces against another tentacle or on top of another tentacle, thereby increases the force on the braced tentacle and hence increases the gripping strength. As noted above, the centralized controller can access the object database that includes an indexing of each object identity and object pose, and access the command database for a desired motion type to retrieve a time sequence of commanded actuator positions and torques, and ranges of expected actuator forces and expected joint torques. Wherein the desired motion types can be flexure along any axis of each tentacle including X, Y, Z, length and axial rotation. Such that, the ranges of expected actuator forces and expected joint torques are well within the bounds achievable by elastomer tentacles with cable tension elements.

Still referring to FIG. 6A, specifically, some other aspects of the quantitative analysis include types of grasps for grasping different shaped objects, along with types of grasps for grasping different object poses of multiple poses for each shaped object. The types of grasps for both the target object shape and pose can include aspects such as: (1) a level of grip strength for each tentacle to hold the object shape as well as an overall level of grip strength for all tentacles to hold the object shape; (2) a gripping performance level for each grip mode of multiple grip modes; and (3) a pull performance level for each pull direction of multiple pull directions.

Some other aspects incorporated into the data used for determining the command database includes grasping force control variabilities base on the types of gripper material properties, gripping performance levels by the multiple tentacles to move a specific target object configuration, a sequence of control signals to be executed including actuator positions, expected torques, forces and positions to be experienced at those steps, timing between steps in the sequence of steps, and at each step an alternative set of steps to take in case the initial identified torque, force, or position or some other measurement(s) had not been within preset bounds.

Types of Sensors and Applications Using Sensor Data

Still referring to FIG. 6A, contemplated is that environmental sensors positioned in the work area of the object to be moved can obtained environmental data (i.e., moisture, temperature, dust, etc.), to assist the tentacles gripping and releasing micro-objects. For example, the environmental data can include using measured data such as an amount of a measured capillary force, electrostatic force, etc. Wherein an amount of a measure of moisture from air in the work area is condensed into a thin layer of water on surfaces of the object that tentacle intends to use to move the object. The command database can be used to identify an associated set of coordinated sequential control command instructions or an object movement program, based on having identified the object shape, the specific object shape's pose, and having received the specific type of multiple tentacle movement actions via the operator. For example, in order to use the command database of stored multiple sets of coordinated sequential control command instructions or multiple object movement programs, the target object shape needs to be identified, and that the target object specific pose needs to be identified. However, if the object shape is a circle, then there is no need to incorporate the object pose, since a circle shape has only one pose. For object shapes having multiple object poses, and in order to identify the sets of coordinated sequential control command instructions from the command database, then the specific object pose associated with that object shape also needs to be identified.

FIG. 6B is a schematic diagram illustrating a configuration of a palm baseplate 602B that can be fixed or controllable, such that each tentacle of the multiple tentacles can move independently from the other remaining tentacles in a X direction along an X-axis, as well as in a Y direction along a Y-axis, on the palm baseplate 602B, according to some embodiments of the present disclosure. For example, each tentacle can be moveable using a screw mechanism to translate the tentacle lower elastic tube or proximal end along the X-direction or the Y-direction of the palm baseplate 602B, or both, in order to further optimize tentacle group strength performance. Wherein commands are generated by the centralized control system and are implemented by actuators (not shown) to activate the screw mechanisms.

FIG. 6C is a schematic diagram illustrating another configuration of a controllable palm baseplate 602C, such that the controllable palm base plate includes controllable outer edges 1C, 2C, 3C, 4C that are adjustable either in or out directions along a horizontal plane B (HP-B) or along degrees of a vertical plane A (VP-A) of the controllable palm base plate, according to some embodiments of the present disclosure. For example, tentacles 1, 2, 3, 4, 5 can be controlled to utilize any one of the controllable portions 1C, 2C, 3C, 4C of the palm baseplate 602C, to further optimize tentacle group strength performance.

Figure 6D:
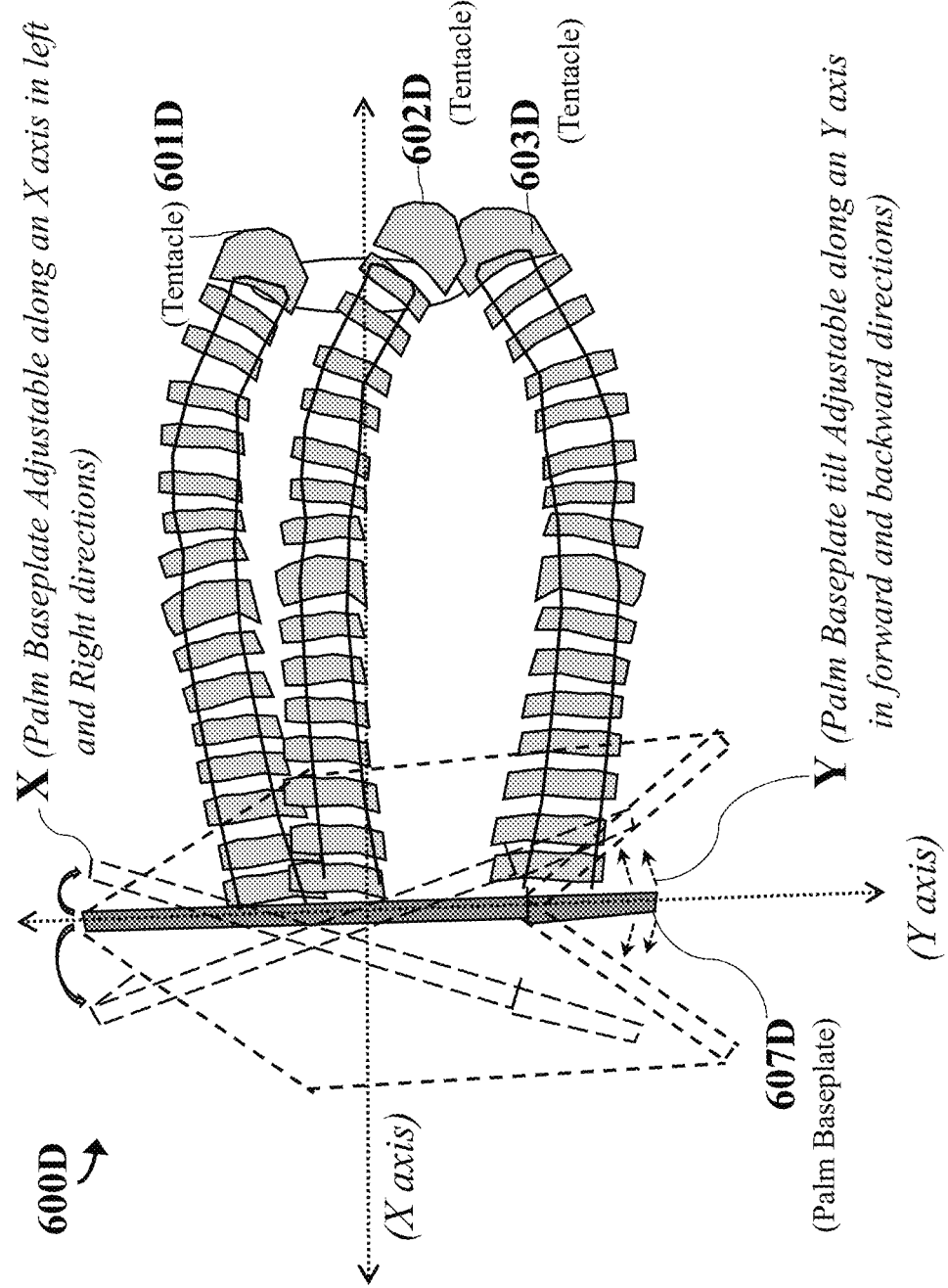
FIG. 6D is a schematic diagram illustrating the palm base plate is adjustable, along a Y axis so as to be tiltable toward or away from the tentacles, as well as adjustable along an X axis to a left or right direction, according to some embodiments of the present disclosure.

FIG. 6D is a schematic diagram illustrating a controllable palm base plate that is adjustable, along a Y axis so as to be tiltable toward or away from the tentacles 601D, 602D, 603D, as well as adjustable along an X axis to a left or right direction, that can optimize tentacle group strength performance, according to someembodiments of the present disclosure.

Technical Attributes and Practical Applications

Embodiments of the present disclosure are configured to be compatible with most commercial robot controllers in gripper and non-gripper industries, to provide turnkey integration, enabling users/operators to quickly install and commission the innovative multiple tentacle system for new or retrofit applications with no additional components or control hardware. Embodiments of the present disclosure are configured to operate in many different types of gripper and non-gripper industries. For example, the innovate embodiments can execute tasks at an amount of a pace faster than convention gripper systems due to the new tentacle design(s) and controller attributes. Some of the gripper industries at which the innovative embodiments can outperform conventional gripper systems can include co-operational human/ gripper systems that the innovative embodiments work side-by-side with people in food harvesting, automated harvesting and packaging of fruits and vegetables, where the innovative embodiment excel over conventional gripper systems due to: (a) high degree of dexterity of multiple tentacles; (b) exhibit physical robustness and human-safe operation at a lower cost, higher productivity task completion, at no human safety; (c) little or no product loss of product handling, high degree of sanitation with a level of delicate manipulation; (d) the multiple-tentacle grasps with 12 DoF and optional null-space provide high levels of performance for sorting and packaging applications involving delicate produce and bakery items, like apples or small chocolates, as well as with other like delicate non-perishable products. Other gripper industries can include the medical industries, warehouse and manufacturing industries, such that the innovative multiple tentacle system can: (a) provide a high degree of medical assistance; (b) excel in e-commerce warehouses requiring grippers that require high degrees of dexterity that can manipulate packages of various sizes, shapes, weights and an amount of softness (i.e. bags filled with product), along with warehouse logistic applications involving unpredictable-size objects.

Some advantages and benefits of the embodiments of the present disclosure operating the above gripper system operating environments over conventional gripper designs and systems can include: (a) few parts operational components which eliminate bearings, shafts and other mechanisms that can fail and/or require extensive maintenance costs in some gripper industries having harsh environments, i.e. dust, smoke, etc.; (b) weigh less, safer due to the reduced weight and high dexterity results in a minimum amount of impact forces in an event of a collision; (c) a degree of adaptability, plug and operate, repeatable and a high degree of reliability, via a quick release tentacle mechanism option; (d) configured to operate and complete advanced assembly tasks that currently require significant labor; (e) packaging, food and beverage, and industrial robots adaptively handle varying objects with a single easy-to-use device, eliminating a need for tool/tentacle changes and complex vision/sensor requirements; and (f) high-speed controller with millisecond response ensures repeatable and reliable actions.

FIG. 7 is a schematic diagram illustrating an embodiment of a robot assembly 700 including incorporating the soft robot gripper system along with elastomeric sensors 709A, 709B on the controllable palm baseplate 703, according to some embodiments of the present disclosure. For example, the soft robot gripper system of the present disclosure is incorporated into a robot assembly, where the tentacles 711 and two elastomeric sensors 709A, 709B are positioned on the palm baseplate 702. For some applications, at least one goal may be to pick up an object 795 from random objects in a bin 796 based on an object shape and pose 797. The tentacle gripper can include a 12 degree of freedom (DoF) with the tentacles 711 and 6 DoF robotic arm 704. 3D sensors 709A, 709B can be arranged on the arm 704 to acquire data of the scene including the objects 795, tentacles 711, bin 796, along with other objects, weather, etc., that may be used for enhancing the robot assembly process or manufacturing processes. Then, the tentacles 711 can pick up a target object from the objects 795 from the bin 796. It should be noted that the bin 796 could contain different objects that can be different sizes and shapes, along with different weights. Contemplated is that a robot can be designed to include more than 6 joints which implies even with a fixed based and fixed gripper position, an extra degree or degrees of freedom remains with the joint positions with the robot, i.e. termed a "null-space" of the robot, as motion in the null-space does not move the gripper position at all. This motion in the null-space allows the gripper to reach an object 495 while having the gripper avoid touching another object within the workspace that should not be touched or bumped. For example, a human arm reaching outward to a point about nose height and about two feet in front of a human face has a null-space of the elbow moving upward and downward without motion of the shoulder or the hand, by reaching over or under an obstruction such as a pipe obstruction. At least one further innovation is that the multi-tentacle gripper includes a null-space so that the tentacle 711 themselves can move without changing the position or grasping location on the object 795 being grasped. Thus, the multi-tentacle gripper can negotiate and avoid obstacles in the workspace while maintaining a grasp of the object 795 by the tentacles 711.

Still referring to FIG. 7, an example can be that the 3D sensors 709A, 709B may include additional sensors 709C, 709D, such that two or more sensors of the sensors 709A-709D use structured light generated by a projector. It is possible two or more sensors of the sensors 709A-709D, can be stereo cameras and time-of-flight range sensors. These sensor(s) 709A-709D can acquire 3D scene data, e.g., a point cloud. The 3D sensors can be calibrated with respect to the robot arm 704. Thus, the poses of the objects 795 can be estimated in a coordinate system of the 3D sensors that can be transformed to a coordinate system of the robotic arm 704, allowing grasping and picking of the objects 795 by controlling the robotic arm 704 according to the poses via the robot control computer 743. The scene data can be processed by the control module 742 that may implement a determined method to be performed in the sensor control computer 701. The sensor control computer 701 can include memory and input/output interfaces as known in the art. Contemplated is that the sensors 709A-709D can be configured help identify and determine that the operation of the tentacles 711 is progressing as intended. For example, the tentacles 711 grasp the target object 795 at a starting position located a bin 796 of objects when the multi-tentacle gripping system is so commanded. After the multi-tentacle gripping system is commanded to grasp the target object 795 from the bin 796 and before the multi-tentacle gripping system is commanded to move to a final position. Sensors 709A-709D generate data that identify a type of grip, a number of objects held by the tentacles 711, or both, such that upon the centralized control system receiving the sensor data. If that the type of grip, a single target object is grasped by the tentacles 711, or both, are determined that a position and/or an orientation of the target object corresponds to a predetermined criteria for the position and/or the orientation of the target object according to the set of command instructions, the centralized control system does not generate an alternate set of command actions. However, if after the centralized control system determines that the type of grip, the number of objects, or both, grasped by the tentacles 711 do not meet the predetermined criteria for the position and/or the orientation of the target object according to the set of command instructions. The centralized control system generates the alternate set of command actions, to move the tentacles 711 holding target object or number of objects, back to the starting position or to an alternate position.

Still referring to FIG. 7, the innovative tentacles 711 are particularly customizable to flexible assembly lines due to the high level of dexterous manipulation in combination with real-time sensors 709A-709D as noted above, as well as real-time tactile sensing embedded in the end tips (see 416 of FIG. 4C) of each tentacle (not shown). For example, upon receiving the real-time sensor data, the different shapes and poses of objects typically experienced in flexible assembly lines can easily be moved by the tentacles with high accuracy. Test results showed that the tentacles were operationally capable of sequentially gripping more than one type of object with a time period, gripping a M6 socket-head bolt with high accuracy, sequentially gripping next the casting that the same bolt screws into, as well as precisely grasping a M6 hex-head bolt. Whereas conventional grippers that grip the M6 socket-head bolt, typically cannot grip the casting that the same bolt screws into nor precisely grasp the M6 hex-head bolt.

At least one novel differentiating factor over conventional robot assemblies, is that the end tip (see 116 of FIG. 1C) can include embedded tactile sensors providing tactile sensing in combination with the above noted sensors 709A-709D. When combined, the real-time sensor data provided back to the centralized control system (see 600E of FIG. 6E) is processed and implemented in fractions of a second while operating, i.e. within flexible assembly lines. Further, if there are any detected errors or gripping problems picking up a target object by the tentacles, the centralized control system (see 600E of FIG. 6E) in real-time can correct the issues immediately, saving valuable operational time and production costs. This novel feature is especially important in view of today's manufacturing facilities increasing investments in incorporating robots with improved capabilities to operate in flexible assembly lines. This is expressed in McKinsey & Company Industrial Robotics Report on the insights into sector's further growth dynamics, in their Advanced Industries, July 2019 publication, that stated "The investment increase across industries is mainly driven by the goal to decrease production cost. Investment is also motivated by the need for increased flexibility in production and improved capabilities of robots (see Exhibit 5)." (see https://www.mckinsey.com/~/media/McKinsey/Industries/Advanced%20Electronics/Our%20Insights/Growth%20dynamics%20in%20industrial%20robotics/Industrial-robotics-Insights-into-the-sectors-future-growth-dynamics.ashx). Whereas, most conventional robot grippers have problems, including little or no tactile sensing, i.e. limiting their use for flexible assembly lines. At least one reason is that the designs for these conventional specialized gripper fingers are configured for high precision part grasping and grasp validation, however, these conventional devices are not operationally capable of gripping more than one type of object.

Still referring to FIG. 7, although, one set of tentacles are shown with supporting operating components, interchangeable sets of tentacles are contemplated, depending upon the user specific requirements, according to embodiments of the present disclosure. The different types of sets of tentacles can have different levels of stiffness, flexibility, different outer surface materials, different tentacle lengths, etc., all of which are described within this application, according to aspects of the present disclosure.

Another aspect of the systems and components of the present embodiments is that software or hardware, or some combination thereof, can be implemented via localized storage or through a cloud-based system. According to aspects of some embodiment, tentacles especially tentacles configured with embedded sensors introduce an amount of task flexibility that allows the grippers to remain useful in case of changes from the planned original task, whether predicted or unpredicted. Similarly, the conventional robots have a low level of capability to know if an actual assembly operation was successful or not, i.e. such as grippers grab is "GRIP OK" versus "NO OBJECT FOUND" versus "GRIP TOO TIGHT" versus "GRIP MARGINALLY LOOSE" versus "GRIP DOESN'T FEEL RIGHT". In order to overcome these above problems of the conventional robots, some embodiments of the present disclosure are configured with a mechanically robust general-purpose gripper end tips 416 of FIG. 4A to FIG. 4C, that provide a full force set in pressure, translation, rotation, shear, etc., as noted above, that can be used, by non-limiting example, for flexible assembly lines.

Figure 8A:
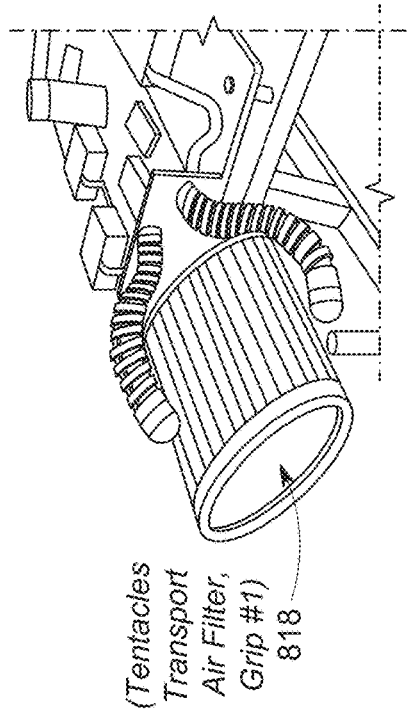
FIG. 8A to FIG. 8D are pictures illustrating different gripping or grasping types by the multiple tentacles for different shaped objects that can be used in an industrial environment, such as a manufacture (MFG) packaging application for small parts or for a supply chain application for bin picking for sorting goods, according to some embodiments of the present disclosure.
Figure 8B:
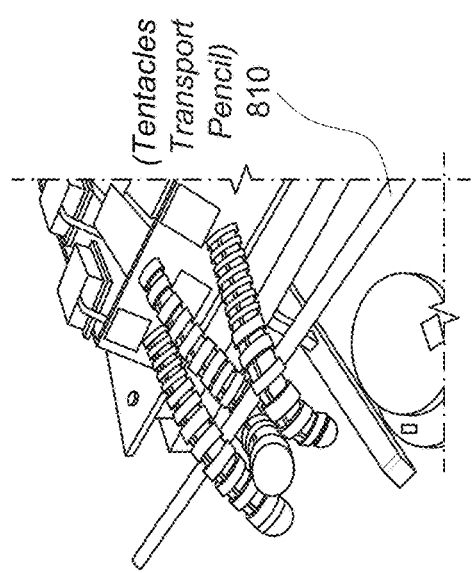
Figure 8C:
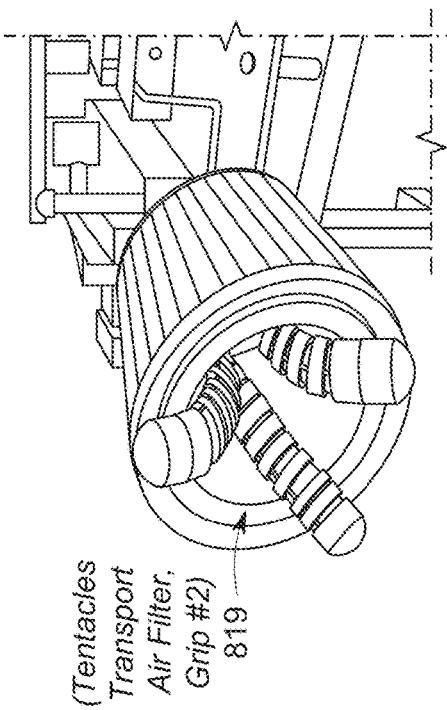
Figure 8D:
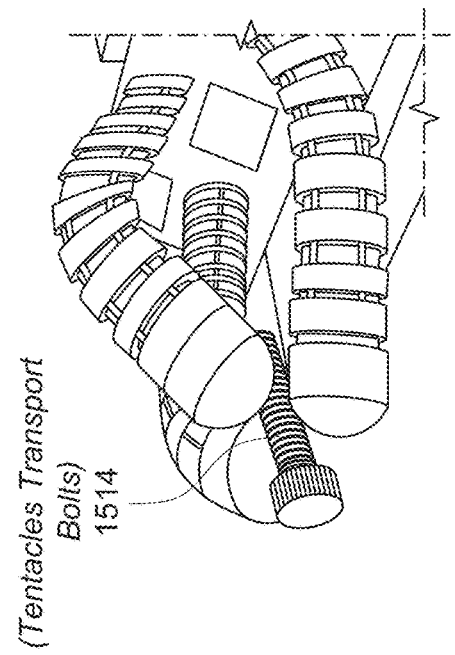

FIG. 8A to FIG. 8D are pictures illustrating different gripping or grasping types by the multiple tentacles for different shaped objects that can be used in an industrial environments, such as a manufacture (MFG) packaging application for small parts or for a supply chain application for bin picking for sorting goods, according to some embodiments of the present disclosure. For example, FIG. 8A shows the multiple tentacles grasping a pencil 810. FIG. 8B shows the multiple tentacles grasping a bolt 814. FIG. 8C shows the multiple tentacles grasping car air filter 818 using a first grasp grip. FIG. 8D shows the multiple tentacles grasping another car air filter 819 using a second grasp grip.

What was learned from experimentation is that the combination of the rigid cable-guide outer rings, the core tube of elastomer, the stack of ellipsoidal blue spacers, and the steel cabling produces a highly anisotropic mechanical metamaterial. In tension, it is highly inelastic due to the steel cables; in compression it behaves unconventionally—it neither compresses axially nor will it undergo tall-column Euler buckling (which typically creates a single sharp crease or kink) but instead bends in an essentially circular arc with complete recovery even when bent 180 degrees. In shear, and without cable tension, a tentacle deflects noticeably under it's own weight, but the tentacle sections themselves are resistant to second and higher order curvatures ("S" curves and other curves with more inflection points). Viewed another way, the elastomeric gripper is an analog computer finding the minimum elastomer energy configuration given the boundary conditions of the servo cable settings and the object being grasped. This view could lead directly to improved control algorithms for the gripper. Also realized the experimental performance results showed that the gripper system provided a superior amount of grip strength and adaptability resulting from the coordinated central control and the use of a mechanical metamaterial. Other experimental performance results showed a high amount of tensile and compressive strength, while remaining supple in lateral directions. Further the central controller provided a high amount strength coordinated tentacle grasps, and when compared to a similar conventional gripper of the same size and configuration, the gripper of the present disclosure performance results provided stronger than conventional parallel grippers configured with traction-rubber grip jaws, was well as out performed in an amount of types and number of grasps for grasping objects far smaller than a minimum tentacle bend radius.

Figure 9A:
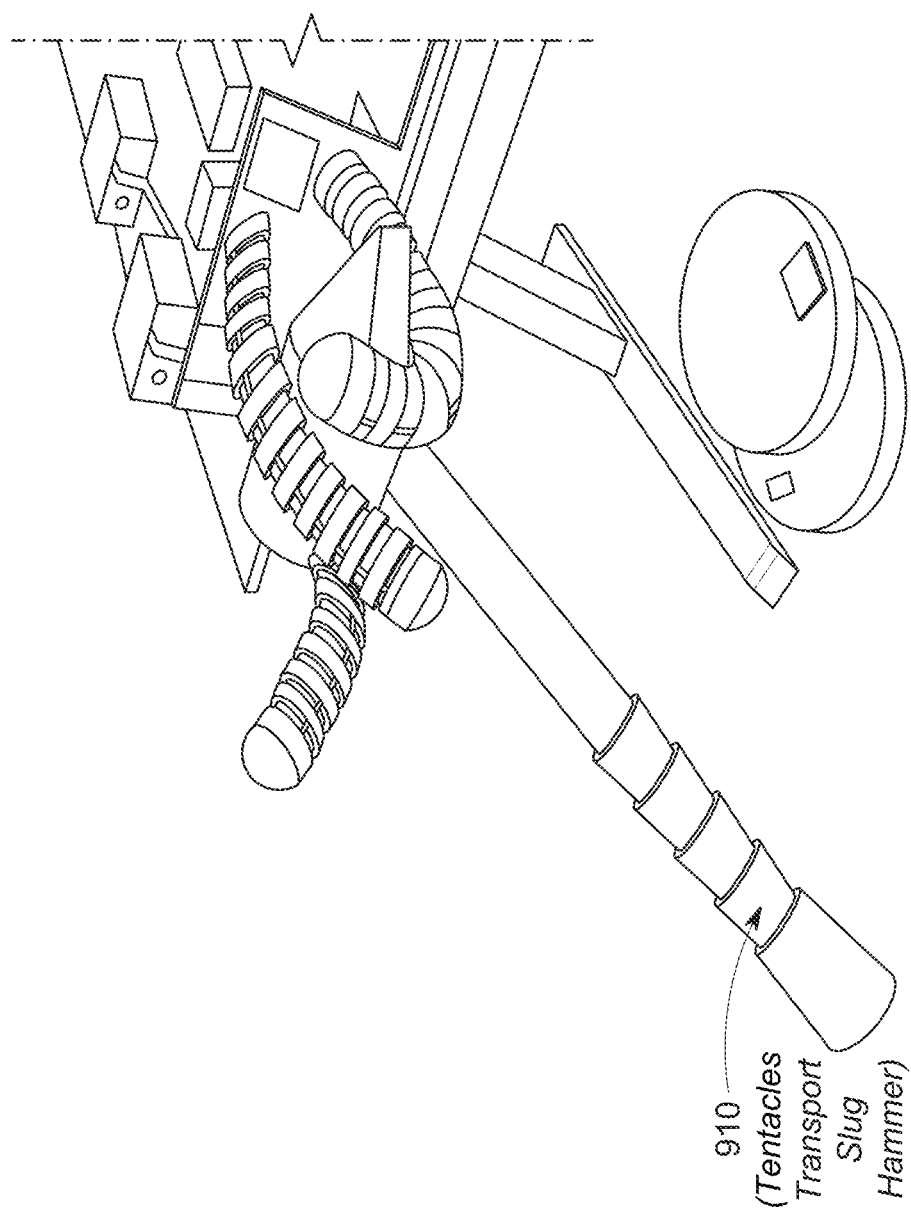
FIG. 9A is a picture illustrating another gripping or grasping type by the multiple tentacles for a heavy object such as a slug hammer, according to some embodiments of the present disclosure.

FIG. 9A is a picture illustrating another gripping or grasping type by the multiple tentacles for a heavy object such as a slug hammer 910, according to some embodiments of the present disclosure.

FIG. 9B is a schematic illustrating a table of gripping strength test results for a test gripper having three tentacles, two sections per tentacle, having fully actuated (12 DoF), +/−120° flex per tentacle section, and 30 mm minimum interior flex radius, the tested gripping strengths include grasp load capacity, initial and maximum current draws, and failure modes determined for several grasps, according to some embodiments of the present disclosure. For example, the multi-tentacle gripper can include many types of grips for the same multi-tentacles including: (a) distal wrap; (b) proximal hugging wrap; (c) reverse distal wrap; (d) internal expanding wrap; (e) internal expanding pinch; (f) distal pinch (external distal pinch); (g) proximal pinch. Further, the multi-tentacle gripper can grasp objects ranging from very small objects such as six millimeter (M6) size bolt (or a bolt that is less than ¼ of an inch in size), and up to a very large object such as an industrial shop vacuum cleaner filter (or objects sized at 150 mm or about 6 inches) in a encircling grip.

The grasp load capacity, initial and maximum current draws, and failure modes were determined for several grasps are tabulated in Table 1. Testing was done by closing the tentacles around a test object in each type of grasp and then pulling the test object either straight out (axial) or straight down (radial) from the gripper via a calibrated force scale. With the exception of distal pinches, pullout strength varied from 4 to 18 kg, 36 to 160 N (8 to 36 lb). For comparison, a "classic" parallelogram-grip robot gripper with friction-rubber jaws, actuated with two of the same type HS-805BB servos achieves only ~15% to 25% of this grip strength—1-3 kg lift, 10-30 N (2-6 lb) axial pull-out strength on similar test objects. Note that some high-performing grasps such as the proximal hug wrap, the reverse distal wrap and the internal counter-expanding wrap require coordinated central control and "unconventional" positioning of the tentacles. Essentially some tentacles take a weaker grasp in order to obtain a stronger grip for the tentacle array, including bracing one tentacle against another. These cases exemplify where a local configuration optimum grip is not the global optimum grip and centralized (rather than distributed) control is a requirement. Noted is that some grasp modes we would expect to be very strong (such as boa constrictor full wraps) are not possible with only two sections of tentacle with +/−120° bend and 30 mm minimum radius per section (such as wrapping a 10.3 mm diameter test object); therefore the grasp strengths listed should be considered as lower bounds.

Figure 10:
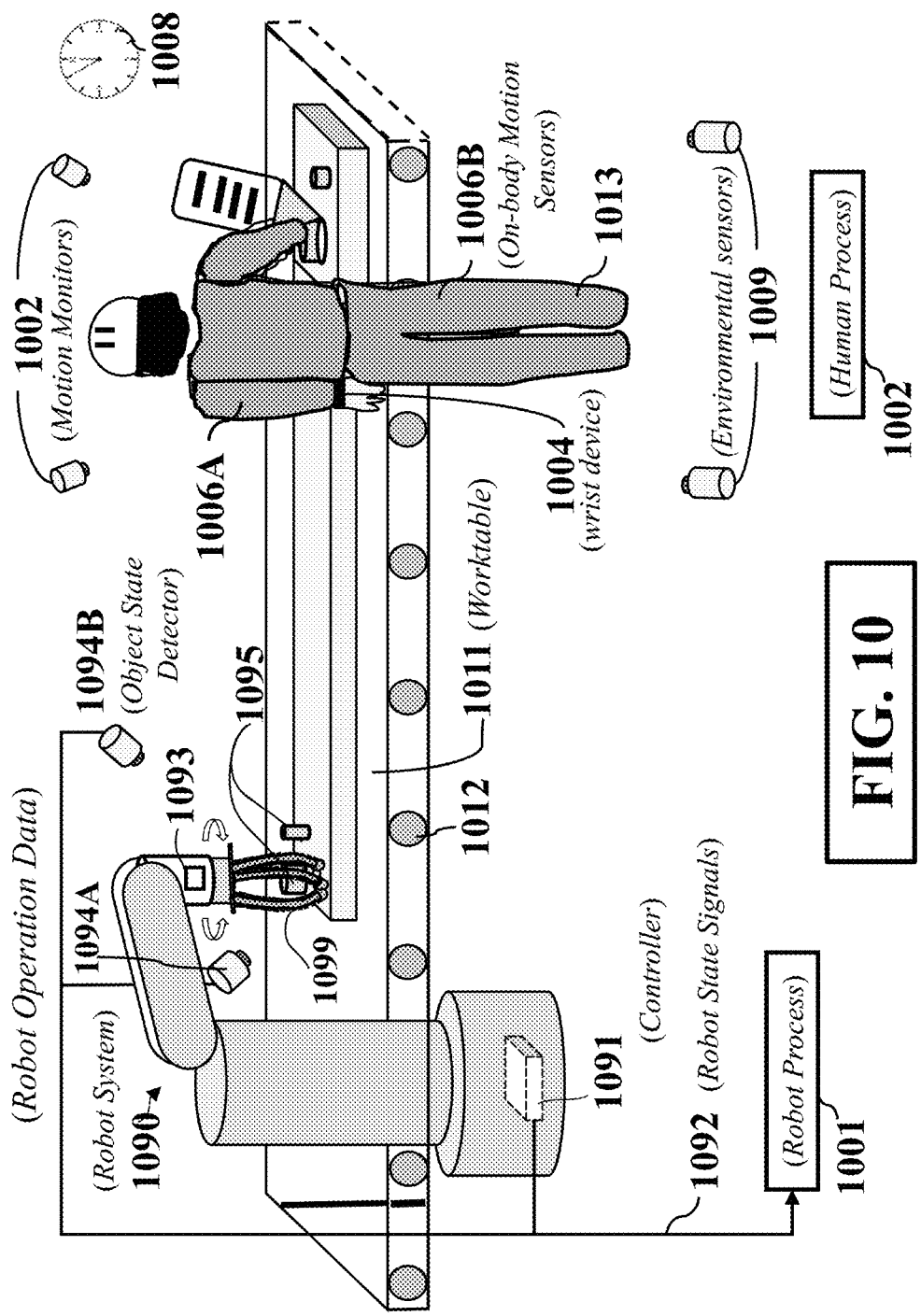
FIG. 10 is a schematic diagram illustrating a robot system including incorporating the soft robot gripper system along with elastomeric sensors on the palm base plate, and a human worker, working together as a team, executing a task in an assembly line of a discrete manufacturing process, according to some embodiments of the present disclosure.

FIG. 10 is a schematic diagram illustrating a robot system including incorporating the soft robot gripper system along with elastomeric sensors on the multiple tentacle base plate or palm base plate, and a human worker, working together as a team, executing a task in an assembly line of a discrete manufacturing process, according to some embodiments of the present disclosure. For example, the soft robot tentacle system can be incorporated into an assembly line that includes multiple stations, such that some stations can include at least one task to be completed by at least one soft robot tentacle system and at least one task completed by a human, or at least one task completed by a combination of a human working together with the soft robot tentacle system.

Still referring to FIG. 10, the robot system 1090 includes a controller 1091, a robot state detector, for example a positional encoder 1093, wherein the positional encoder 1093 can produce robot state signals 1092. The robot system 1090 can also include an object state detector for example a camera 1094A, 1094B, wherein the camera 1094A, 1094B can produce object state signals of an object 1095 to be manipulated by the robot system 1090 in a workspace or conveyor 1012 of a worktable 1011. Wherein the robot system 1090 assists at least one human worker 1013 in completing at least one task on the worktable 1011, such that the workspace or conveyor is capable of moving in a forward direction and a reverse direction in order to assist either the robot or human worker in completing the task. Note that these components 1011-1012 and 1090-1094 are here represented as an example but they might vary for different applications since the embodiment of the present disclosure is robust to different applications. In addition, the robot operational data can optionally, depending upon a user specific interest, be sent or received wirelessly to a robot learning process 1001. Further, the human worker 1013 can have sensors for gathering data including a wrist device 1004, motion monitors 1002, on-body motion sensors 1006A, 1006B, time devices 1008 and environmental sensors 1009. The data from these devices facilitates the learning process for the models specific to the human worker. These sensors all together are an example of the human state detector. The human states are considered together with the state of the object to be manipulated 1095 and with the state of the robot system 1090 to learn the control policy of the robot.

Experimental Engineered Tentacles

Some experimental grippers included a design for a series of cable-driven continuum tentacle robot arms with coil compression spring cores (pseudo-hydrostats) yielding 3 DoF, so as to allow for bending in two directions, plus a change in length. However, what was learned from these experimental gripper is that continuous uniform deformation as supplied by a tentacle with three degrees of freedom (DoF) has a relatively small set of grasps (encircling and pinching grasps), much more similar to a conventional 1 DoF gripper system, and does not nearly have the flexibility as a 12 DoF system. For example, a 3 DoF multi-tentacle gripper system cannot perform a recurve distal wrap or a self-bracing grasp such as an internal counter expanding wrap.

Degree of Flexibility for Tentacle Components based on Material Type: Learned from experimentation is that an amount or a degree of flexibility of the components of the tentacles (i.e. tube sections, tube connector, ring and spacer), can affect a level of performance of the tentacles' cable transmission mechanism. Such that a higher degree of flexibility of the tentacle components appeared to reduce a level of bendability, a level of an applied gripping force, etc., in regard to an operational performance level during the tentacle operation, among other aspects. During experimentation several test embodiments were tested with an upper tube section (upper tube, rings with spacers) and the tube connector of tentacle having a higher degree of flexibility than the lower tube (lower tube, rings with spacers). Conversely, one set of test embodiments included the lower tube section and the tube connector of the tentacle having a higher degree of flexibility than the upper tube section. Another set of test embodiments included a high level of flexibility for both the lower and upper tube section and the tube connector. The materials for each component in the tube sections (tube itself, rings and spacers) were replaced with different degrees of flexibility, as well as the tube connector materials, in order to identify optimal tentacles performance based upon predetermined optimal tentacles performance thresholds determined by tentacle designers of the present disclosure. Some test experiments included varying degrees of stiffness and flexibility for the ring versus the spacer in the guide ring design. Some test results showed that having a stiffer material for the ring and a less stiff material for the spacer illustrated an improved performance level. Further, some test results showed that having a less flexible material for the ring and a more flexible material for the spacer illustrated an improved performance level. As noted in FIG. 4D to FIG. 4I, the degrees of tentacle flexibility based upon guide ring geometry can affect performance, wherein test experiments included changing a geometry of the guide rings to obtain different levels of flexibility of the tentacles to further optimize tentacles performance.

Figure 11:
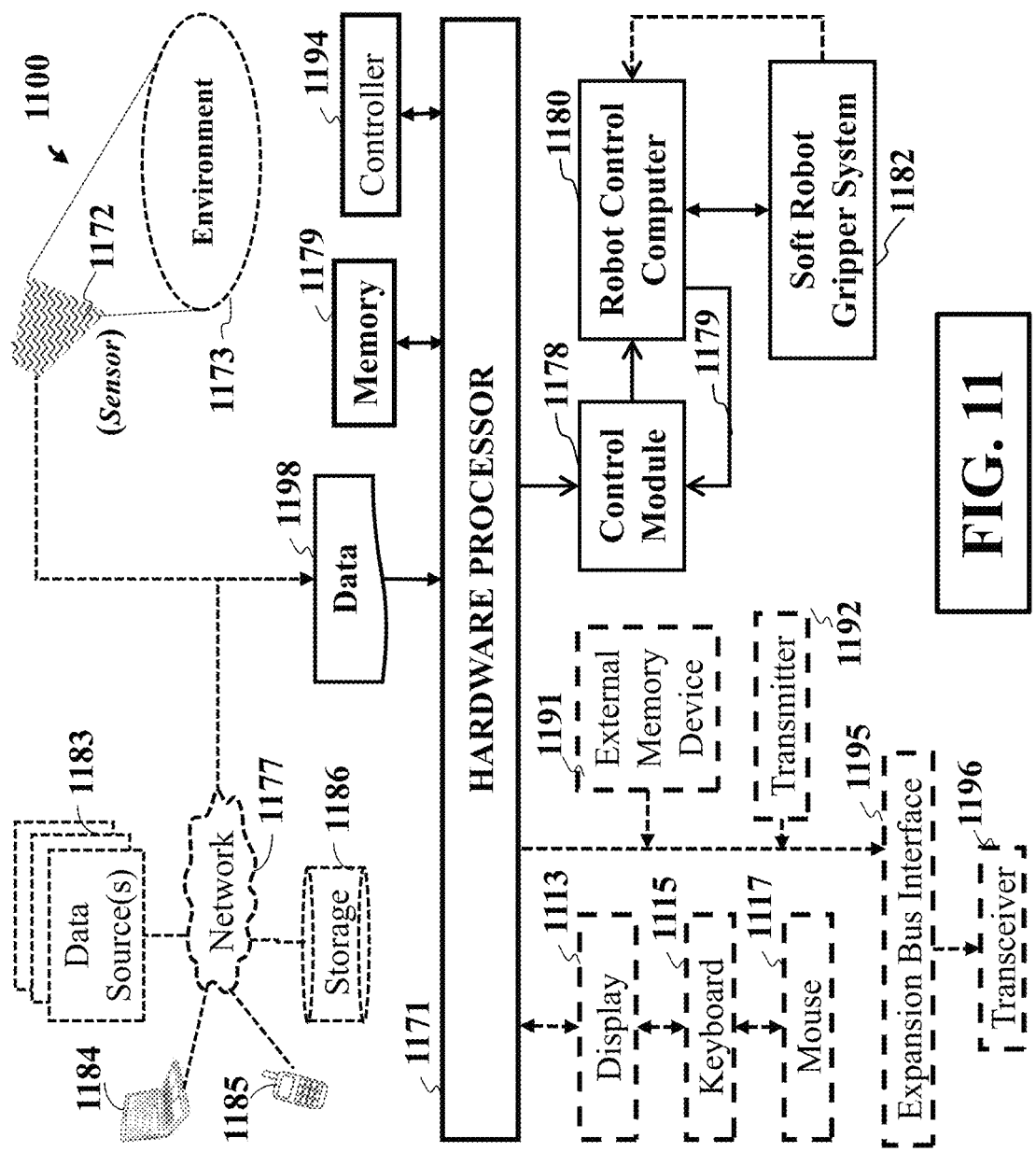
FIG. 11 is a block diagram illustrating some components of another centralized controller system used for implementing some methods associated with the soft robot gripper system, according to some embodiments of the present disclosure.

FIG. 11 is a block diagram illustrating some components of another centralized controller system used for implementing some methods associated with the soft robot gripper system, according to some embodiments of the present disclosure. For example, centralized controller system 1100 can include a hardware processor 1171 in communication with a sensor 1172 or sensors, that collects data including data of an environment 1173. The sensor data can include data related to robot, vehicle, machine, etc. and similar types of data or data associated with trajectory optimization techniques for dynamical systems with nonlinear constraints. Further, the sensor 1172 can convert a video or camera input into the signal data. The hardware processor 1171 can be in communication with a computer storage memory, i.e. memory 1179, such that the memory 1179 includes stored data, including algorithms, instructions and other data, that can be implemented by the hardware processor 1171. For example, stored in the memory can include a multi-link Dynamic Model, a nonlinear Optimization program and an objective function.

Still referring to FIG. 11, sensor data can be stored in the memory 1179 which can be obtained from at least one sensor in the environment via a wired connection or a wireless connection, the sensor data is stored in the memory via a transceiver configured to output data and to receive data, such that after each time interval, the sensor data is updated by the at least one sensor. Also, stored in the memory can be robot, vehicle and machine operational and dynamics data that can include robot arm information including a model of the robot arm that allows for simulation of movements of the robot arm, along with operational control inputs such as torques applied by the motors via the robot drive for moving each joint of the robot arm. The hardware processor 1171 can be connected a control module 1178 which is connected to the robot control computer 1180. The robot control computer 1180 can communicate back with the control module via 1179. The robot control computer 1180 is connect to the soft robot gripper system 1182, wherein the soft robot gripper system 1182 can communicate to and receive information from the robot control computer 1180, as well as optionally be connected directly back to the robot control computer 1180. Optionally, the hardware processor 1171 can be connected to a network 1177, that is in communication with a data source(s) 1198, computer device 1184, a mobile phone device 1985 and a storage device 1186. Also, optionally, the hardware processor 1171 can be connected via the network 1177 to a network-enabled server (not shown) that is connected to a client device (not shown). The hardware processor 1171 can optionally be connected to an external memory device 1191, a transmitter 1192 to a controller 1194. A transceiver can be connected via an expansion bus interface 1195 to the hardware processor 1171. Some types of output received by the transceiver 1196 can be related to a user's intended interested in receiving an answer to a request (received by the transceiver 1196) about computed trajectories along the path (obtained from the methods of the present disclosure) which could be displayed on the user's one or more display device, such as a monitor or screen, and/or inputted into an other computer related device for further analysis, etc.

Still referring to FIG. 11, contemplated is that the hardware processor 1171 can include two or more hardware processors depending upon the requirements of the specific application, wherein the processors can be either internal or external. Certainly, other components may be incorporated depending upon a user/operate specific operation needs. It is possible the network 1977 can include, by non-limiting example, one or more local area networks (LANs) and/or wide area networks (WANs). Wherein the networking environments can be similar to enterprise-wide computer networks, intranets and the Internet. The data source(s) 1983 may comprise data resources for training a network. For example, in an embodiment, training data can be stored in the storage 1186. The training data can also include signals of other environments. Data source(s) 1183 may also comprise data resources for training a network. The data provided by data source(s) 1913 may include other data, such as other sensor related data corresponding to the environment, robot arm and the like.

Still referring to FIG. 11, some data in data source(s) 1183 can be provided by one or more feedback loops. Specific data source(s) 1183 used may be determined based on the application including whether the data is a certain class of data (e.g., data relating to thresholds, performance, safety, etc. associated with robot, vehicle, environmental, etc. types of data or data associated with trajectory optimization techniques for dynamical systems with nonlinear constraints), or general (non-class-specific) in nature. The third-party devices 1184, 1185, which can comprise of any type of computing device including a computer device 1184 or a mobile device 1185. The storage 1186 can store information including data, computer instructions (e.g., software program instructions, routines, or services), and/or models used in embodiments of the technology described herein. For example, the storage 1186 can store data from one or more data source(s) 1183, one or more deep neural network models, information for generating and training deep neural network models, and the computer-usable information outputted by one or more deep neural network models.

Figure 12:
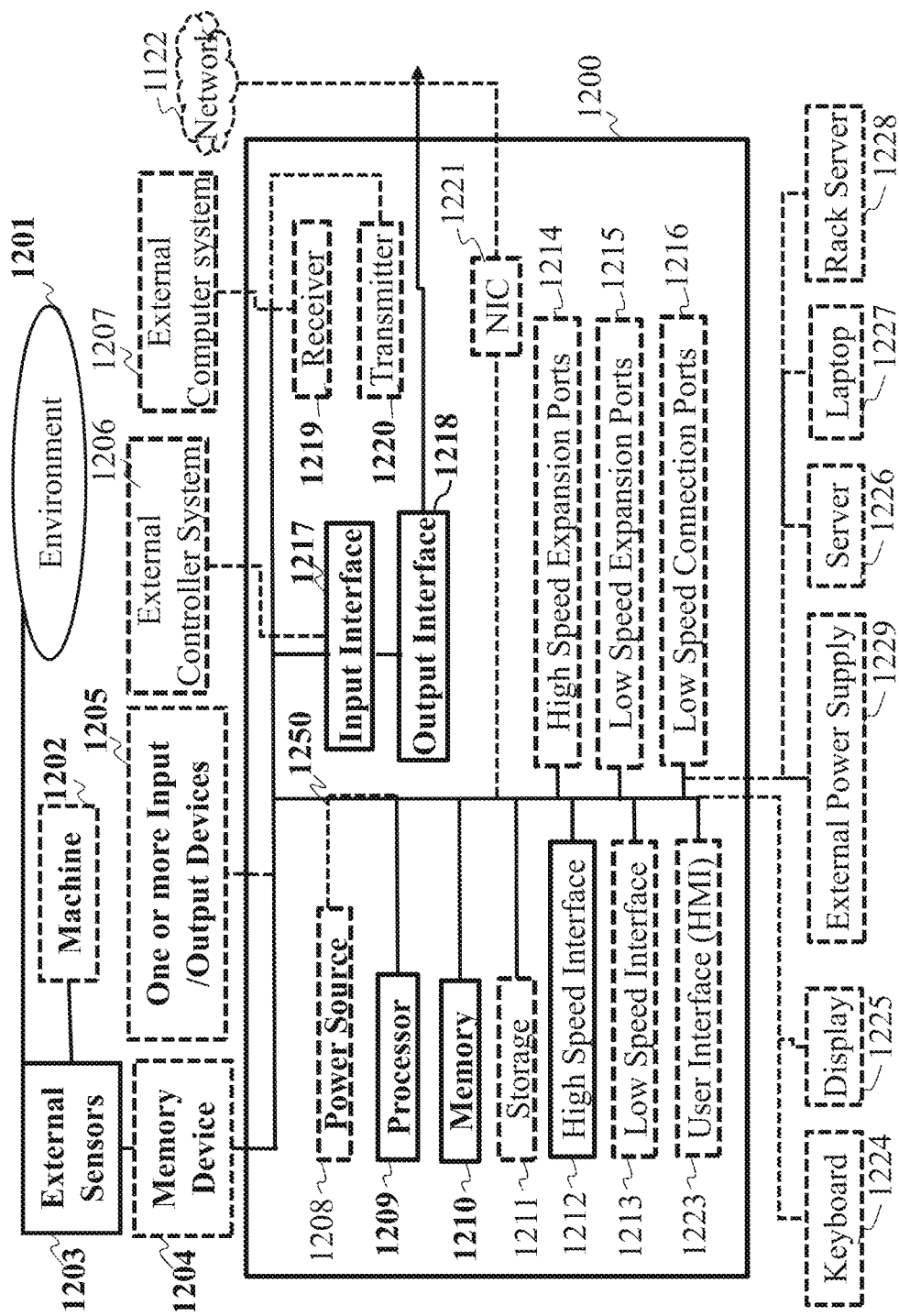
FIG. 12 is a schematic diagram illustrating an alternate centralized controller system that can be used for implementing some methods associated with the soft robot gripper system, or be combined with the centralized control system of FIG. 11, and/or with the centralized controller system of FIG. 1C, according to some embodiments of the present disclosure.

FIG. 12 is a schematic diagram illustrating a centralized controller system that can be used for implementing some methods associated with the soft robot gripper system, according to some embodiments of the present disclosure. The centralized controller system 1200 can include a power source 1208, a processor 1209, a memory 1210, a storage device 1211, all connected to a bus 1250. Further, a high-speed interface 1212, a low-speed interface 1213, high-speed expansion ports 1214 and low speed connection ports 1215, can be connected to the bus 1250. Also, a low-speed expansion port 1216 is in connection with the bus 1250. Contemplated are various component configurations that may be mounted on a common motherboard, by non-limiting example, 1230, depending upon the specific application. Further still, an input interface 2017 can be connected via bus 1250 to an external receiver 1206 and an output interface 2018. A receiver 1219 can be connected to an external transmitter 1207 and a transmitter 1220 via the bus 1250. Also connected to the bus 1250 can be an external memory 1204, external sensors 1203, machine(s) 1202 and an environment 1201. Further, one or more external input/output devices 1205 can be connected to the bus 1250. A network interface controller (NIC) 1221 can be adapted to connect through the bus 1250 to a network 1222, wherein data or other data, among other things, can be rendered on a third-party display device, third party imaging device, and/or third-party printing device outside of the computer device 1200. Contemplated is that the memory 1210 can store instructions that are executable by the centralized controller system 1200, historical data, and any data that can be utilized by the methods and systems of the present disclosure. The memory 1210 can include random access memory (RAM), read only memory (ROM), flash memory, or any other suitable memory systems. The memory 1210 can be a volatile memory unit or units, and/or a non-volatile memory unit or units. The memory 1210 may also be another form of computer-readable medium, such as a magnetic or optical disk.

Still referring to FIG. 12, a storage device 1211 can be adapted to store supplementary data and/or software modules used by the computer device 1200. For example, the storage device 1211 can store historical data and other related data as mentioned above regarding the present disclosure. Additionally, or alternatively, the storage device 1211 can store historical data similar to data as mentioned above regarding the present disclosure. The storage device 1211 can include a hard drive, an optical drive, a thumb-drive, an array of drives, or any combinations thereof. Further, the storage device 1211 can contain a computer-readable medium, such as a floppy disk device, a hard disk device, an optical disk device, or a tape device, a flash memory or other similar solid-state memory device, or an array of devices, including devices in a storage area network or other configurations. Instructions can be stored in an information carrier. The instructions, when executed by one or more processing devices (for example, processor 1209), perform one or more methods, such as those described above. The system can be linked through the bus 1250 optionally to a display interface or user Interface (HMI) 1223 adapted to connect the system to a display device 1225 and keyboard 1224, wherein the display device 1225 can include a computer monitor, camera, television, projector, or mobile device, among others.

Still referring to FIG. 12, the centralized controller system 1200 can include a user input interface 1217 adapted to a printer interface (not shown) can also be connected through bus 1250 and adapted to connect to a printing device (not shown), wherein the printing device can include a liquid inkjet printer, solid ink printer, large-scale commercial printer, thermal printer, UV printer, or dye-sublimation printer, among others. The high-speed interface 1212 manages bandwidth-intensive operations for the computing device 2000, while the low-speed interface 1213 manages lower bandwidth-intensive operations. Such allocation of functions is an example only. In some implementations, the high-speed interface 1212 can be coupled to the memory 1210, a user interface (HMI) 1223, and to a keyboard 1224 and display 1225 (e.g., through a graphics processor or accelerator), and to the high-speed expansion ports 1214, which may accept various expansion cards (not shown) via bus 1250. In the implementation, the low-speed interface 1213 is coupled to the storage device 1211 and the low-speed expansion port 1215, via bus 1250. The low-speed expansion port 1215, which may include various communication ports (e.g., USB, Bluetooth, Ethernet, wireless Ethernet) may be coupled to one or more input/output devices 1205, and other devices a keyboard 1224, a pointing device (not shown), a scanner (not shown), or a networking device such as a switch or router, e.g., through a network adapter.

Still referring to FIG. 12, the centralized controller system 1200 may be implemented in a number of different forms, as shown in the figure. For example, it may be implemented as a standard server 1226, or multiple times in a group of such servers. In addition, it may be implemented in a personal computer such as a laptop computer 1227. It may also be implemented as part of a rack server system 1228, and an external power supply 1229. Alternatively, components from the computing device 1200 may be combined with other components in a mobile device (not shown), such as a mobile computing device having different component configuration arranged for mobile devices.

Features: An aspect is the tentacles grasp the TO at a TO starting position located in a bin containing other TOs within a workplace when the soft gripper system is so commanded, according to the selected set of commands. Wherein after the soft gripper system is commanded to grasp the TO from the bin and before the soft gripper system is commanded to a next TO move, and for every sequential TO move to a final TO position the soft gripper system is commanded, sensors generate data for each TO move that identify a type of grip, an amount of TOs held by the tentacles, or both. Wherein upon the centralized control system receiving the sensor data, and confirms that either the type of grip, a single TO is grasped by the tentacles, or both, are confirmed according to the selected set of commands. Then the centralized control system determines if a position and/or an orientation of the TO corresponds to a predetermined criteria for the position and/or the orientation of the TO according to the selected set of commands, upon confirmation, the centralized control system does not generate an alternate set of command actions. However, if after the centralized control system determines that the type of grip, the single TO grasp by the tentacles, or both, do not meet the predetermined criteria for the position and/or the orientation of the TO according to the selected set of command. The centralized control system generates the alternate set of command actions, to move the tentacles holding the TO, back to the TO starting position or to an alternate position, location, or both.

Geometric Feature: each transfer channel includes a geometric feature having an entry aperture with a cable entry path tangential to an inner surface of the center thru-hole, and an exit aperture with a cable exit path parallel to a center axis of the connector. Wherein the cable entry path and the cable exit path both minimize an amount of transmission friction and minimize an amount of cable flex fatigue while the cables are in motion during an operation of the tentacle gripper. Wherein the geometric feature is based on obtaining a distance measured from a passthrough hole of a guide disc to a transfer channel, and using the measured distance and a pair of arcs of constant and equal radius, to construct the cable entry path and the cable exit path, to determine an optimal transfer channel configuration. Wherein a maximization of the radius of the pair of arcs within the measured distance, results in a minimization of an amount of side load of the cable generated from a motion of the cables, and concurrently minimizes an amount of transmission friction and an amount of cable flex fatigue during an operation of the tentacle gripper. Wherein the cable entry path extends at an acute angle from a bottom surface to a top surface of the elastic connector, and the cable exit path extends at an acute angle from the top surface to the bottom surface. Wherein each entry aperture of the transfer channels is approximately aligned with the lower spacer passthrough holes of a distal lower guide ring, and each exit aperture of the transfer channels is approximately aligned with upper ring passthrough holes of a proximal upper guide ring.

Another aspect is the sensors continually gather sensor data while the TO is at a starting position and moving toward a final position until reaching the final position within a workplace. Wherein the first and the second sets of commands each include a range of stored predetermined motor output positions to move the TO from the starting position to the final position. If the TO fails to achieve the final position, a predetermined amount of torque or a predetermined amount of force, based on the range of the stored predetermined motor output positions and torques. Then a predetermined subsidiary sequence of a set of commands is selected from a predetermined set of subsidiary sequence of sets of commands from the command database associated with the TO failure to achieve the final position, and executed to increase or decrease the range of stored predetermined motor output positions, so the TO achieves a position at the final position or an alternate final position. Wherein an aspect is at least one subsidiary sequence of the predetermined set of commands from the predetermined set is less than a stated minimum of the range of stored predetermined motor output positions, and at least one subsidiary sequence of the set of commands from the set is greater than a stated minimum of the range of stored predetermined motor output positions. Another aspect is the first, the second and the third sets of commands are each are obtained by sensing a motion having human like characteristics from a training operator wearing a teaching glove with sensors. Generating one or more signals representative of at least a portion of the motion by the sensors. Converting the one or more signals into a collective set of commands to actuate the tentacles or actuate the tentacles and other devices within a network of robotic devices, wherein the collective sets of commands are functionally equivalent to the motions.

Another aspect is the first, the second and the third sets of commands each include a sequence of predetermined torques to be applied to one or more joints or flexural joints along with corresponding tensions to apply to the transmission systems of each tentacle of the tentacles, such that each transmission system has a first end connected to a motor and a second end connected to a joint or a flexural joint. An aspect is a set of input signals from the received input signals include mapping data of the environment, and the robot system updates a mapping module with stored mapping data to determine a mapped association between the TO location and the robot system location. Another aspect is the robot system operational profile includes a set of operational parameters for the robot system, such that the mapped association between the TO and the robot system includes a distance between the TO and the robot system, such that the distance between the TO and the robot system is compared with a predetermined operating range, if within the predetermined operating range, the robot system continues to operate, if outside of the predetermined operating range, an alarm command is generated and sent to an operator or a component of the robot system.

An aspect is further comprising a set of control modification modules for managing an operation of the robot system, each control modification module managing an operation of each tentacle. Wherein each control modification module is configured to detect whether the operation of the tentacle fails to comply at each time step in the sequence of control signals by verifying that commanded joint positions and expected motor joint torques with corresponding tensions to the transmission systems are achieved for that time step. In response to detecting the operation of the tentacle fails to comply with the time step in the sequence of control signals, determine if a joint position for each joint achieved is within a predetermined range, and if a motor joint torque with corresponding tensions to the transmission systems achieved are within a predetermined range. If yes, then execute a next step in the time sequence of control signals. If no, then, access the control command database, to identify a subsidiary time sequence of control signals specified to execute when the achieved joint position, achieved motor joint torque are outside of the predetermined range, but within a predetermined direction range. If yes, then generate the subsidiary time sequence of control signals to replace the existing time sequence control signals and resume execution. If no, then, end the sequence of control signals, and generate an updated sequence of control signals, receive updated input signals from the sensors in the environment via the input circuit, update a mapping module and determine whether the robot system is operable based on the robot system operational profile based on the updated input signal and updated mapping module. If yes, then, execute the updated sequence of control signals, if no, a stop robot system command is generated to end the operation of the robot system.

What is claimed is:

1. A soft robotic gripper system having tentacles, comprising:
a centralized control system connected to a transceiver, configured to execute instructions stored in a memory having databases, to perform operations, including
receive operator data and sensor data from the transceiver;
compare stored object configurations associated with grips and pickup actions to identify a corresponding stored set of object configurations using a target object (TO) shape and a pose from the sensor data, and select a corresponding object configuration associated with a set of grips;
compare stored commands to identify corresponding stored sets of commands corresponding to the object configuration, and select corresponding sets of commands;
if a set of pickup actions are received in the operator data, compare the stored pickup actions corresponding to the object configuration to identify a set of pickup actions using the received set of pickup actions, and select a corresponding set of pickup actions;
compare the sets of commands to identify a corresponding first set of commands that correspond to a set of pickup actions using the set of pickup actions, and select the first set of commands, if the received set of pickup actions are absent from the operator data, then select a second set of commands; and
generate a sequence of control signals that cause motors for each tentacle of the tentacles to apply a sequence of tensions to transmission systems to each tentacle, to move the TO, according to the selected set of commands associated with the grips and pickup actions if received.

2. The soft robotic gripper system of claim 1, wherein the set of grips associated with each object configuration are based on grip styles, grip modes, an amount of grip strengths, an amount of other forces, and an amount of carrying capacities, by the tentacles grasping the object configuration of different types of object characteristics, that meet a predetermined multi-tentacle coordinated grip threshold.

3. The soft robotic gripper system of claim 2, wherein the grip styles include internal coordinated grasps and external coordinated grasps, each internal and external coordinated grasp is based on kinematic constraints, an amount of pinching friction or an amount of clamping friction, and wherein the grip modes are based on an amount of gripping strength generated from at least one tentacle bracing against another tentacle, or an amount of gripping strength generated from at least one tentacle bracing on a top or as approximate to the top of another tentacle, such that the object is similar to or the same as the TO.

4. The soft robotic gripper system of claim 1, wherein the first and the second sets of commands include one or a combination of: an axial lifting movement with tension in a direction away from a multiple tentacle base positioned at a bottom of each tentacle; an axial motion with compression in a direction toward the multiple tentacle base; a motion having forces substantially perpendicular to an axis of the multiple tentacle base; a motion having twisting forces along an axis substantially parallel to the axis of the multiple tentacle base; and a motion having twisting forces substantially perpendicular to the axis of the multiple tentacle base.

5. The soft robotic gripper system of claim 1, wherein the first and the second sets of commands each include a sequence of predetermined torques to be applied to the one or more joints or the flexural joints along with corresponding tensions to apply to the transmission systems of each tentacle of the tentacles, such that each transmission system has a first end connected to a motor and a second end connected to a joint or a flexural joint.

6. The soft robotic gripper system of claim 1, wherein the tentacles grasp the TO at a TO starting position located in a bin containing other TOs within a workplace when the soft gripper system is so commanded, according to the selected set of commands, wherein after the soft gripper system is commanded to grasp the TO from the bin and before the soft gripper system is commanded to a next TO move, and for every sequential TO move to a final TO position the soft gripper system is commanded, sensors generate data for each TO move that identify a type of grip, an amount of TOs held by the tentacles, or both, wherein upon the centralized control system receiving the sensor data, and confirms that either the type of grip, a single TO is grasped by the tentacles, or both, are confirmed according to the selected set of commands, then the centralized control system determines if a position and/or an orientation of the TO corresponds to a predetermined criteria for the position and/or the orientation of the TO according to the selected set of commands, upon confirmation, the centralized control system does not generate an alternate set of command actions, however, if after the centralized control system determines that the type of grip, the single TO grasp by the tentacles, or both, do not meet the predetermined criteria for the position and/or the orientation of the TO according to the selected set of command, the centralized control system generates the alternate set of command actions, to move the tentacles holding the TO, back to the TO starting position or to an alternate position, location, or both.

7. The soft robotic gripper system of claim 1, wherein each tentacle includes lower and upper members connected by a connector, the connector includes a center thru-hole and transfer channels in a center portion, each transfer channel includes a geometric feature having an entry aperture with a cable entry path tangential to an inner surface of the center thru-hole, and an exit aperture with a cable exit path parallel to a center axis of the connector.

8. The soft robotic gripper system of claim 7, wherein each lower and upper member have guide discs attached along the member to maintain spacing between the guide discs, and each guide disc includes a ring with passthrough holes, and a spacer located in a donut hole of the ring that has passthrough holes, while the ring and spacer passthrough holes collectively define cable pathways.

9. The soft robotic gripper system of claim 8, wherein cables having proximal ends coupled to motors or actuators outside of the lower member extend from the motors or the actuators through apertures of a controllable palm baseplate located at a proximal end of the lower member, and a set of lower cables extend through the lower ring passthrough holes to couple to a distal lower guide disc, and a set of upper cables extend through the spacer passthrough holes of the lower guide rings, through the transfer channels to the upper ring passthrough holes to couple to a distal upper guide ring, wherein an end cap is attached to the distal end of the upper member.

10. The soft robotic gripper system of claim 1, wherein the sensors include an end tip sensor for each tentacle configured to generate data, the data is applied to a tentacle state function to determine a state of the tentacle, wherein the end tip sensor is one of an inertial sensor, a micro electro-mechanical system device, an accelerometer or an electromagnetic tracker.

11. The soft robotic gripper system of claim 10, wherein the generate data includes at least one tentacle property that includes one or a combination of: (a) an amount of a measured tentacles pressure; (b) an amount of a measured tentacles moisture; (c) an amount of a measured tentacles shear force; (d) an amount of a measured tentacles torque force, wherein the at least one tentacle property is obtained from tactile data from each end tip sensor, such that at least one end tip sensor is embedded in an outer surface of one or more tentacles, and are in communication with the centralized controller.

12. The soft robotic gripper system of claim 1, further comprising distal joint sensors for each tentacle configured to generate data, the data is applied to a joint state function to determine a state of the distal joint, the distal joint sensors includes distributed shape sensors or linear displacement sensors.

13. The soft robotic gripper system of claim 12, wherein the linear displacement sensors provide data for cables associated with the distal joint, such that each linear displacement sensor provides data to determine a distance that a cable transmission moves, and upon determining distances for all cables via the linear displacement sensor, the distances for all the cables is indicative of movement of the distal joint, wherein each linear displacement sensor includes one of a linear voltage differential transformer, a Hall effect sensor and a magnet, a slide potentiometer, a reference element coupled to the cable transmission at a reference point so as to measure movement of the reference element as an indication of movement of the cable transmission.

14. The soft robotic gripper system of claim 1, wherein the received set of pickup actions of the operator data are sent by an operator, such that the received set of pickup actions and the stored sets of pickup actions related to moving an object similar to or the same as the TO from a starting position within a workplace to a next position, and include one or a combination of: an axial pull, an axial push, an axial twist, a lateral pull, a lateral push, a lateral twist, traverse twist, traverse push or a traverse pull, to the next position, by the tentacles grasping the object, that meet a predetermined multi-tentacle coordinated grip threshold.

15. A gripper system having tentacles, comprising:
a centralized control system connected to a transceiver, configured to execute instructions stored in a memory having databases, to perform operations, including
receive operator data and sensor data from the transceiver;
compare stored object configurations associated with grips and pickup actions to identify a corresponding stored set of object configurations using a target object (TO) shape and a pose from the sensor data, and select a corresponding object configuration;

compare stored commands to identify corresponding stored sets of commands corresponding to the object configuration, and select corresponding sets of commands;

if a set of pickup actions are received in the operator data, compare the stored sets of pickup actions corresponding to the object configuration to identify a set of pickup actions using the received set of pickup actions, and select a corresponding set of pickup actions;

compare the sets of commands to identify a corresponding first set of commands that correspond to a stored set of pickup actions using the set of pickup actions, and select the first set of commands;

if the set of pickup actions are absent from the operator data, then identify if at least one object characteristic is received in the operator data, compare the stored object characteristics corresponding to the object configuration to identify at least one stored object characteristic using the at least one object characteristic from the operator data, and select a corresponding at least one object characteristic;

compare the sets of commands to identify a corresponding second set of commands that correspond to at least one stored object characteristic using the at least one stored object characteristic, and select the second set of commands;

if the received at least one object characteristic is absent from the operator data, then select a third set of commands without the set of pickup actions and the at least one object characteristic; and generate a sequence of control signals that cause motors for each tentacle of the tentacles to apply a sequence of tensions to transmission systems to each tentacle, to move the TO, according to the selected set of commands.

16. The gripper system of claim 15, wherein the at least one object characteristic includes one of: (a) a type of a texture of an outer surface material of the TO object; (b) a two-dimensional (2D) or 3D shape of the TO; or (c) a degree of grip-ability such as wetness, smoothness or slipperiness of the TO, such that each stored object characteristic for the object configuration is previously tested based upon grip styles, grip modes, an amount of grip strengths, and an amount of carrying capacities, by the tentacles grasping test objects of different types of outer surfaces such as material types and measured levels of hardness, to identify grips according to a predetermined multi-tentacle coordinated grip threshold.

17. The gripper system of claim 15, wherein, the sensors continually gather sensor data while the TO is at a starting position and moving toward a final position until reaching the final position within a workplace, wherein the first and the second sets of commands each include a range of stored predetermined motor output positions to move the TO from the starting position to the final position, if the TO fails to achieve the final position, a predetermined amount of torque or a predetermined amount of force, based on the range of the stored predetermined motor output positions and torques, then a predetermined subsidiary sequence of a set of commands is selected from a predetermined set of subsidiary sequence of sets of commands from the command database associated with the TO failure to achieve the final position, and executed to increase or decrease the range of stored predetermined motor output positions, so the TO achieves a position at the final position or an alternate final position.

18. The gripper system of claim 17, wherein at least one subsidiary sequence of the predetermined set of commands from the predetermined set is less than a stated minimum of the range of stored predetermined motor output positions, and at least one subsidiary sequence of the set of commands from the set is greater than a stated minimum of the range of stored predetermined motor output positions.

19. The gripper system of claim 15, wherein the first, the second and the third sets of commands are each are obtained by sensing a motion having human like characteristics from a training operator wearing a teaching glove with sensors;

generating one or more signals representative of at least a portion of the motion by the sensors; and converting the one or more signals into a collective set of commands to actuate the tentacles, or actuate the tentacles and other devices within a network of robotic devices, wherein the collective sets of commands are functionally equivalent to the motions; and communicating the collective sets of commands to the centralized control system and the network of robotic devices, the robotic devices are robot assembly devices configurable to operate with the robot system.

20. A method for a gripper system having tentacles, comprising:

receiving operator data and real-time sensor data;

comparing stored object configurations associated with grips in an object database to identify a corresponding stored set of object configurations associated with sets of grips using a target object (TO) shape and a pose via the sensor data, and select a corresponding object configuration associated with a set of grips;

comparing stored commands in a command database to identify corresponding stored sets of commands corresponding to the object configuration with the associated set of grips, and select corresponding sets of commands;

comparing the stored sets of pickup actions in the object database corresponding to the object configuration to identify a set of pickup actions using the received set of pickup actions, and select a corresponding set of pickup actions, only if, a set of pickup actions are received in the operator data;

comparing the sets of commands to identify a corresponding first set of commands that correspond to the set of pickup actions in the command database, and select the first set of commands;

selecting a second set of commands without the set of pickup actions from the command database, only if, the received set of pickup actions are absent from the operator data; and generating a sequence of control signals that cause motors for each tentacle of the tentacles to apply a sequence of tensions to transmission systems to each tentacle, to move the TO, according to the selected set of commands.

21. A robot system, comprising:

an input circuit operable to receive input signals from sensors;

a transceiver to receive operator data including a set of pickup actions;

a storage system having databases, and is operable to provide a robot system operational profile and an object configuration profile that includes an object shape and a pose of the object;

a centralized control system connected to the transceiver and sensors is configured to execute instructions stored in the storage system, to perform operations, including detect an object configuration profile from an object configuration profile database using a TO configuration profile obtained from the received input signals, wherein each object configuration profile is associated with a set of grips, and select an object configuration profile;

access a command database having commands, and compare stored commands to identify corresponding stored sets of commands corresponding to the object configuration profile with the associated set of grips, and select corresponding sets of commands;

if a set of pickup actions are received in the operator data, compare the stored sets of pickup actions corresponding to the object configuration profile to identify a stored set of pickup actions using the received set of pickup actions, and select a corresponding set of pickup actions;

compare the sets of commands to identify a corresponding first set of commands using the set of pickup actions, and select a corresponding first set of commands;

if the received set of pickup actions are absent from the operator data, then select a second set of commands without the set of pickup actions, wherein the selected set of commands includes a sequence of predetermined torques to be applied to one or more joints or flexural joints along with corresponding tensions to apply to a plurality of transmission systems of each tentacle of the tentacles, such that each transmission system has a first end connected to a motor and a second end connected to a joint or a flexural joint; and generate a sequence of control signals that cause the motors for each tentacle of the tentacles to apply the sequence of tensions to the transmission systems to each tentacle, to move the TO.

22. The robot system of claim 21, wherein a set of input signals from the received input signals include mapping data of the environment, and the robot system updates a mapping module with stored mapping data to determine a mapped association between the TO location and the robot system location.

23. The robot system of claim 21, wherein the robot system operational profile includes a set of operational parameters for the robot system, such that the mapped association between the TO and the robot system includes a distance between the TO and the robot system, such that the distance between the TO and the robot system is compared with a predetermined operating range, if within the predetermined operating range, the robot system continues to operate, if outside of the predetermined operating range, an alarm command is generated and sent to an operator or a component of the robot system.

24. The robot system of claim 21, further comprising:

a set of control modification modules for managing an operation of the robot system, each control modification module managing an operation of each tentacle, each control modification module is configured to:

detect whether the operation of the tentacle fails to comply at each time step in the sequence of control signals by verifying that commanded joint positions and expected motor joint torques with corresponding tensions to the transmission systems are achieved for that time step;

in response to detecting the operation of the tentacle fails to comply with the time step in the sequence of control signals, determine if a joint position for each joint achieved is within a predetermined range, and if a motor joint torque with corresponding tensions to the transmission systems achieved are within a predetermined range;

if yes, then execute a next step in the time sequence of control signals;

if no, then, access the control command database, to identify a subsidiary time sequence of control signals specified to execute when the achieved joint position, achieved motor joint torque are outside of the predetermined range, but within a predetermined direction range;

if yes, then generate the subsidiary time sequence of control signals to replace the existing time sequence control signals and resume execution;

if no, then, end the sequence of control signals, and generate an updated sequence of control signals, receive updated input signals from the sensors in the environment via the input circuit, update a mapping module and determine whether the robot system is operable based on the robot system operational profile based on the updated input signal and updated mapping module, if yes, then, execute the updated sequence of control signals, if no, a stop robot system command is generated to end the operation of the robot system.

* * * * *